United States Patent
Tanaka et al.

(10) Patent No.: US 6,608,740 B2
(45) Date of Patent: Aug. 19, 2003

(54) SPIN-VALVE THIN-FILM MAGNETIC ELEMENT PROVIDED WITH SINGLE FREE MAGNETIC LAYER

(75) Inventors: Kenichi Tanaka, Niigata-ken (JP); Masamichi Saito, Niigata-ken (JP); Yosuki Ide, Niigata-ken (JP); Naoya Hasegawa, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 201 days.

(21) Appl. No.: 09/773,163

(22) Filed: Jan. 30, 2001

(65) Prior Publication Data

US 2001/0014000 A1 Aug. 16, 2001

(30) Foreign Application Priority Data

Jan. 31, 2000 (JP) .......................... 2000-023397

(51) Int. Cl.[7] ............................... G11B 5/39
(52) U.S. Cl. ................................ 360/324.12
(58) Field of Search ...................... 360/324, 324.1, 360/324.11, 324.12, 322

(56) References Cited

U.S. PATENT DOCUMENTS

| | | | |
|---|---|---|---|
| 5,549,978 A | | 8/1996 | Iwasaki et al. |
| 5,738,946 A | | 4/1998 | Iwasaki et al. |
| 6,282,069 B1 | * | 8/2001 | Nakazawa et al. ........ 360/324.2 |
| 6,301,089 B1 | * | 10/2001 | Saito et al. ............. 360/324.12 |
| 6,340,533 B1 | * | 1/2002 | Ueno et al. ................. 428/611 |
| 6,359,760 B2 | * | 3/2002 | Kanno ........................ 360/322 |
| 6,387,548 B1 | * | 5/2002 | Hasegawa et al. .......... 428/692 |
| 6,424,506 B1 | * | 7/2002 | Saito et al. ............. 360/324.11 |
| 6,456,469 B1 | * | 9/2002 | Gill |

FOREIGN PATENT DOCUMENTS

JP      02001297914 A   * 10/2001

OTHER PUBLICATIONS

Co–pending U.S. application Ser. No. 09/358,123, filed Jul. 20, 1999, entitled "Spin–Valve Magnetoresistive Thin Film Element" (copy not attached) commonly assigned to the Assignee of the present invention.
Co–pending U.S. application Ser. No. 09/358,838, filed Jul. 20, 1999, entitled "Manufacturing Method of Spin–Valve Magnetoresistive Thin Film Element" (copy not attached) commonly assigned to the Assignee of the present invention.
Co–pending U.S. application Ser. No. 09/357,915, filed Jul. 20, 1999, entitled "Spin–Valve Magnetoresistive Thin Film Element" (copy not attached) commonly assigned to the Assignee of the present invention.

* cited by examiner

Primary Examiner—Allen Cao
(74) Attorney, Agent, or Firm—Brinks Hofer Gilson & Lione

(57) ABSTRACT

A spin-valve thin-film magnetic element has a composite provided on a substrate. The composite includes an antiferromagnetic layer, a pinned magnetic layer, a nonmagnetic conductive layer, and a free magnetic layer. The composite also has bias layers and electrode layers on two sides thereof. The hard bias layers magnetize the free magnetic layer in a direction perpendicular to the pinned magnetic layer. The free magnetic layer is composed of a single CoFe-based alloy. The average crystal grain diameter in the free magnetic layer is 150 angstroms or less in the planar direction of the free magnetic layer. The volume of the crystal grains in which the <111> direction is predominantly oriented in a direction perpendicular to the planar direction of the free magnetic layer is 50 percent or less of the free magnetic layer.

28 Claims, 19 Drawing Sheets

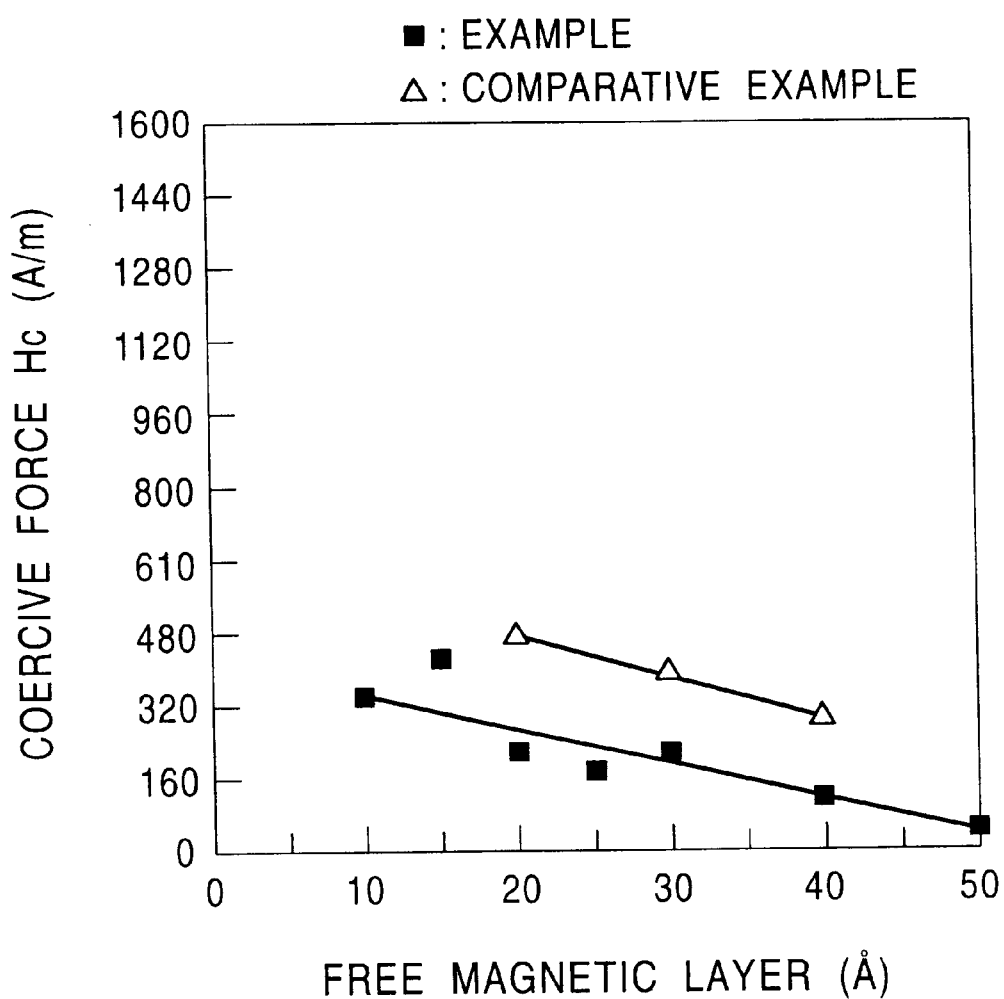

SPIN-VALVE THIN-FILM MAGNETIC ELEMENT PROVIDED WITH SINGLE FREE MAGNETIC LAYER

BACKGROUND OF THE INVENTION

1. Field of the Invention

The present invention relates to a spin-valve thin-film magnetic element which undergoes a change in electric resistance in relation to the magnetization vector of a pinned magnetic layer and a magnetization vector of a free magnetic layer affected by an external magnetic field, and to a thin-film magnetic head provided with the spin-valve thin-film magnetic element. In particular, the present invention relates to a technology suitable for a spin-valve thin-film magnetic element which includes a free magnetic layer having improved soft magnetic characteristics and thus exhibits an enhanced rate of change in resistance.

2. Description of the Related Art

A spin-valve thin-film magnetic element is a type of giant magnetoresistive element (GMR) exhibiting giant magnetoresistive effects and detects recorded magnetic fields from a recording medium such as a hard disk. The spin-valve thin-film magnetic element has a relatively simple structure among GMRs, and exhibits a high rate of change in resistance in response to external magnetic fields and thus a change in resistance by a weak magnetic field.

FIG. 17 is a cross-sectional view of an exemplary conventional spin-valve thin-film magnetic element when viewed from a face opposing a recording medium (air bearing surface: ABS). This spin-valve thin-film magnetic element is a bottom-type single spin-valve thin-film magnetic element including an antiferromagnetic layer, a pinned magnetic layer, a nonmagnetic conductive layer, and a free magnetic layer. In this spin-valve thin-film magnetic element, a recording medium such as a hard disk moves in the Z direction in the drawing, and a leakage magnetic field occurs in the Y direction in the drawing.

In the conventional spin-valve thin-film magnetic element, a composite 109 is formed on a substrate. The composite 109 includes an underlying layer 106, an antiferromagnetic layer 101, a pinned magnetic layer 102, a nonmagnetic conductive layer 103, a free magnetic layer 104, and a protective layer 107. Moreover, the spin-valve thin-film magnetic element includes, from the substrate side, a pair of hard bias layers 105 and a pair of electrode layers 108 formed on the hard bias layers, both provided on two side faces of the composite 109.

The underlying layer 106 is composed of tantalum (Ta) or the like, whereas the antiferromagnetic layer 101 is composed of a NiO alloy, an FeMn alloy, or NiMn alloy. The pinned magnetic layer 102 and the free magnetic layer 104 are composed of elemental cobalt (Co) or a NiFe alloy. The nonmagnetic conductive layer 103 is composed of a copper (Co) film. In addition, the hard bias layers 105 are composed of a cobalt-platinum (Co—Pt) alloy and the electrode layers 108 are composed of Cu or the like.

Since the pinned magnetic layer 102 is in contact with the antiferromagnetic layer 101, an exchange coupling magnetic field (exchange anisotropic magnetic field) is generated at the interface between the pinned magnetic layer 102 and the antiferromagnetic layer 101. The magnetization vector of the pinned magnetic layer 102 is pinned, for example, in the Y direction in the drawing.

The hard bias layers 105 are magnetized in the X1 direction in the drawing to orient the variable magnetization of the free magnetic layer 104 in the X1 direction in the drawing. As a result, the variable magnetization vector of the free magnetic layer 104 and the pinned magnetization vector of the pinned magnetic layer 102 intersect each other.

The free magnetic layer 104 includes a NiFe sublayer 104A and a Co sublayer 104B in contact with the nonmagnetic conductive layer 103.

In this spin-valve thin-film magnetic element, a sensing current is applied from electrode layers 108 to the pinned magnetic layer 102, the nonmagnetic conductive layer 103, and the free magnetic layer 104. When a leakage magnetic field is applied in the Y direction in the drawing from the magnetic recording medium moving in the Z direction in the drawing, the magnetization vector of the free magnetic layer 104 changes from the X1 direction to the Y direction in the drawing. Such a change in the magnetization vector of the free magnetic layer 104 changes electrical resistance in relation to the pinned magnetization vector of the pinned magnetic layer 102 (this change is referred to as magnetoresistive (MR) effects). As a result, the leakage magnetic field from the magnetic recording medium is detected as a change in voltage due to the change in the electrical resistance.

In such a spin-valve thin-film magnetic element, a surface oxide layer is formed at the interface between the NiFe sublayer 104A and the Co sublayer 104B in the free magnetic layer 104. This oxide layer causes an increase in resistance of the element and thus a decrease in the rate of change in resistance ($\Delta R/R$) in the GMR effects, resulting in deterioration of read output characteristics of the spin-valve thin-film magnetic element.

Moreover, the thickness of the Co sublayer 104B is set to be approximately 3 to 5 angstroms; hence, interdiffusion may occur between the Cu nonmagnetic conductive layer 103 and the NiFe sublayer 104A. Such interdiffusion of Cu and NiFe causes deterioration of characteristics of these layers and thus a decrease in the rate of change in resistance ($\Delta R/R$) in the GMR effects, resulting in deterioration of read output characteristics of the spin-valve thin-film magnetic element.

A possible means for solving the above problems is to provide a single Co layer configuration in the free magnetic layer 104. In this case, however, the coercive force Hc of the free magnetic layer 104 is undesirably large and the variation of the magnetization vector in the free magnetic layer 104 is less sensitive to the leakage magnetic field from the exterior, resulting in a reduction in detection sensitivity.

Another possible means is to provide a NiFe single free magnetic layer 104. In this case, there is no barrier layer for preventing interdiffusion of Cu and NiFe. The interdiffusion of Cu and NiFe causes significant deterioration of characteristics of these layers and thus a decrease in the rate of change in resistance ($\Delta R/R$) in the GMR effects, resulting in significant deterioration of read output characteristics of the spin-valve thin-film magnetic element.

FIG. 18 is a cross-sectional view of another conventional spin-valve thin-film magnetic element when viewed from a surface opposing a recording medium (ABS). This spin-valve thin-film magnetic element is a top-type single spin-valve thin-film magnetic element including an antiferromagnetic layer, a pinned magnetic layer, a nonmagnetic conductive layer, and a free magnetic layer. In this spin-valve thin-film magnetic element, a recording medium such as a hard disk moves in the Z direction in the drawing, and a leakage magnetic field occurs in the Y direction in the drawing.

With reference to FIG. 18, an underlying layer 121 is formed on a substrate. A free magnetic layer 125 is formed on the underlying layer 121, and a nonmagnetic conductive layer 124 is formed on the free magnetic layer 125. A pinned magnetic layer 123 is formed on the nonmagnetic conductive layer 124, and an antiferromagnetic layer 122 is formed on the pinned magnetic layer 123. Moreover, a protective layer 127 is formed on the antiferromagnetic layer 122. These layers define a composite 129. A pair of hard bias layers 126 and a pair of electrode layers 128 are formed on both sides of the composite 129.

In this spin-valve thin-film magnetic element, the pinned magnetic layer 123 is magnetized in a direction which is opposite to the Y direction in the drawing.

The underlying layer 121 is composed of tantalum or the like, and the antiferromagnetic layer 122 is composed of an IrMn alloy, an FeMn alloy, or a NiMn alloy. The pinned magnetic layer 123 and the free magnetic layer 125 are composed of elemental cobalt or a NiFe alloy, and the nonmagnetic conductive layer 124 is composed of a copper film. Moreover, the hard bias layers 126 are composed of a Co—Pt alloy or the like and the electrode layers 128 are composed of copper or the like.

Also, in this spin-valve thin-film magnetic element, the free magnetic layer 125 includes a NiFe sublayer 125A and a Co sublayer 125B in contact with the nonmagnetic conductive layer 124. Thus, the rate of change in resistance ($\Delta R/R$) in the GMR effects is decreased, resulting in deterioration of read output characteristics of the spin-valve thin-film magnetic element.

FIG. 19 is a cross-sectional view of another conventional spin-valve thin-film magnetic element when viewed from a surface opposing a recording medium. This spin-valve thin-film magnetic element is a dual spin-valve thin-film magnetic element in which a nonmagnetic conductive layer, a pinned magnetic layer, and an antiferromagnetic layer are provided on one face of a free magnetic layer, and another nonmagnetic conductive layer, another pinned magnetic layer, and another antiferromagnetic layer are provided on the other face. Since two sensing layers are provided, this spin-valve thin-film magnetic element exhibits a larger rate of change in resistance compared to the above single spin-valve thin-film magnetic elements and is suitable for high-density recording.

A magnetic recording medium such as a hard disk moves in the Z direction and the direction of the leakage magnetic field from the magnetic recording medium is in the Y direction in the drawing.

The spin-valve thin-film magnetic element shown in FIG. 19 has a composite 150 including, from the bottom, an underlying layer 141, a lower antiferromagnetic layer 142, a lower pinned magnetic layer 143, a nonmagnetic conductive layer 144, a free magnetic layer 145, a nonmagnetic conductive layer 146, an upper pinned magnetic layer 147, an upper antiferromagnetic layer 148, and a protective layer 149. Hard bias layers 132 and conductive layers 133 are formed on both sides of the composite 150.

In this spin-valve thin-film magnetic element, the underlying layer 141, the lower and upper antiferromagnetic layers 142 and 148, respectively, the lower and upper pinned magnetic layers 143 and 147, respectively, the pinned magnetic layers 143 and 147, the nonmagnetic conductive layers 144 and 146, the free magnetic layer 145, the hard bias layers 132, the conductive layers 133, and the protective layer 149 are composed of the same materials as these for the underlying layers 106 and 121, the antiferromagnetic layers 101 and 122, the pinned magnetic layers 102 and 123, the nonmagnetic conductive layers 103 and 124, the free magnetic layers 104 and 125, the protective layers 107 and 127, the hard bias layers 105 and 126, and the electrode layers 108 and 128, respectively, of the single spin-valve thin-film magnetic elements shown in FIGS. 17 and 18. At least one of the underlying layer 141 and the protective layer 149 may be omitted.

Also, in this spin-valve thin-film magnetic element, the free magnetic layer 145 includes a NiFe sublayer 145A and Co sublayers 145B, which are in contact with the nonmagnetic conductive layer 144 or 146, respectively. In the dual spin-valve thin-film magnetic element having such a configuration, the above-mentioned problems will occur at the interface between the nonmagnetic conductive layer 144 and the Co sublayer 145B and the interface between the nonmagnetic conductive layer 146 and the Co sublayer 145B. Thus, the rate of change in resistance ($\Delta R/R$) in the GMR effects will be decreased, resulting in deterioration of read output characteristics of the spin-valve thin-film magnetic element.

The present inventors have disclosed synthetic-ferri-pinned-type single spin-valve thin-film magnetic elements, each having pinned magnetic layers separated by a nonmagnetic interlayer, in Japanese Unexamined Patent Application Publication Nos. 10-204756, 10-204763, and 10-204767. The above problems in the free magnetic layer may occur even in such a configuration.

In addition, fundamental requirements in the spin-valve thin-film magnetic elements are improving soft magnetic characteristics of the free magnetic layer, enhancing output characteristics, and improving the detecting sensitivity.

SUMMARY OF THE INVENTION

Accordingly, the present invention is provided to achieve the following objects:

(1) To improve soft magnetic characteristics of a free magnetic layer;

(2) To enhance output characteristics of a spin-valve thin-film magnetic element;

(3) To improve the detection sensitivity of the spin-valve thin-film magnetic element;

(4) To improve the rate of change in resistance ($\Delta R/R$); and (5) To provide a thin-film magnetic head provided with such a spin-valve thin-film magnetic element.

A spin-valve thin-film magnetic element in accordance with the present invention comprises: a substrate; a composite provided on the substrate, the composite comprising an antiferromagnetic layer, a pinned magnetic layer in contact with the antiferromagnetic layer, the magnetization vector of the pinned magnetic layer being pinned by an exchange coupling magnetic field with the antiferromagnetic layer; a nonmagnetic conductive layer in contact with the pinned magnetic layer, and a free magnetic layer in contact with the nonmagnetic conductive layer, the magnetization vector of the free magnetic layer being oriented in a direction intersecting the magnetization vector of the pinned magnetic layer; hard bias layers provided on both sides of the composite so that the magnetization vector of the free magnetic layer intersects the magnetization vector of the pinned magnetic layer; and electrode layers provided on the hard bias layers, the electrode layers applying a sensing current to the composite, wherein the free magnetic layer comprises a single layer composed of a CoFe-based alloy.

Since the free magnetic layer in the present invention comprises a single layer comprising a CoFe-based alloy, the free magnetic layer is provided with an oxide layer. Thus, this spin-valve thin-film magnetic element does not cause an increase in resistance, a decrease in the rate of change in resistance (ΔR/R) in the GMR effects, and deterioration of the read output characteristics of the spin-valve thin-film magnetic element, which are caused by a surface oxide layer at an interface between a NiFe sublayer and a Co sublayer which are components of a conventional free magnetic layer.

Since this configuration does not include the NiFe sublayer, the spin-valve thin-film magnetic element does not cause an increase in resistance, a decrease in the rate of change in resistance (ΔR/R) in the GMR effects, and deterioration of the read output characteristics of the spin-valve thin-film magnetic element, which is caused by interdiffusion between the nonmagnetic conductive layer comprising copper or the like and the NiFe sublayer.

In the free magnetic layer of the present invention, it is preferable that the average diameter in the thickness direction of crystal grains constituting the free magnetic layer be substantially the same as or less than the thickness of the free magnetic layer. Moreover, the average diameter of the crystal grains constituting the free magnetic layer is preferably 150 angstroms or less and more preferably 100 angstroms or less in the plain of the free magnetic layer.

The CoFe-based alloy used in the present invention exhibits larger crystal magnetic anisotropy compared to the conventional FeNi-based alloy. When the average crystal grain diameter exceeds 150 angstroms in the free magnetic layer, the affects of magnetic anisotropy of individual crystal grains are significant in the free magnetic layer having a limited volume. When an external magnetic field to be detected is applied, the rotation of the magnetization vector in the free magnetic layer is not sensitively achieved, resulting in occurrence in magnetic hysteresis. As a result, soft magnetic characteristics, such as a coercive force Hc and anisotropic dispersion, are impaired, and the spin-valve thin-film magnetic element undergoes deterioration of read output characteristics due to low detecting sensitivity.

When average diameter of the crystal grains exceeds 100 angstroms in the plain of the free magnetic layer, the crystal magnetic anisotropy of the CoFe-based alloy is not readily moderated in the plain of the free magnetic layer, resulting in deterioration of soft magnetic characteristics of the free magnetic layer.

Preferably, the average diameter of the crystal grains constituting the free magnetic layer is 30 angstroms or more in the plain of the free magnetic layer.

When the average crystal grain diameter of the free magnetic layer is less than 30 angstroms, resistance increases due to grain boundary scattering of conduction electrons in the vicinity of individual crystal grains, although crystal magnetic anisotropy of individual crystal grains are moderated to improve soft magnetic characteristics. As a result, the spin-valve thin-film magnetic element exhibits a decreased rate (ΔR/R) of change in resistance in the GMR effects and deterioration of read output characteristics.

Preferably, the total volume of crystal grains constituting the free magnetic layer in which the <111> direction of the crystal grains is predominantly oriented substantially in a direction perpendicular to the plain of the free magnetic layer is 50 percent or less and more preferably 30 percent or less of the volume of the free magnetic layer.

When the total volume of crystal grains constituting the free magnetic layer in which the <111> direction of the crystal grains is predominantly oriented substantially in a direction perpendicular to the plain of the free magnetic layer exceeds 50 percent of the volume of the free magnetic layer, the crystal magnetic anisotropy of the crystal grains in which the <111> axis is predominantly oriented in the direction perpendicular to the plain of the free magnetic layer is enhanced. Thus, the magnetization vector of the free magnetic layer does not sensitively rotate even when an external magnetic field to be detected is applied, resulting in occurrence in magnetic hysteresis. As a result, soft magnetic characteristics are impaired, and the spin-valve thin-film magnetic element undergoes deterioration of read output characteristics due to low detecting sensitivity. Furthermore, the coercive force Hc of the free magnetic layer undesirably increases to decrease the detection sensitivity. Accordingly, the above-mentioned total volume of the crystal grains is preferably 50 percent or less and more preferably 30 percent or less of the volume of the free magnetic layer.

Herein, the volume of predominantly oriented crystal grains is determined by an image analysis of a cross-section of the free magnetic layer using a transmission electron microscope (TEM). Among crystal grains constituting the free magnetic layer in the TEM image, regions of the crystal grains of which the <111> direction perpendicular to the (111) plane of the cubic crystal in, for example, a CoFe alloy is predominantly oriented substantially in a direction perpendicular to the plain of the free magnetic layer (hereinafter referred to as "predominantly oriented crystal grains") are identified. This region is determined by electron diffractometry in the TEM observation. Next, the regions corresponding to the free magnetic layer is identified in the cross-sectional image. The ratio of the total area of the predominantly oriented crystal grains to the total area of the free magnetic layer is calculated. The volume ratio can be calculated by the above area ratio. The volume ratio of the grains of which the <111> direction is predominantly oriented in a direction perpendicular to the plane of the free magnetic layer to the overall grains in the free magnetic layer is thereby defined.

The regions of the predominantly oriented crystal grains are identified by electron diffractometry in the TEM observation.

FIG. 12 is a transmission electron micrograph of a cross section of a dual spin-valve thin-film magnetic element, which has composites, each including a nonmagnetic conductive layer, a pinned magnetic layer, and an antiferromagnetic layer, are deposited on two surfaces of a free magnetic layer; and FIG. 13 is a schematic view for illustrating the cross-section shown in FIG. 12.

In the schematic illustration in FIG. 13 of the TEM photograph shown in FIG. 12, region S of the crystal grains of which the <111> direction, which is perpendicular to the (111) plane of a cubic crystal, is predominantly oriented in the direction perpendicular to the plane of the overall free magnetic layer is identified by electron diffraction or the like. Next, regions F of the free magnetic layer are identified. The ratio by area of the regions S to the regions F is calculated to define the volume ratio of the crystal grains of which the <111> direction is predominantly oriented substantially in the direction perpendicular to the plain of the free magnetic layer in the overall regions F of the free magnetic layer.

The electron diffractometry is described. A certain crystal grain constituting the free magnetic layer is irradiated with focused electron beams with a diameter of 0.5 to several nanometers to observe a transmission electron diffraction pattern of the crystal grain. The direction of the {111} diffraction spot from the center beam in the diffraction pattern is the normal direction of the {111} plane. This direction is compared to the TEM image to determine the direction of the normal direction of the {111} plane in the observed crystal grain.

When cross stripes recognized as the {111} plane in the TEM image is distinctly observed (when the distance between the cross stripes agrees with the distance of the lattice plain), the cross stripes themselves correspond to the {111} planes. Thus, the direction perpendicular to the cross stripes is identified as the <111> direction, which is perpendicular to the {111} plane.

This observation is repeated for individual crystals to identify the regions of the crystal grains. In the TEM photograph shown in FIG. 12, the ratio by area of the region S to the region F is 10.3 percent.

The thickness of the free magnetic layer is in a range of preferably 10 to 50 angstroms and more preferably 15 to 30 angstroms.

When the thickness of the free magnetic layer exceeds the upper limit, the shunt loss of the sensing current occurs. When the thickness is less than the lower limit, the average free path of spin-up and spin-down conduction electrons moving in the free magnetic layer decreases. Both the cases cause a decreased rate of change in resistance ($\Delta R/R$) in the GMR effects, resulting in undesirable deterioration of read output characteristics of the spin-valve thin-film magnetic element.

In the present invention, the free magnetic layer may be a single CoFe layer. In this layer, cobalt may be enriched. For example, the Co/Fe ratio may be 90/10 by atomic percent.

In the cobalt-enriched composition, a rate of change in resistance ($\Delta R/R$) increases.

Alternatively, the free magnetic layer may be a single CoFeNi layer. Also, in this layer, cobalt may be enriched. For example, the ratio Co:Fe:Ni may be 70:15:15. In the composition near this ratio, the magnetostriction reaches zero.

At least one of the free magnetic layer and the pinned magnetic layer which are in contact with the nonmagnetic conductive layer is provided with a reflective mirror layer comprising a nonmagnetic insulating material at a face which is not in contact with the nonmagnetic conductive layer. The rate of change in resistance is thereby improved.

Examples of insulating materials for forming the reflective mirror layer include oxides, such as $\alpha$-$Fe_2O_3$, NiO, CoO, Co—Fe—O, Co—Fe—Ni—O, $Al_2O_3$, Al—Q—O (wherein Q is at least one element selected from the group consisting of B, Si, N, Ti, V, Cr, Mn, Fe, Co, and Ni), and R—O (wherein R is at least one element selected from the group consisting of Ti, V, Cr, Zn, Nb, Mo, Hf, Ta and W); and nitrides, such as Al—N, Al—Q—N (wherein Q is at least one element selected from the group consisting of B, Si, O, Ti, V, Cr, Mn, Fe, Co, and Ni), and R—N (wherein R is at least one element selected from the group consisting of Ti, V, Cr, Zr, Nb, Mo, Hf, Ta, and W).

Before describing the reasons for the increased rate of change in resistance due to the use of the reflective mirror layer, the principle of the giant magnetoresistive effects of the spin-valve thin-film magnetic element will be described with reference to an embodiment in which the reflective mirror layer is arranged at a face of the free magnetic layer which is not contact with the nonmagnetic conductive layer.

When a sensing current is applied to the spin-valve thin-film magnetic element, conduction electrons primarily move in the vicinity of the nonmagnetic conductive layer having small electrical resistance. There are two types of conduction electrons, that is, spin-up conduction electrons and spin-down conduction electrons are present in the same quantity. The rate of change in resistance of the spin-valve thin-film magnetic element has a positive correlation with the difference in mean free path of conduction electrons between these two types.

The spin-down conduction electrons are always scattered at the interface between the nonmagnetic conductive layer and the free magnetic layer regardless of the vector of the applied external magnetic field, and has a low probability of moving to the free magnetic layer and a mean free path which is always smaller than that of spin-up conduction electrons.

In contrast, the spin-up conduction electrons has a higher probability of moving from the nonmagnetic conductive layer to the free magnetic layer and a larger mean free path when the magnetization vector of the free magnetic layer is parallel to the magnetization vector of the pinned magnetic layer by an external magnetic field. When the external magnetic field changes the magnetization vector of the free magnetic layer rotates from the parallel arrangement, the probability of electron scattering at the interface between the nonmagnetic conductive layer and the free magnetic layer increases and thus the mean free path of the conduction electrons decreases.

As described above, the mean free path of spin-up conduction electrons considerably changes compared with the mean free path of spin-down conduction electrons due to the effects of the external magnetic field, and thus the difference in the mean free path is considerably increased. Accordingly, the rate of change in resistance ($\Delta R/R$) of the spin-valve thin-film magnetic element increases due to a change in resistivity.

When the reflective mirror layer is deposited at a face not in contact with the nonmagnetic conductive layer of the free magnetic layer, the mirror reflective layer forms a potential barrier at the interface with the free magnetic layer so as to reflect the spin-up conduction electrons on the mirror surface while maintaining the spin state. As a result, the mean free path of the spin-up conduction electrons can be further increased. That is, the difference in mean free path between the spin-dependent conduction electrons is further increased by the specular effects, the rate of change in resistance of the spin-valve thin-film magnetic element is further improved.

When the mirror reflective layer is deposited on a face not contact with the nonmagnetic conductive layer of the pinned magnetic layer, the mirror reflective layer also forms a potential barrier at the interface with the pinned magnetic layer so as to reflect the spin-up conduction electrons on the mirror surface while maintaining the spin state. As a result, the mean free path of the spin-up conduction electrons can be further increased. That is, the difference in mean free path between the spin-dependent conduction electrons is further increased by the specular effects, the rate of change in resistance of the spin-valve thin-film magnetic element is further improved.

In the composite of the spin-valve thin-film magnetic element of the present invention, the antiferromagnetic layer, the pinned magnetic layer, the nonmagnetic conductive layer, and the free magnetic layer may be deposited in that order on the substrate (bottom type).

Alternatively, in the composite, the free magnetic layer, the nonmagnetic conductive layer, the pinned magnetic layer, and the antiferromagnetic layer may be deposited in that order on the substrate (top type).

Alternatively, in the composite, the nonmagnetic conductive layer, the pinned magnetic layer, and the antiferromagnetic layer may be deposited on one face in the thickness direction of the free magnetic layer, and the composite further may comprise another nonmagnetic conductive layer, another pinned magnetic layer, and another antiferromagnetic layer being deposited on the other face of the free magnetic layer (dual type).

The bottom type can directly supply a larger proportion of sensing current from the electrode layers to the composite without via the antiferromagnetic layer having high resistivity compared to the top type. Moreover, the bottom type reduces shunt components of the detecting current which directly flow in the pinned magnetic layer, the nonmagnetic conductive layer, and the free magnetic layer from the hard bias layers, unlike the top type. Since side reading is prevented, the bottom type is advantageous for higher recording densities.

In the dual type, the number of the interfaces between the free magnetic layer and the nonmagnetic conductive layers is two times that of the bottom or top type. Since these interfaces function as filters for spin-up conduction electrons, a larger rate of change in resistance is achieved compared to the above single spin-valve thin-film magnetic elements, resulting in higher output.

In the spin-valve thin-film magnetic element of the present invention, the pinned magnetic layer may comprise a nonmagnetic interlayer and first and second pinned magnetic sublayers sandwiching the nonmagnetic interlayer, the magnetization vectors of the first and second pinned magnetic sublayers being antiparallel to each other and the first and second pinned magnetic sublayers being in a ferrimagnetic state. That is, this spin-valve thin-film magnetic element is of a so-called synthetic ferri-pinned type. In the pinned magnetic layer of the synthetic ferri-pinned type, the magnetostatic coupling magnetic field of the first pinned magnetic sublayer and the magnetostatic coupling magnetic field of the second pinned magnetic sublayer is mutually offset. Thus, this configuration suppresses the demagnetizing field (dipole magnetic field) due to the pinned magnetization of the pinned magnetic layer. As a result, the variable magnetization vector of the free magnetic layer is less affected by the demagnetizing field (dipole magnetic field) in the synthetic ferri-pinned type.

Moreover, one of the first and second pinned magnetic sublayers separated by the nonmagnetic conductive layer can pin the other in an appropriate direction. Thus, the pinned magnetic layer exhibits a considerably stable sate.

The pinned magnetic layer having the above double layer configuration (synthetic-ferri-pinned-type pinned magnetic layer) reduces the affect of the demagnetizing field (dipole magnetic field) by the pinned magnetization of the pinned magnetic layer on the free magnetic layer, the variable magnetization vector of the free magnetic layer can be corrected to a desired direction. As a result, the spin-valve thin-film magnetic element exhibits slight asymmetry and the variable magnetization vector of the free magnetic layer can be more readily controlled.

Herein the term "asymmetry" indicates the degree of the asymmetry of the read output waveform. When the read output waveform is symmetry, the asymmetry becomes zero. When the variable magnetization vector of the free magnetic layer is orthogonal to the pinned magnetization vector of the pinned magnetic layer, the asymmetry is zero. If the asymmetry is much larger than zero, the spin-valve thin-film magnetic element cannot exactly read information on a medium. As the asymmetry approaches zero, the spin-valve thin-film magnetic element can process read output with high reliability.

The demagnetizing field (dipole magnetic field) $H_d$ due to the pinned magnetization of the pinned magnetic layer has an uneven distribution in which the field is large in the peripheries and is small in the center in the height direction. The single-domain alignment in the free magnetic layer may be inhibited in conventional configurations. In the present invention, the dipole magnetic field $H_d$ substantially is zero due to the multilayered pinned magnetic layer. Since the free magnetic layer is aligned in a single-domain state, the spin-valve thin-film magnetic element does not generate Barkhausen noise and can exactly process signals from a magnetic recording medium.

In the spin-valve thin-film magnetic element, the antiferromagnetic layer preferably comprises one of an X—Mn alloy and a Pt—Mn—X' alloy wherein X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr. Preferably, the X content is in a range of 37 to 63 atomic percent and the total content of X' and Pt is in a range of 37 to 63 atomic percent.

The X—Mn alloys and the Pt—Mn—X alloys exhibit higher exchange coupling magnetic fields and blocking temperatures and higher corrosion resistance compared to NiO alloys, FeMn alloys, and NiMn alloys, which are conventionally used in antiferromagnetic layers.

In this spin-valve thin-film magnetic element, Cr bias underlayers may be provided between the hard bias layers and the composite and between the hard bias layers and the substrate. Since chromium of the bias underlayers has a body-centered cubic crystal structure, the hard bias layers can have a large coercive force and a high remanence ratio. As a result, the bias magnetic field can be further increased to completely align the free magnetic layer into the single-domain state.

A thin-film magnetic head in accordance with the present invention comprises the above-mentioned spin-valve thin-film magnetic element.

BRIEF DESCRIPTION OF THE DRAWINGS

FIG. 10 is a graph of the relationship between the thickness and the coercive force in free magnetic layers of spin-valve thin-film magnetic elements;

DESCRIPTION OF THE PREFERRED EMBODIMENTS

The preferred embodiments of a spin-valve thin-film magnetic element and a thin-film magnetic head provided with the spin-valve thin-film magnetic element in accordance with the present invention will now be described with reference to the drawings.

First Embodiment

Figure 1:
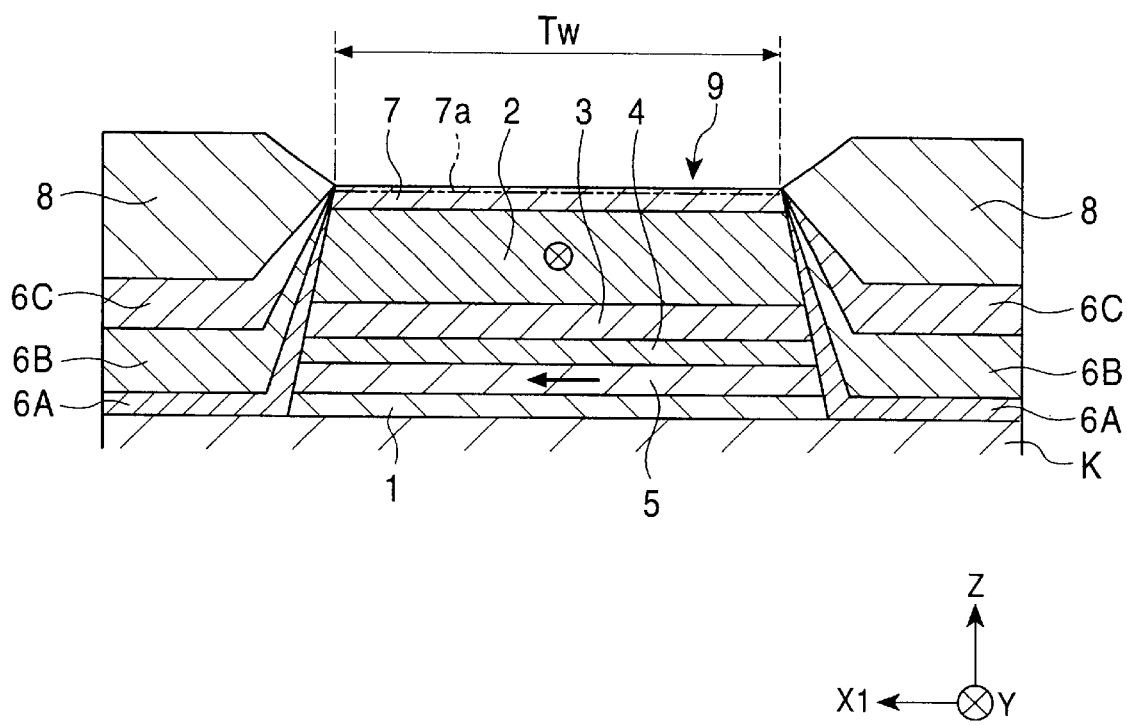
FIG. 1 is a cross-sectional view of a first embodiment of a spin-valve thin-film magnetic element in accordance with the present invention when viewed from a face opposing a recording medium.

FIG. 1 is a cross-sectional view of a first embodiment of a spin-valve thin-film magnetic element in accordance with the present invention when viewed from a face opposing a recording medium. This spin-valve thin-film magnetic element is a type of giant magnetoresistive (GMR) element based on giant magnetoresistive effects. This spin-valve thin-film magnetic element is provided, for example, at a trailing end of a floating slider of a hard disk drive to detect recording magnetic fields from a hard disk. A magnetic recording medium such as a hard disk moves in the Z direction in the drawing, whereas the magnetic recording medium generates leakage magnetic fields in the Y direction in the drawing.

The spin-valve thin-film magnetic element of the first embodiment is a top-type single spin-valve thin-film magnetic element including a substrate, and a composite having a free magnetic layer, a nonmagnetic conductive layer, a pinned magnetic layer, and an antiferromagnetic layer which are provided in that order on the substrate.

With reference to FIG. 1, an underlying layer 1 is provided on a substrate K. A free magnetic layer 5, a nonmagnetic conductive layer 4, a pinned magnetic layer 3, an antiferromagnetic layer 2, and a protective layer 7 are deposited on the underlying layer 1. The underlying layer 1, the free magnetic layer 5, the nonmagnetic conductive layer 4, the pinned magnetic layer 3, the antiferromagnetic layer 2, and the protective layer 7 define a composite 9 having a trapezoidal cross-section. Bias underlayers 6A, hard bias layers 6B, interlayers 6C, and electrode layers 8 are formed in that order on two sides of the composite 9. The hard bias layers 6B are magnetized in the X1 direction in the drawing to orient the magnetization vector of the free magnetic layer 5 in the X1 direction in the drawing.

In the spin-valve thin-film magnetic element of the first embodiment, it is preferable that the antiferromagnetic layer 2 be composed of a PtMn alloy and have a thickness of approximately 50 to 300 angstroms in the central portion thereof. The PtMn alloy exhibits high corrosion resistance compared to NiMn alloys and FeMn alloys, which have been conventionally used in antiferromagnetic layers, a high blocking temperature, and a large exchange coupling magnetic field (exchange anisotropic magnetic field).

The PtMn alloy may be replaced with an X—Mn alloy or a Pt—Mn—X' alloy wherein X is one element of selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

In the PtMn or X—Mn alloy, the Pt or X content is in a range of preferably 37 to 63 atomic percent and more preferably 47 to 57 atomic percent. In the Pt—Mn—X' alloy, the total content of Pt and X' is in a range of preferably 37 to 63 atomic percent and more preferably 47 to 57 atomic percent, and the X' content is preferably in a range of 0.2 to 10 atomic percent. When X' is at least one element selected from Pd, Ru, Ir, Rh, and Os, the X' content is preferably in a range of 0.2 to 40 atomic percent.

The antiferromagnetic layer 2 is formed of one of these alloys and is annealed so that the antiferromagnetic layer 2 generates a large exchange coupling magnetic field. When the PtMn alloy is used, the resulting antiferromagnetic layer 2 exhibits a high exchange coupling magnetic field exceeding 48 kA/m and particularly 64 kA/m and a significantly high blocking temperature of 380° C., wherein the antiferromagnetic layer 2 loses the exchange coupling magnetic field above the blocking temperature.

These alloys has a face-centered cubic (fcc) structure having the same lattice constant for the a axis and the c axis and belonging to an irregular system in an as-deposited state, and is changed to a face-centered tetragonal (fct) structure (the ratio of the a axis to the c axis≈0.9) of a CuAuI type by annealing.

The pinned magnetic layer 3 is a ferromagnetic thin film composed of, for example, elemental cobalt, a NiFe alloy, a CoNiFe alloy, a CoFe alloy, or a CoNi alloy. Preferably, the thickness of the pinned magnetic layer 3 is in a range of 10 to 50 angstroms. In a more preferred embodiment, the pinned magnetic layer 3 is composed of Co and has a thickness of 30 angstroms.

Since the pinned magnetic layer 3 is in contact with the antiferromagnetic layer 2, an exchange coupling magnetic field (exchange anisotropic magnetic field) occurs at the interface between the pinned magnetic layer 3 and the antiferromagnetic layer 2 by annealing in a magnetic field so that the magnetization vector of the pinned magnetic layer 3 is pinned, for example, in the Y direction, as shown in FIG. 1.

A larger exchange coupling magnetic field contributes to stabilization of the magnetization of the pinned magnetic layer 3. Moreover, the use of the PtMn alloy in the antiferromagnetic layer 2 ensures a thermally stable magnetic state of the pinned magnetic layer 3, because the antiferromagnetic layer 2 exhibits a high blocking temperature and generates a large exchange coupling magnetic field (exchange anisotropic magnetic field) at the interface with the pinned magnetic layer 3.

Preferably, the free magnetic layer 5 is a single layer composed of a CoFe-based alloy. The thickness of the free magnetic layer 5 is in a range of preferably 10 to 50 angstroms and more preferably 15 to 30 angstroms. When the thickness of the free magnetic layer 5 exceeds the upper limit, the shunt loss of the sensing current occurs. When the thickness is less than the lower limit, the average free path of spin-up and spin-down conduction electrons moving in the free magnetic layer 5 decreases. Both the cases cause a decreased rate of change in resistance ($\Delta R/R$) in the GMR effects, resulting in undesirable deterioration of read output characteristics of the spin-valve thin-film magnetic element.

The free magnetic layer 5 may be a single CoFe layer in this embodiment. In the CoFe layer, cobalt may be enriched. For example, the Co/Fe ratio may be 90/10 by atomic percent. Such a cobalt-enriched composition causes an increased rate of change in resistance ($\Delta R/R$).

In the free magnetic layer 5, the average diameter, in the thickness direction (Z direction in the drawing), of crystal grains constituting the free magnetic layer 5 is preferably the same as or less than the thickness of the free magnetic layer 5, and the average diameter, in the plain (X1 and Y directions in the drawing) of the free magnetic layer 5, is preferably 150 angstroms or less, and more preferably 100 angstroms or less.

When the average diameter of the crystal grains exceeds 150 angstroms in the plain (X1 and Y direction in the drawing) of the free magnetic layer 5, the free magnetic layer 5 exhibits large crystal magnetic anisotropy due to individual crystal grains because the CoFe-based alloy originally exhibits larger crystal magnetic anisotropy compared to FeNi-based alloys. In such a case, when an external magnetic field to be detected is applied, the magnetization vector of the free magnetic layer 5 does not sensitively rotate, resulting in occurrence in magnetic hysteresis. As a result, soft magnetic characteristics, such as a coercive force Hc and anisotropic dispersion, are impaired, and the spin-valve thin-film magnetic element undergoes deterioration of read output characteristics due to low detecting sensitivity.

When the average diameter of the crystal grains exceeds 100 angstroms in the plain of the free magnetic layer 5, the crystal magnetic anisotropy of the CoFe-based alloy is not readily moderated in the plain of the free magnetic layer 5, resulting in deterioration of soft magnetic characteristics of the free magnetic layer 5.

When the average crystal grain diameter of the free magnetic layer 5 is 30 angstroms or less, resistance increases due to grain boundary scattering of conduction electrons in the vicinity of individual crystal grains, although crystal magnetic anisotropy of individual crystal grains are moderated to improve soft magnetic characteristics. As a result, the spin-valve thin-film magnetic element exhibits a decreased rate ($\Delta R/R$) of change in resistance in the GMR effects and deterioration of read output characteristics.

In the crystal grains constituting the free magnetic layer 5, the total volume of the crystal grains in which the <111> direction of the crystal grains as the easy axis is predominantly oriented substantially in a direction (Z direction in FIG. 1) perpendicular to the plain of the free magnetic layer 5 (hereinafter referred to as "the volume of predominantly oriented crystal grains") is preferably 50 percent or less and more preferably 30 percent or less of the volume of the free magnetic layer.

When the volume of predominantly oriented crystal grains exceeds 50 percent or less of the volume of the free magnetic layer 5, the crystal magnetic anisotropy of the crystal grains in which the easy axis is predominantly oriented in the Z direction in FIG. 1 is enhanced. Thus, the magnetization vector of the free magnetic layer 5 does not sensitively rotate even when an external magnetic field to be detected is applied, resulting in occurrence in magnetic hysteresis. As a result, soft magnetic characteristics are impaired, and the spin-valve thin-film magnetic element undergoes deterioration of read output characteristics due to low detecting sensitivity. Furthermore, the coercive force Hc of the free magnetic layer 5 undesirably increases to decrease the detection sensitivity. Accordingly, the above-mentioned total volume of the crystal grains is preferably 50 percent or less and more preferably 30 percent or less of the volume of the free magnetic layer 5.

Herein, the volume of predominantly oriented crystal grains is determined by an image analysis of a cross-section of the free magnetic layer 5 using a transmission electron microscope (TEM). Among crystal grains constituting the free magnetic layer 5 in the TEM image, regions of the crystal grains of which the <111> direction perpendicular to the (111) plane of the cubic crystal in, for example, a CoFe alloy is predominantly oriented substantially in a direction perpendicular to the plain of the free magnetic layer 5 (hereinafter referred to as "predominantly oriented crystal grains") are identified. This region is determined by electron diffractometry in the TEM observation. Next, the regions corresponding to the free magnetic layer 5 is identified in the cross-sectional image. The ratio of the total area of the predominantly oriented crystal grains to the total area of the free magnetic layer 5 is calculated. Since the <111> direction of the crystal grains grows in a direction perpendicular to the plain of the free magnetic layer 5 (in the Z direction in FIG. 1), the crystals are considered to grow in the Y direction in FIG. 1 in the substantially same proportion. Thus, the volume ratio can be calculated by the above area ratio. The volume ratio of the grains of which the <111> direction is predominantly oriented in a direction perpendicular to the plane of the free magnetic layer 5 to the overall grains in the free magnetic layer 5 is thereby defined.

The nonmagnetic conductive layer 4 is composed of copper (Cu) or the like and generally has a thickness in a range of 20 to 30 angstroms. The protective layer 7 is composed of tantalum (Ta) or the like and is provided with a surface oxide layer 7a thereon.

The bias underlayers 6A function as buffer and orientation films and are preferably composed of chromium (Cr) or the like. The thickness of the bias underlayers 6A is in a range of, for example, 20 to 50 angstroms and preferably approximately 35 angstroms. The interlayers 6C are composed of, for example, tantalum (Ta) and have a thickness of approximately 50 angstroms. These bias underlayers 6A and interlayers 6C function as diffusion barriers when the spin-valve thin-film magnetic element is exposed at an elevated temperature in a curing step, such as UV curing or hard baking, of an insulating resist in a subsequent production process of an inductive write head. Thus, these layers prevent thermal diffusion between the hard bias layers 6B and neighboring layers thereof and thus deterioration of the hard bias layers 6B.

The hard bias layers 6B generally have a thickness in a range of 200 to 500 angstroms, and are preferably composed of, for example, a Co—Pt alloy, a Co—Cr—Pt alloy, or Co—Cr—Ta alloy.

Since the hard bias layers 6B are magnetized in the X1 direction in the drawing, the magnetization vector of the free magnetic layer 5 is oriented in the X1 direction in the drawing. Thus, the variable magnetization vector of the free magnetic layer 5 and the pinned magnetization vector of the pinned magnetic layer 3 define an angle of 90° (are perpendicular to each other).

Preferably, the bottom surfaces of the hard bias layers and the free magnetic layer 5 are arranged in the same level, and are magnetically coupled with each other, and the hard bias layers 6B have a thickness which is larger than the thickness of the free magnetic layer 5. Thus, the upper surfaces of the hard bias layers 6B are further distant from the substrate K compared to the upper surface of the free magnetic layer 5. The bottom surfaces of the hard bias layers 6B may be substantially equal to or lower than the bottom surface of the free magnetic layer 5.

The hard bias layers 6B and the free magnetic layer 5 are arranged in the same level and are magnetically coupled with each other. The thickness of the magnetically coupled portion between the hard bias layers 6B and the 35 is equal to or lower than the thickness of the free magnetic layer 5.

Herein, the upper surfaces of the hard bias layers 6B indicate surfaces away from the substrate. The hard bias layers 6B and the free magnetic layer 5 may be magnetically coupled with each other through other layers, such as the bias underlayers 6A and the interlayers 6C, in addition to the above-mentioned direct coupling.

Preferably, each of the electrode layers 8 has a single-layer or multilayer configuration composed of at least one element selected from Cr, Au, Ta, and W to reduce the resistance value thereof. The electrical resistance is effectively reduced when Cr is selected as a material for the electrode layers 8 and is deposited by epitaxy on the Ta interlayers 6C.

In the spin-valve thin-film magnetic element shown in FIG. 1, the electrode layers 8 lead a sensing current to the composite 9. When a magnetic field is applied from the magnetic recording medium in the Y direction in FIG. 1, the magnetization vector of the free magnetic layer 5 varies from the X1 direction to the Y direction in the drawing. In this state, spin-dependent scattering of conduction electrons occurs due to so-called GMR effects at the interface between the nonmagnetic conductive layer 4 and the free magnetic layer 5 to detect the leakage magnetic field from the magnetic recording medium as a change in electrical resistance.

Since the free magnetic layer 5 is a single CoFe layer in the spin-valve thin-film magnetic element of this embodiment, the spin-valve thin-film magnetic element does not undergo deterioration of read output characteristics, which is essential for a conventional free magnetic layer having a double layer configuration including a NiFe sublayer and a Co sublayer and inevitably undergoing the formation of an oxide layer at the interface between these sublayers.

Since no NiFe sublayer is provided, interdiffusion between the nonmagnetic conductive layer composed of copper or the like and the NiFe sublayer does not occur in this embodiment. Thus, individual layers can maintain properties thereof and the spin-valve thin-film magnetic element does not undergo deterioration of read output characteristics due to a decreased rate of change in resistance ($\Delta R/R$) in the GMR effects.

In this embodiment, the free magnetic layer 5 is a single layer composed of a CoFe-based alloy. The thickness of the free magnetic layer 5 is set to be in a range of preferably 10 to 50 angstroms and more preferably 15 to 30 angstroms. Thus, the shunt loss of the sensing current does not occur. Moreover, the average free path of spin-up and spin-down conduction electrons moving in the free magnetic layer 5 does not decrease. As a result, the spin-valve thin-film magnetic element does not undergo the deterioration of read output characteristics due to a decreased rate of change in resistance ($\Delta R/R$) in the GMR effects.

In this embodiment, the average diameter, in the thickness direction (Z direction in FIG. 1), of crystal grains constituting the free magnetic layer 5 is preferably the same as or less than the thickness of the free magnetic layer 5, and the average diameter, in the plain (X1 and Y directions in FIG. 1) of the free magnetic layer 5, is preferably 150 angstroms or less and more preferably 100 angstroms or less. Thus, crystal magnetic anisotropy of individual crystal grains is not enhanced in the free magnetic layer 5 regardless of the use of the CoFe-based alloy having larger crystal magnetic anisotropy compared to a FeNi-based alloy. Thus, the magnetization vector of the free magnetic layer 5 can sensitively rotate in response to the applied external magnetic field. Moreover, magnetic hysteresis does not occur, and thus soft magnetic characteristics do not decrease. Since the crystal magnetic anisotropy of individual crystal grains is moderated to improve the soft magnetic characteristics. Accordingly, the spin-valve thin-film magnetic element does not undergo the deterioration of the read output characteristics due to decreased detection sensitivity.

Also, an increase in resistance due to grain boundary scattering of conduction electrons in the vicinity of the interfaces of crystal grains is prevented. As a result, the spin-valve thin-film magnetic element does not undergo the deterioration of the read output characteristics.

Since the average diameter of the crystal grains is set to be 100 angstroms or less, the crystal magnetic anisotropy of the CoFe-based alloy is not readily moderated in the plain of the element to prevent the deterioration of the soft magnetic characteristics of the free magnetic layer. Accordingly, the spin-valve thin-film magnetic element does not undergo the deterioration of the read output characteristics due to a decreased rate of change in resistance ($\Delta R/R$) in the GMR effects.

In the crystal grains constituting the free magnetic layer 5, the total volume of the crystal grains in which the <111> direction of the crystal grains is predominantly oriented substantially in a direction (Z direction in FIG. 1) perpendicular to the plain of the free magnetic layer 5 (hereinafter referred to as "the volume of predominantly oriented crystal grains") is 50 percent or less and more preferably 30 percent or less of the volume of the free magnetic layer. Thus, crystal magnetic anisotropy of individual crystal grains is not enhanced in the free magnetic layer 5 and the free magnetic layer 5 maintains an adequate level of coercive force Hc. Accordingly, the magnetization vector of the free magnetic layer 5 can sensitively rotate in response to the applied external magnetic field. Moreover, magnetic hysteresis does not occur, and thus soft magnetic characteristics do not decrease. Since the crystal magnetic anisotropy of individual crystal grains is moderated to improve the soft magnetic characteristics. Accordingly, the spin-valve thin-film magnetic element exhibits an adequate rate of change in resistance (ΔR/R) due to the GMR effects and does not undergo the deterioration of the read output characteristics due to a decreased detection sensitivity.

Second Embodiment

A second embodiment of the spin-valve thin-film magnetic element and the thin-film magnetic head provided therewith of the present invention will now be described.

Figure 2:
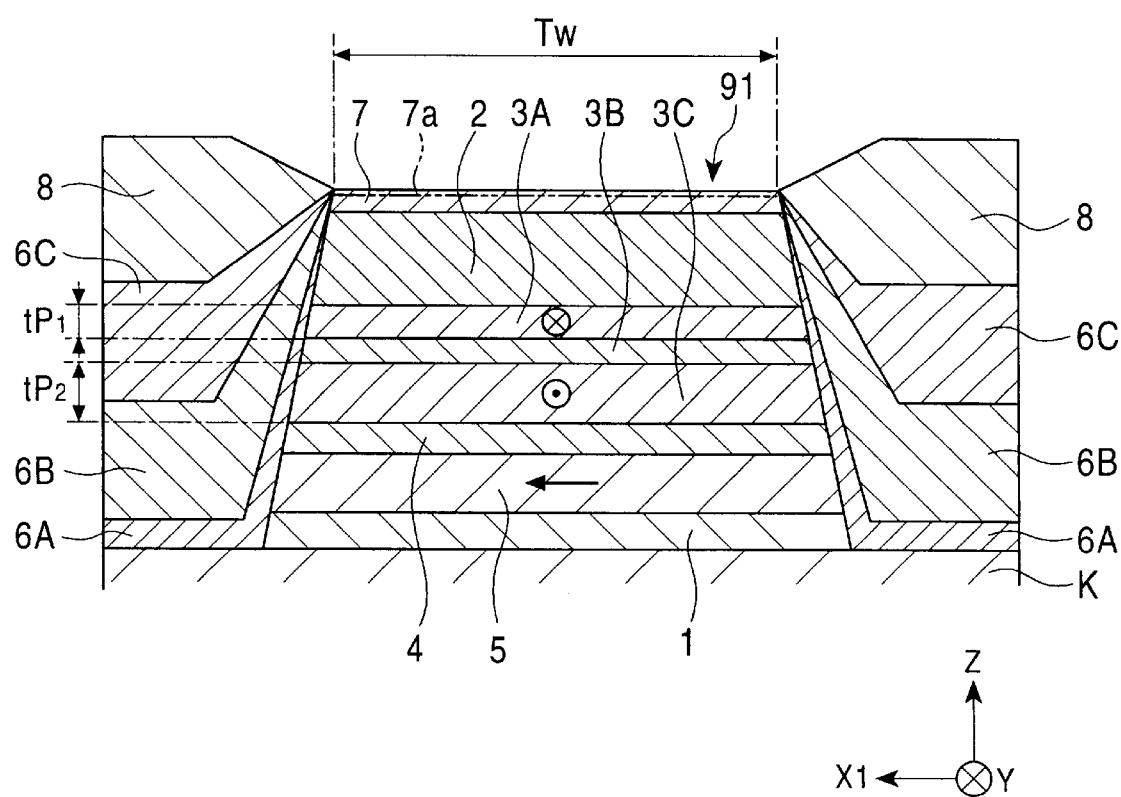
FIG. 2 is a cross-sectional view of a second embodiment of the spin-valve thin-film magnetic element in accordance with the present invention when viewed from a face opposing a recording medium.

FIG. 2 is a cross-sectional view of the second embodiment of the spin-valve thin-film magnetic element in accordance with the present invention when viewed from a face opposing a recording medium. This spin-valve thin-film magnetic element is also a top-type single spin-valve thin-film magnetic element, which is substantially the same as that in the first embodiment shown in FIG. 1, wherein parts having the same functions as in FIG. 1 are referred to with the same reference numerals, and a detailed description thereof with reference to drawings has been omitted.

The spin-valve thin-film magnetic element of the second embodiment differs from that of the first embodiment in that the pinned magnetic layer comprises a first pinned magnetic sublayer 3A, a second pinned magnetic sublayer 3C, and a nonmagnetic interlayer 3B provided therebetween. The magnetization vector of the first pinned magnetic sublayer 3A and the magnetization vector of the second pinned magnetic sublayer 3C are antiparallel to each other, and thus the pinned magnetic layer is in a synthetic ferri-pinned magnetic state. That is, this spin-valve thin-film magnetic element is of a so-called synthetic ferri-pinned type.

The second pinned magnetic sublayer 3C is deposited on the nonmagnetic conductive layer 4, the nonmagnetic interlayer 3B is deposited on the second pinned magnetic sublayer 3C, and the first pinned magnetic sublayer 3A is deposited on the nonmagnetic interlayer 3B. An antiferromagnetic layer 13 composed of a PtMn alloy is formed on the first pinned magnetic sublayer 3A.

The first pinned magnetic sublayer 3A and the nonmagnetic interlayer 3B are formed of a ferromagnetic material, for example, elemental cobalt, a NiFe alloy, a CoNiFe alloy, a CoFe alloy, or a CoNi alloy. Preferably, the thickness of these layers is approximately 40 angstroms. In an actual preferred embodiment, the first pinned magnetic sublayer 3A is composed of elemental cobalt and has a thickness of 13 to 15 angstroms whereas the second pinned magnetic sublayer 3C is composed of elemental cobalt and has a thickness of 20 to 25 angstroms.

The nonmagnetic interlayer 3B is preferably composed of at least one element selected from Ru, Rh, Ir, Cr, Re, and Cu, and generally has a thickness of 8 angstroms.

The first pinned magnetic sublayer 3A is in contact with the antiferromagnetic layer 2. During annealing in a magnetic field, an exchange coupling magnetic field (exchange anisotropic magnetic field) is generated at the interface between the first pinned magnetic sublayer 3A and the antiferromagnetic layer 2 to pin the magnetization vector of the first pinned magnetic sublayer 3A, for example, in the Y direction in FIG. 2. As a result, the magnetization vector of the second pinned magnetic sublayer 3C, which opposes the first pinned magnetic sublayer 3A with the nonmagnetic interlayer 3B therebetween, is antiparallel to the magnetization vector of the first pinned magnetic sublayer 3A, that is, in a direction reverse to the Y direction in the drawing.

As shown in FIG. 2, these layers 1 to 7a constitute a composite 91 having a trapezoidal cross-section.

A larger exchange coupling magnetic field maintains a stable antiparallel arrangement between the magnetization vectors of the first and second pinned magnetic sublayers 3A and 3B, respectively. Since the antiferromagnetic layer 2 is composed of the PtMn alloy, which has a high blocking temperature and generates a large exchange coupling magnetic field (exchange anisotropic magnetic field) at the interface with the first pinned magnetic sublayer 3A, the magnetization vectors of the first and second pinned magnetic sublayers 3A and 3B, respectively, are thermally stabilized.

In this embodiment, the ratio of the thickness of the first pinned magnetic sublayer 3A to that of the nonmagnetic interlayer 3B is controlled within an appropriate range to increase the exchange coupling magnetic field (Hex*), so that the magnetization vectors of the first and second pinned magnetic sublayers 3A and 3B, respectively, are thermally stabilized in an antiparallel state (ferri-pinned state), while the rate of change in resistance (ΔR/R) is maintained at an ordinary level. The magnetization vectors of the first and second pinned magnetic sublayers 3A and 3B can be appropriately controlled by adjusting the direction and the magnitude of the magnetic field during annealing.

The nonmagnetic conductive layer 4 is composed of copper and has a thickness in a range of 20 to 25 angstroms.

In the second embodiment, the free magnetic layer 5 is composed of the CoFe alloy. Thus, the spin-valve thin-film magnetic element has substantially the same effects as those in the first embodiment. Furthermore, the magnetization vector of the first pinned magnetic sublayer 3A and the magnetization vector of the second pinned magnetic sublayer 3C separated by the nonmagnetic interlayer 3B are antiparallel to each other. That is, the pinned magnetic layer is in a synthetic ferri-pinned-state. In the pinned magnetic layer of the synthetic ferri-pinned type, the magnetostatic coupling magnetic field of the first pinned magnetic sublayer and the magnetostatic coupling magnetic field of the second pinned magnetic sublayer is mutually offset. Thus, this configuration suppresses the demagnetizing field (dipole magnetic field) $H_d$ generated by the first pinned magnetic sublayer 3A and the second pinned magnetic sublayer 3C.

Since the demagnetizing field (dipole magnetic field) $H_d$ is substantially zero in this embodiment, the variable magnetization $M_f$ of the nonmagnetic conductive layer 4 is substantially not affected by the demagnetizing field (dipole magnetic field). Since the single-domain alignment in the nonmagnetic conductive layer 4 is not inhibited, Barkhausen noise causing instability of signal processing does not occur, and the spin-valve thin-film magnetic element can exactly process signals from a magnetic recording medium.

As a result, the variable magnetization vector of the nonmagnetic conductive layer 4 can be readily adjusted in a desired direction and the spin-valve thin-film magnetic element exhibits a small quantity of asymmetry.

Herein the term "asymmetry" indicates the degree of the asymmetry of the read output waveform. When the read output waveform is symmetry, the asymmetry becomes zero. When the variable magnetization vector of the free magnetic layer is orthogonal to the pinned magnetization vector of the pinned magnetic layer, the asymmetry is zero. If the asymmetry is much larger than zero, the spin-valve thin-film magnetic element cannot exactly read information on a medium. As the asymmetry approaches zero, the spin-valve thin-film magnetic element can process read output with high reliability.

Third Embodiment

A third embodiment of the spin-valve thin-film magnetic element and the thin-film magnetic head provided therewith in accordance with the present invention will now be described.

Figure 3:
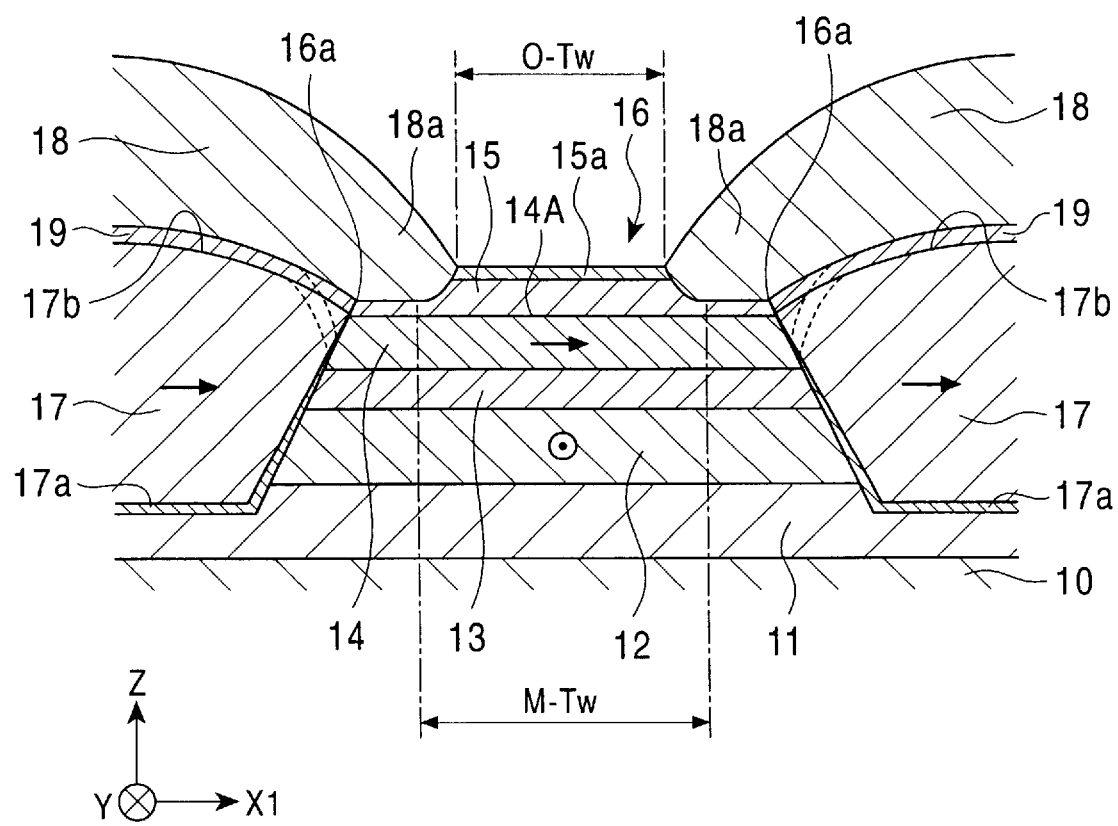
FIG. 3 is a cross-sectional view of a third embodiment of the spin-valve thin-film magnetic element in accordance with the present invention when viewed from a face opposing a recording medium.

FIG. 3 is a cross-sectional view of the third embodiment of the spin-valve thin-film magnetic element in accordance with the present invention when viewed from a face opposing a recording medium. This spin-valve thin-film magnetic element is a type of giant magnetoresistive (GMR) element based on giant magnetoresistive effects. This spin-valve thin-film magnetic element is provided, for example, at a trailing end of a floating slider of a hard disk drive to detect recording magnetic fields from a hard disk. A magnetic recording medium such as a hard disk moves in the Z direction in the drawing, whereas the magnetic recording medium generates leakage magnetic fields in the Y direction in the drawing.

The spin-valve thin-film magnetic element of the third embodiment is a bottom-type single spin-valve thin-film magnetic element including a substrate, and a composite having an antiferromagnetic layer, a pinned magnetic layer, a nonmagnetic conductive layer, and a free magnetic layer, which are provided in that order on the substrate.

With reference to FIG. 3, an antiferromagnetic layer 11 is formed on a substrate 10. A pinned magnetic layer 12 is formed on the antiferromagnetic layer 11. A nonmagnetic conductive layer 13 composed of copper or the like is formed on the pinned magnetic layer 12, and a free magnetic layer 14 is formed on the nonmagnetic conductive layer 13. A protective layer 15 composed of Ta or the like is formed on the free magnetic layer 14, and the upper face of the protective layer 15 is provided with an oxide layer 15a of tantalum oxide.

These layers 11 to 15a constitute a composite 16 having a trapezoidal cross-section.

Hard bias layers 17 and electrode layers 18 are provided on both sides of the composite 16. The hard bias layers 17 are provided on bias underlayers 17a which are provided on both peripheral surfaces of the antiferromagnetic layer 11 extending to both sides. The electrode layers 18 are provided on interlayers 19 which are composed of tantalum or chromium and are provided on the hard bias layers 17.

In the top-type spin-valve thin-film magnetic elements in the first and second embodiments in FIGS. 1 and 2, respectively, a relatively large fraction of sensing current flows in the lower portion of the composite including the pinned magnetic layer, the nonmagnetic conductive layer, and the free magnetic layer from the hard bias layers via the antiferromagnetic layer. In contrast, in the bottom-type spin-valve thin-film magnetic element, a larger fraction of sensing current directly flows in the composite without passing through the antiferromagnetic layer having relatively high resistivity.

Thus, the bottom-type configuration can reduce possible occurrence in side reading and is more suitable for a higher magnetic recording density due to a narrower magnetic recording track width, which corresponds to O-Tw in FIG. 3. Moreover, the overlay sections 18a of the electrode layers 18 are preferably into contact with the composite 16 to reduce contact resistance and to further reduce the shunt component from the hard bias layers 17 to the lower portion of the composite 16.

Preferably, the antiferromagnetic layer 11 has a thickness in a range of 80 to 150 angstroms and is composed of a PtMn alloy. The PtMn alloy exhibits higher corrosion resistance compared with NiMn alloys and FeMn alloys which have been conventionally used in the antiferromagnetic layer, and has a high blocking temperature and a large exchange coupling magnetic field (exchange anisotropic magnetic field).

The PtMn alloy may be replaced with an X—Mn or Pt—Mn—X' alloy wherein X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr. The Pt or X content in the PtMn alloy or the X—Mn alloy, respectively, is in a range of preferably 37 to 63 atomic percent and more preferably 47 to 57 atomic percent. In the Pt—Mn—X' alloy, the total content of X' and Pt is in a range of preferably 37 to 63 atomic percent and more preferably 47 to 57 atomic percent, and the X' content is preferably in a range of 0.2 to 10 atomic percent. When X' is at least one element selected from Pd, Ru, Ir, Rh, and Os, the X' content is preferably in a range of 0.2 to 40 atomic percent.

The antiferromagnetic layer 11 is formed of one of these alloys and is annealed so that the antiferromagnetic layer 11 generates a large exchange coupling magnetic field. When the PtMn alloy is used, the resulting antiferromagnetic layer 11 exhibits a high exchange coupling magnetic field exceeding 48 kA/m and particularly 64 kA/m and a significantly high blocking temperature of 380° C., wherein the antiferromagnetic layer 2 loses the exchange coupling magnetic field above the blocking temperature.

The pinned magnetic layer 12 is a ferromagnetic thin film composed of, for example, elemental cobalt, a NiFe alloy, a CoNiFe alloy, a CoFe alloy, or a CoNi alloy. Preferably, the thickness of the pinned magnetic layer 12 is approximately 40 angstroms. In a more preferred embodiment, the pinned magnetic layer 3 is composed of Co.

The pinned magnetic layer 12 is in contact with the antiferromagnetic layer 11. An exchange coupling magnetic field (exchange anisotropic magnetic field) is generated at the interface between the pinned magnetic layer 12 and the antiferromagnetic layer 11 by annealing in a magnetic field so that the magnetization vector of the pinned magnetic layer 12 is pinned, for example, in a direction opposite to the Y direction, as shown in FIG. 3.

A larger exchange coupling magnetic field contributes to stabilization of the magnetization of the pinned magnetic layer 12. Moreover, the use of the PtMn alloy in the antiferromagnetic layer 11 ensures a thermally stable magnetic state of the pinned magnetic layer 12, because the antiferromagnetic layer 11 exhibits a high blocking temperature and generates a large exchange coupling magnetic field (exchange anisotropic magnetic field) at the interface with the pinned magnetic layer 12.

Preferably, the nonmagnetic conductive layer 13 is composed of copper or the like and has a thickness of 20 to 25 angstroms.

Preferably, the free magnetic layer 14 is a single layer composed of a CoFe-based alloy. The thickness of the free magnetic layer 14 is in a range of preferably 10 to 50 angstroms and more preferably 15 to 30 angstroms. When the thickness of the free magnetic layer 14 exceeds the upper limit, the shunt loss of the sensing current occurs. When the thickness is less than the lower limit, the average free path of spin-up and spin-down conduction electrons moving in the free magnetic layer 14 decreases. Both the cases cause a decreased rate of change in resistance ($\Delta R/R$) in the GMR effects, resulting in undesirable deterioration of read output characteristics of the spin-valve thin-film magnetic element.

The free magnetic layer 14 may be a single CoFeNi layer in this embodiment. In the CoFeNi layer, cobalt may be enriched. For example, the Co/Fe/Ni ratio may be 70/15/15 by atomic percent. Such a cobalt-enriched composition causes an increased rate of change in resistance ($\Delta R/R$).

Moreover, a composition represented by a ratio near the above ratio exhibits a magnetostriction of substantially zero.

In the free magnetic layer 14, the average diameter, in the thickness direction (Z direction in FIG. 3), of crystal grains constituting the free magnetic layer 14 is preferably the same as or less than the thickness of the free magnetic layer 14, and the average diameter, in the plain (X1 and Y directions in FIG. 3) of the free magnetic layer 14, is preferably 150 angstroms or less, and more preferably 100 angstroms or less.

When the average diameter of the crystal grains exceeds 150 angstroms in the plain (X1 and Y direction in FIG. 3) of the free magnetic layer 14, the free magnetic layer 14 exhibits large crystal magnetic anisotropy due to individual crystal grains because the CoFe-based alloy originally exhibits larger crystal magnetic anisotropy compared to FeNi-based alloys. In such a case, when an external magnetic field to be detected is applied, the magnetization vector of the free magnetic layer 14 does not sensitively rotate, resulting in occurrence in magnetic hysteresis. As a result, soft magnetic characteristics, such as a coercive force Hc and anisotropic dispersion, are impaired, and the spin-valve thin-film magnetic element undergoes deterioration of read output characteristics due to low detecting sensitivity.

When average diameter of the crystal grains exceeds 100 angstroms in the plain of the free magnetic layer 14, the crystal magnetic anisotropy of the CoFe-based alloy is not readily moderated in the plain of the free magnetic layer 14, resulting in deterioration of soft magnetic characteristics of the free magnetic layer 14.

When the average crystal grain diameter of the free magnetic layer 14 is 30 angstroms or less, resistance increases due to grain boundary scattering of conduction electrons in the vicinity of individual crystal grains, although crystal magnetic anisotropy of individual crystal grains are moderated to improve soft magnetic characteristics. As a result, the spin-valve thin-film magnetic element exhibits a decreased rate ($\Delta R/R$) of change in resistance in the GMR effects and deterioration of read output characteristics.

In the crystal grains constituting the free magnetic layer 14, the total volume of the crystal grains in which the <111> direction of the crystal grains as the easy axis is predominantly oriented substantially in a direction (Z direction in FIG. 3) perpendicular to the plain of the free magnetic layer 14 (hereinafter referred to as "the volume of predominantly oriented crystal grains") is preferably 50 percent or less and more preferably 30 percent or less of the volume of the free magnetic layer.

When the volume of predominantly oriented crystal grains exceeds 50 percent or less of the volume of the free magnetic layer 14, the crystal magnetic anisotropy of the crystal grains in which the easy axis is predominantly oriented in the Z direction in FIG. 3 is enhanced. Thus, the magnetization vector of the free magnetic layer 14 does not sensitively rotate even when an external magnetic field to be detected is applied, resulting in occurrence in magnetic hysteresis. As a result, soft magnetic characteristics are impaired, and the spin-valve thin-film magnetic element undergoes deterioration of read output characteristics due to low detecting sensitivity. Furthermore, the coercive force Hc of the free magnetic layer 14 undesirably increases to decrease the detection sensitivity. Accordingly, the above-mentioned total volume of the crystal grains is preferably 50 percent or less, and more preferably 30 percent or less of the volume of the free magnetic layer 14.

Among the crystal grains in the free magnetic layer 14, the volume of the crystal grains in which the <111> direction of the crystal grains as the easy axis, which is perpendicular to the (111) plane of a cubic crystal, is predominantly oriented substantially in a direction (Z direction in FIG. 3) perpendicular to the plain of the free magnetic layer 14 is determined by the observation of the cross section of the pinned magnetic layer 12 using the TEM, as in the first embodiment.

The nonmagnetic conductive layer 13 is composed of copper (Cu) or the like and generally has a thickness in a range of 15 to 30 angstroms. The protective layer 15 is composed of tantalum (Ta) or the like and is provided with a surface oxide layer 7a thereon.

The bias underlayers 17a function as buffer and orientation films and are preferably composed of chromium (Cr) or the like. The thickness of the bias underlayers 17a is in a range of, for example, 20 to 50 angstroms and preferably approximately 35 angstroms. The interlayers 19 are composed of, for example, tantalum (Ta) and have a thickness of approximately 50 angstroms. These bias underlayers 17a and interlayers 19 function as diffusion barriers when the spin-valve thin-film magnetic element is exposed at an elevated temperature in a curing step, such as UV curing or hard baking, of an insulating resist in a subsequent production process of an inductive write head. Thus, these layers prevent thermal diffusion between the hard bias layers 17 and neighboring layers thereof and thus deterioration of the hard bias layers 17.

The hard bias layers 17 generally have a thickness in a range of 200 to 500 angstroms, and are preferably composed of, for example, a Co—Pt alloy, a Co—Cr—Pt alloy, or Co—Cr—Ta alloy.

Since the hard bias layers 17 are magnetized in the X1 direction in the drawing, the magnetization vector of the free magnetic layer 14 is oriented in the X1 direction in the drawing. Thus, the variable magnetization vector of the free magnetic layer 5 and the pinned magnetization vector of the pinned magnetic layer 3 define an angle of 90° (are perpendicular to each other).

Preferably, the hard bias layers 17 are arranged at a level which is the same as that of the free magnetic layer 14, and have a thickness which is larger than the thickness of the free magnetic layer 14. The upper faces 17b of the hard bias layers 17 are more distant from the substrate 10 than the upper face 14A of the free magnetic layer 14 (that is, above the upper face 14A in FIG. 3), and the lower faces of the hard bias layers 17 is nearer the substrate 10 than the lower face of the free magnetic layer 14 (that is, below the lower face of the free magnetic layer 14 in FIG. 3).

In this embodiment, as shown by broken lines in FIG. 3, the junction between each hard bias layer 17 and a side of the composite 16 may be arranged at a level below the upper face of the free magnetic layer 14 (lower side in FIG. 3) and below the highest position (the upper end of the hard bias layer 17 in FIG. 3) of the hard bias layer 17. In such a configuration, a leakage magnetic flux from the hard bias layers 17 is less absorbed in the upper shield layer above the composite 16 and thus effectively affects the free magnetic layer 14. The free magnetic layer 14 can be more readily aligned in a single-domain state.

As described above, the hard bias layers 17 and the free magnetic layer 14 are arranged in the same level. Such an arrangement indicates magnetic coupling between the hard bias layers 17 and the free magnetic layer 14 and includes a state in that the thickness of the junction therebetween is smaller than the thickness of the free magnetic layer 14. The hard bias layers 17 and the free magnetic layer 14 may be magnetically coupled with each other through other layers, such as the bias underlayers 17a and the interlayers 19, in addition to the above-mentioned direct coupling.

Preferably, each of the electrode layers 18 has a single-layer or multilayer configuration composed of at least one element selected from Cr, Au, Ta, and W to reduce the resistance value thereof. The electrical resistance is effectively reduced when Cr is selected as a material for the electrode layers 18 and is deposited by epitaxy on the Ta interlayers 19.

The electrode layers 18 extend to the upper face of the composite 16 to form overlay sections 18a which are in contact with the composite 16.

Herein, the size of a portion, not provided with the overlay sections 18a in the track width direction (in the X1 direction in FIG. 3), on the composite 16 is equal to the optical track width O-Tw. The width of the sensitive region of the composite is a magnetic track width M-Tw. The magnetic track width M-Tw being the sensing region of the composite 16 is defined as a region exhibiting an output which is at least 50% of the maximum read output when a spin-valve thin-film magnetic element having electrode layers provided only on both sides of a composite is scanned on a microtrack including recorded signals in the track width direction. The insensitive region of the composite is defined as a region exhibiting an output which is less than 50% of the maximum read output.

In this embodiment, the optical track width O-Tw is substantially the same as or slightly smaller than the magnetic track width M-Tw. In such case, the sensing current flows in the composite 16 directly from the electrode layers 18 rather than via the hard bias layers 17. The sensing current flows in the electrode layers 18, the free magnetic layer 14, and the nonmagnetic conductive layer 13 without passing through the antiferromagnetic layer which has a specific resistivity of 200 $\mu\Omega cm^{-1}$ which is one order of magnitude larger than the order of 10 $\mu\Omega cm^{-1}$ of the free magnetic layer and the pinned magnetic layer. Thus, the bottom-type configuration prevents a large shunt component which directly flows in the lower portion of the antiferromagnetic layer via the hard bias layers, unlike the top-type configuration.

In this case, the contact area between the composite 16 and the electrode layers 18 can be increased. Thus, the contact resistance, which does not contribute to the magnetoresistive effect, is reduced, resulting in improved read characteristics of the element.

In the spin-valve thin-film magnetic element shown in FIG. 3, the electrode layers 18 lead a sensing current to the composite 16. When a magnetic field is applied from the magnetic recording medium in the Y direction in FIG. 3, the magnetization vector of the free magnetic layer 14 varies from the X1 direction to the Y direction in the drawing. In this state, spin-dependent scattering of conduction electrons occurs due to so-called GMR effects at the interface between the nonmagnetic conductive layer 13 and the free magnetic layer 14 to detect the leakage magnetic field from the magnetic recording medium as a change in electrical resistance.

Since the free magnetic layer 14 is a single CoFeNi layer in the spin-valve thin-film magnetic element of this embodiment, the spin-valve thin-film magnetic element does not undergo deterioration of read output characteristics, which is essential for a conventional free magnetic layer having a double layer configuration including a NiFe sublayer and a Co sublayer and inevitably undergoing the formation of an oxide layer at the interface between these sublayers.

Since no NiFe sublayer is provided, interdiffusion between the nonmagnetic conductive layer composed of copper or the like and the NiFe sublayer does not occur in this embodiment. Thus, individual layers can maintain properties thereof and the spin-valve thin-film magnetic element does not undergo deterioration of read output characteristics due to a decreased rate of change in resistance ($\Delta R/R$) in the GMR effects.

In this embodiment, the free magnetic layer 14 is a single layer composed of a CoFe-based alloy. The thickness of the free magnetic layer 14 is set to be in a range of preferably 10 to 50 angstroms and more preferably 15 to 30 angstroms. Thus, the shunt loss of the sensing current does not occur. Moreover, the average free path of spin-up and spin-down conduction electrons moving in the free magnetic layer 5 does not decrease. As a result, the spin-valve thin-film magnetic element does not undergo the deterioration of read output characteristics due to a decreased rate of change in resistance ($\Delta R/R$) in the GMR effects.

In this embodiment, the average diameter, in the thickness direction (Z direction in FIG. 3), of crystal grains constituting the free magnetic layer 14 is preferably the same as or less than the thickness of the free magnetic layer 14, and the average diameter, in the plain (X1 and Y directions in FIG. 3) of the free magnetic layer 14, is preferably 150 angstroms or less and more preferably 100 angstroms or less. Thus, crystal magnetic anisotropy of individual crystal grains is not enhanced in the free magnetic layer 14 regardless of the use of the CoFe-based alloy having larger crystal magnetic anisotropy compared to a FeNi-based alloy. Thus, the magnetization vector of the free magnetic layer 14 can sensitively rotate in response to the applied external magnetic field. Moreover, magnetic hysteresis does not occur, and thus soft magnetic characteristics do not decrease. Since the crystal magnetic anisotropy of individual crystal grains is moderated to improve the soft magnetic characteristics. Accordingly, the spin-valve thin-film magnetic element does not undergo the deterioration of the read output characteristics due to decreased detection sensitivity.

Also, an increase in resistance due to grain boundary scattering of conduction electrons in the vicinity of the interfaces of crystal grains is prevented. As a result, the spin-valve thin-film magnetic element does not undergo the deterioration of the read output characteristics.

Since the average diameter of the crystal grains is set to be 100 angstroms or less, the crystal magnetic anisotropy of the CoFe-based alloy is not readily moderated in the plain of the element to prevent the deterioration of the soft magnetic characteristics of the free magnetic layer. Accordingly, the spin-valve thin-film magnetic element does not undergo the deterioration of the read output characteristics due to a decreased rate of change in resistance ($\Delta R/R$) in the GMR effects.

In the crystal grains constituting the free magnetic layer 14, the total volume of the crystal grains in which the <111> direction of the crystal grains is predominantly oriented substantially in a direction (Z direction in FIG. 3) perpendicular to the plain of the free magnetic layer 14 (hereinafter referred to as "the volume of predominantly oriented crystal grains") is 50 percent or less and more preferably 30 percent or less of the volume of the free magnetic layer. Thus, crystal magnetic anisotropy of individual crystal grains is not enhanced in the free magnetic layer 14 and the free magnetic layer 14 maintains an adequate level of coercive force Hc. Accordingly, the magnetization vector of the free magnetic layer 14 can sensitively rotate in response to the applied external magnetic field. Moreover, magnetic hysteresis does not occur, and thus soft magnetic characteristics do not decrease. Since the crystal magnetic anisotropy of individual crystal grains is moderated to improve the soft magnetic characteristics. Accordingly, the spin-valve thin-film magnetic element exhibits an adequate rate of change in resistance ($\Delta R/R$) due to the GMR effects and does not undergo the deterioration of the read output characteristics due to a decreased detection sensitivity.

Also, in this embodiment, as shown by broken lines in FIG. 3, the junction between each hard bias layer 17 and a side of the composite 16 may be arranged at a level below the upper face of the free magnetic layer 14 (lower side in FIG. 3) and below the highest position (the upper end of the hard bias layer 17 in FIG. 3) of the hard bias layer 17. The free magnetic layer 14 can be more readily aligned in a single-domain state.

The free magnetic layer 14 can be more readily aligned to a single-domain state.

Fourth Embodiment

A fourth embodiment of the spin-valve thin-film magnetic element and the thin-film magnetic head provided therewith of the present invention will now be described.

Figure 4:
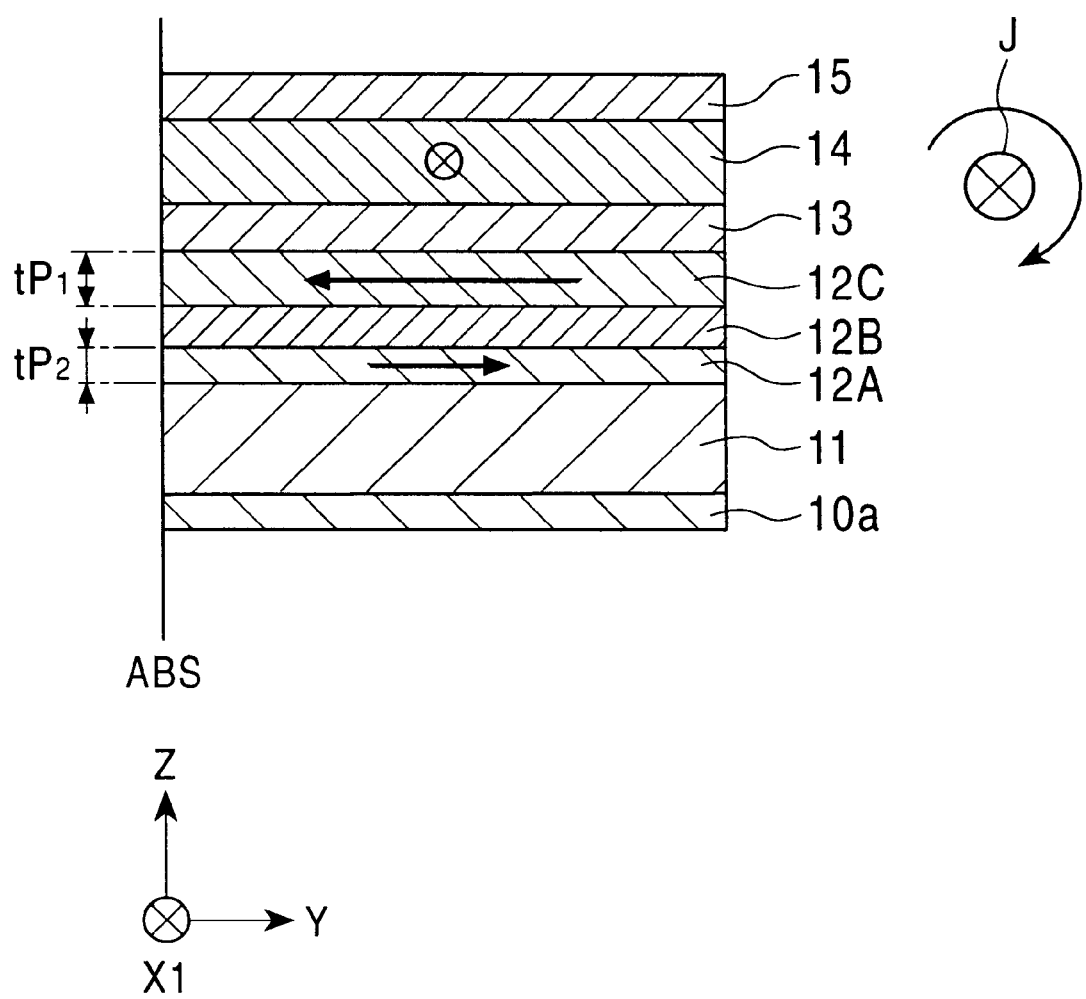
FIG. 4 is a schematic cross-sectional view of a fourth embodiment of the spin-valve thin-film magnetic element in accordance with the present invention.
Figure 5:
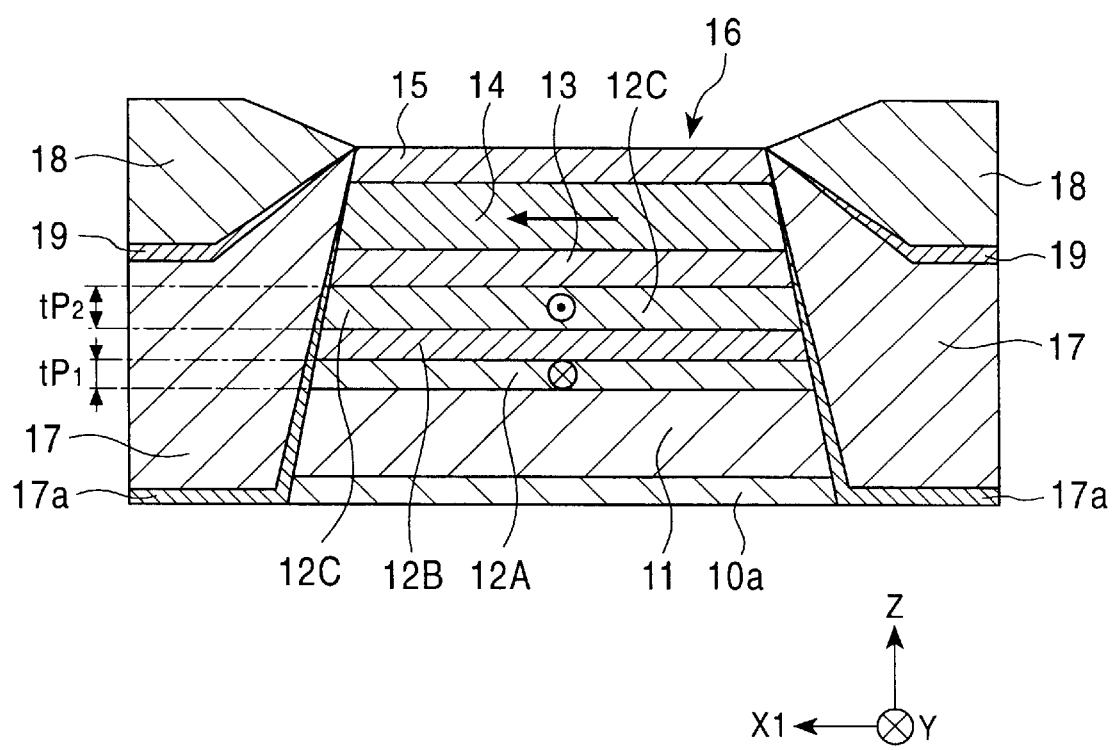
FIG. 5 is a cross-sectional view of the fourth embodiment of the spin-valve thin-film magnetic element in accordance with the present invention when viewed from a face opposing a recording medium.

FIG. 4 is a schematic cross-sectional view of the fourth embodiment of the spin-valve thin-film magnetic element in accordance with the present invention and FIG. 5 is a cross-sectional view of the spin-valve thin-film magnetic element shown in FIG. 4 when viewed from a face opposing a recording medium. This spin-valve thin-film magnetic element is also a bottom-type single spin-valve thin-film magnetic element, as in the third embodiment shown in FIG. 3.

The spin-valve thin-film magnetic element of the fourth embodiment differs from that of the third embodiment in that the pinned magnetic layer comprises a first pinned magnetic sublayer 12A, a second pinned magnetic sublayer 12C, and a nonmagnetic interlayer 12B provided therebetween. The magnetization vector of the first pinned magnetic sublayer 12A and the magnetization vector of the second pinned magnetic sublayer 12C are antiparallel to each other, and thus the pinned magnetic layer is in a synthetic ferri-pinned magnetic state. That is, this spin-valve thin-film magnetic element is of a so-called synthetic ferri-pinned type.

Shielding layers are formed above and below the spin-valve thin-film magnetic element with gap layers provided therebetween to constitute a thin-film magnetic read (MR) head. An inductive recording head is deposited on the thin-film magnetic read head.

This spin-valve thin-film magnetic element is provided, for example, at a trailing end of a floating slider of a hard disk drive to detect recording magnetic fields from a hard disk. A magnetic recording medium such as a hard disk moves in the Z direction in the drawings, whereas the magnetic recording medium generates leakage magnetic fields in the Y direction in the drawings.

With reference to FIGS. 4 and 5, in this embodiment, the bottommost layer formed on a substrate is an underlying layer 10a composed of a nonmagnetic material such as tantalum (Ta). An antiferromagnetic layer 11 is formed on the underlying layer 10a and the first pinned magnetic sublayer 12A is formed on the antiferromagnetic layer 11.

Moreover, the nonmagnetic interlayer 12B is formed on the first pinned magnetic sublayer 12A and the second pinned magnetic sublayer 12C is formed on the nonmagnetic interlayer 12B. The first pinned magnetic sublayer 12A and the second pinned magnetic sublayer 12C are composed of, for example, elemental cobalt (Co), a NiFe alloy, a CoNiFe alloy, or a CoFe alloy.

Preferably, the antiferromagnetic layer 11 in this embodiment is composed of a PtMn alloy. The PtMn alloy exhibits higher corrosion resistance compared with NiMn alloys and FeMn alloys, which have been conventionally used in the antiferromagnetic layer, and has a high blocking temperature and a large exchange coupling magnetic field (exchange anisotropic magnetic field). The PtMn alloy may be replaced with an X—Mn or Pt—Mn—X' alloy wherein X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

Arrows shown in the first pinned magnetic sublayer 12A and the second pinned magnetic sublayer 12C in FIG. 4 indicate the magnitudes and the directions of the magnetic moments. Each magnetic moment is defined by a product of the saturation magnetization (Ms) and the thickness (t) of the layer.

The first pinned magnetic sublayer 12A and the second pinned magnetic sublayer 12C in FIG. 4 are composed of the same material, for example, elemental cobalt, a NiFe alloy, a CoNiFe alloy, a CoFe alloy, or a CoNi alloy, as described above. Furthermore, the thickness $tP_2$ of the second pinned magnetic sublayer 12C is larger than the thickness $tP_1$ of the first pinned magnetic sublayer 12A. Thus, the magnetic moment of the second pinned magnetic sublayer 12C is larger than that of the first pinned magnetic sublayer 12A. This embodiment is characterized in that the first pinned magnetic sublayer 12A and the second pinned magnetic sublayer 12C have different magnetic moments. Thus, the thickness $tP_1$ of the first pinned magnetic sublayer 12A may be larger than the thickness $tP_2$ of the second pinned magnetic sublayer 12C.

As shown in FIGS. 4 and 5, the first pinned magnetic sublayer 12A is magnetized in the Y direction (height direction of the element) in the drawings, away from the recording medium, whereas the second pinned magnetic sublayer 12C is magnetized antiparallel to the magnetization vector of the first pinned magnetic sublayer 12A.

Figure 11:
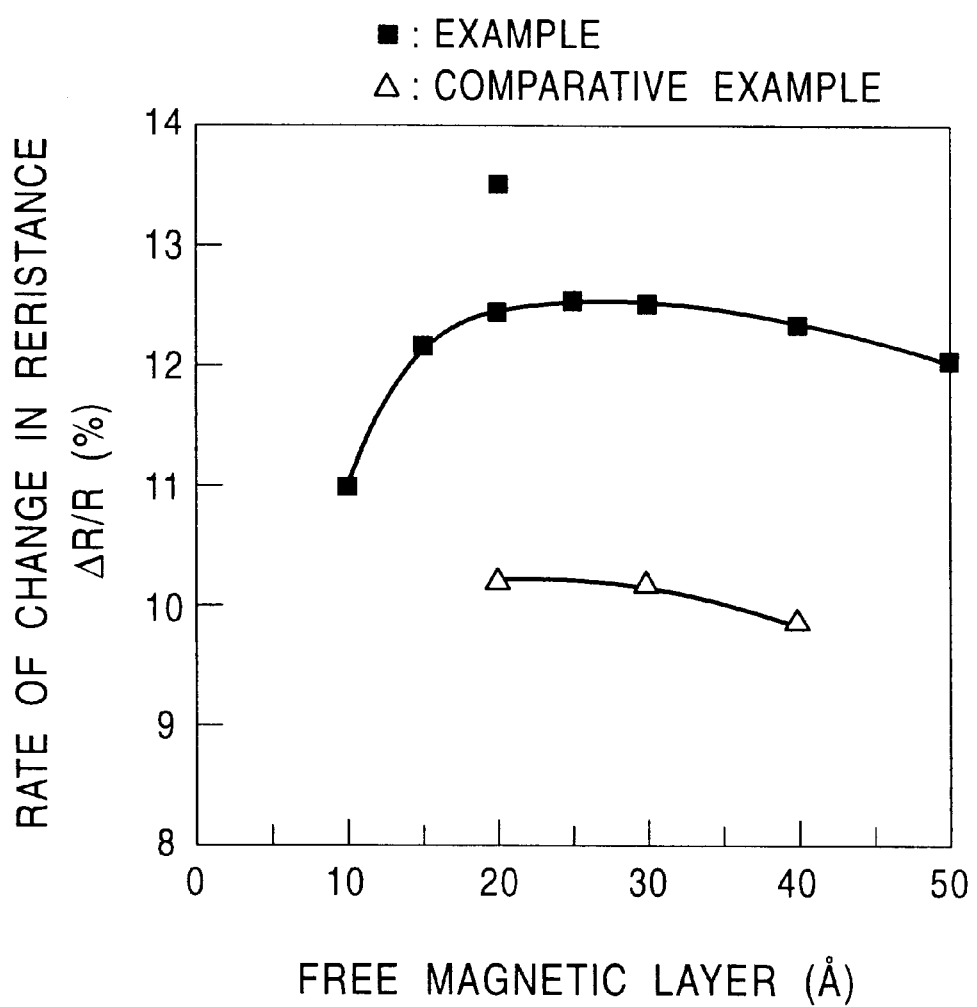
FIG. 11 is a graph of the relationship between the thickness and the rate of change in resistance in free magnetic layers of spin-valve thin-film magnetic elements.

The first pinned magnetic sublayer 12A is in contact with the antiferromagnetic layer 11 and is annealed in a magnetic field so as to form an exchange coupling magnetic field (exchange anisotropic magnetic field) at the interface between the first pinned magnetic sublayer 12A and the antiferromagnetic layer 11 and to magnetize the first pinned magnetic sublayer 12A, for example, in the Y direction in the drawings, as shown in FIG. 11. When the magnetization vector of the first pinned magnetic sublayer 12A is pinned in the Y direction in the drawings, the magnetization vector of the second pinned magnetic sublayer 12C is pinned so as to be antiparallel to the magnetization vector of the first pinned magnetic sublayer 12A.

In this embodiment, the thickness $tP_1$ of the first pinned magnetic sublayer 12A and the thickness $tP_2$ of the second pinned magnetic sublayer 12C are optimized. The ratio of the thickness $tP_1$ to the thickness $tP_2$ is preferably in a range of 0.22 to 0.95 or 1.05 to 0.4. A large exchange coupling magnetic field is obtained within this range. When the thickness $tP_1$ and the thickness $tP_2$ themselves, however, are large within the above range, the exchange coupling magnetic field tends to decrease. Thus, in this embodiment, the thickness $tP_1$ and the thickness $tP_2$ are optimized. Preferably, the thickness $tP_1$ and the thickness $tP_2$ are in a range of 10 to 70 angstroms, and the absolute value of the difference between the thickness $tP_1$ and the thickness $tP_2$ is at least 2 angstroms.

By optimizing the thicknesses and the thickness ratio, at least 4,000 A/m of exchange coupling magnetic field (Hex*) is obtainable. Herein, the exchange coupling magnetic field indicates the magnitude of the external magnetic field when the rate of change in resistance is a half the maximum rate of change in resistance ($\Delta R/R$). The exchange coupling magnetic field (Hex*) includes all types of magnetic fields, such as an exchange coupling magnetic field (exchange anisotropic magnetic field) generated at the interface between the antiferromagnetic layer 11 and the first pinned magnetic sublayer 12A and an exchange coupling magnetic field (RKKY interaction) generated between the first pinned magnetic sublayer 12A and the second pinned magnetic sublayer 12C.

More preferably, the ratio of the thickness $tP_1$ of the first pinned magnetic sublayer 12A to the thickness $tP_2$ of the second pinned magnetic sublayer 12C is in a range of 0.53 to 0.95 or 1.05 to 1.8. Within this range, it is preferable that both the thickness $tP_1$ and the thickness $tP_2$ be within a range of 10 to 50 angstroms and the absolute value of the difference between the thickness $tP_1$ and the thickness $tP_2$ be at least 2 angstroms within the above range. When the thickness $tP_1$, the thickness $tP_2$, and the ratio thereof are optimized within the above ranges, an exchange coupling magnetic field of at least 80 kA/m is obtainable.

When the thicknesses and the ratio thereof are within the above range, a large exchange coupling magnetic field (Hex*) and a high rate of change in resistance ($\Delta R/R$) are achieved. A larger exchange coupling magnetic field can stabilize the antiparallel arrangement between the magnetic vector of the first pinned magnetic sublayer 12A and the magnetic vector of the second pinned magnetic sublayer 12C. Since the PtMn alloy having a high blocking temperature and generating a large exchange coupling magnetic field at the interface with the first pinned magnetic sublayer 12A is used as the antiferromagnetic layer 11 in this embodiment, the antiparallel arrangement between the magnetization vector of the first pinned magnetic sublayer 12A and the magnetization vector of the second pinned magnetic sublayer 12C is also thermally stable.

When the first pinned magnetic sublayer 12A and the second pinned magnetic sublayer 12C are composed of the same material, and when the thickness $tP_1$ of the first pinned magnetic sublayer 12A and the thickness $tP_2$ of the second pinned magnetic sublayer 12C are the same, it is confirmed by experiments that the exchange coupling magnetic field (Hex*) and the $\Delta R/R$ extremely decrease.

When the magnetic moment $Ms \cdot tP_1$ of the first pinned magnetic sublayer 12A and the magnetic moment $Ms \cdot tP_2$ of the second pinned magnetic sublayer 12C are the same, the magnetization vector of the first pinned magnetic sublayer 12A and the magnetization vector of the second pinned magnetic sublayer 12C are not antiparallel to each other, and dispersed components of the magnetization vectors (the magnitude of magnetic moments in random directions) increase. As a result, a proper relative angle is not defined to the free magnetic layer 14.

In order to solve such a problem, the $Ms \cdot tP_1$ of the first pinned magnetic sublayer 12A and the $Ms \cdot tP_2$ of the second pinned magnetic sublayer 12C must be set at different values. When the first pinned magnetic sublayer 12A and the second pinned magnetic sublayer 12C are composed of the same material, the thickness $tP_1$ and the thickness $tP_2$ must be different from each other. Accordingly, a ratio of the thickness $tP_1$ to the thickness $tP_2$ in a range of 0.95 to 1.05 is excluded from the proper range since the thickness $tP_1$ and the thickness $tP_2$ are almost the same within this range.

When an antiferromagnetic material such as the above-mentioned PtMn alloy, which generates an exchange coupling magnetic field (exchange anisotropic magnetic field) at the interface with the first pinned magnetic sublayer 12A by annealing in a magnetic field, is used as the antiferromagnetic layer 11 as in this embodiment, the direction and the magnitude of the magnetic field applied during the annealing must be adequately controlled even if the $Ms \cdot tP_1$ of the first pinned magnetic sublayer 12A and the $Ms \cdot tP_2$ of the second pinned magnetic sublayer 12C are set to be different from each other, otherwise the magnetization vector of the first pinned magnetic sublayer 12A and the magnetization vector of the second pinned magnetic sublayer 12C contains large amounts of dispersed components or are not oriented in desired directions.

TABLE 1

| Direction of Magnetic Field during Annealing | (1) 8 to 80 kA/m to the Left | (2) 8 to 80 kA/m to the Right | (3) at least 400 kA/m to the Right | (4) at least 400 kA/m to the Left |
|---|---|---|---|---|
| Magnetization Vector of First Pinned Magnetic Sublayer | ← | → | → | ← |
| Magnetization Vector of Second Pinned Magnetic Sublayer | → | ← | → | ← |

Table 1 shows the magnetization vector of the first pinned magnetic sublayer 12A and the magnetization vector of the second pinned magnetic sublayer 12C when the magnitude and the direction of the magnetic field during the annealing is changed in a case in which the $Ms \cdot tP_1$ of the first pinned magnetic sublayer 12A is larger than the $Ms \cdot tP_2$ of the nonmagnetic interlayer 12B.

In case (1) in Table 1, a magnetic field of 8 to 80 kA/m is applied in the left direction in the drawing during the annealing. Since the $Ms \cdot tP_1$ of the first pinned magnetic sublayer 12A is larger than the $Ms \cdot tP_2$ of the nonmagnetic interlayer 12B, the magnetization vector of the first pinned magnetic sublayer 12A is predominantly oriented in the left direction in the drawing whereas the magnetization vector of the second pinned magnetic sublayer 12C is antiparallel to the magnetization vector of the first pinned magnetic sublayer 12A by the exchange coupling magnetic field (RKKY interaction) with the first pinned magnetic sublayer 12A.

In case (2) in Table 1, when a magnetic field of 8 to 80 kA/m is applied in the right direction during the annealing, the magnetization vector of the first pinned magnetic sublayer 12A is predominantly oriented in the right direction whereas the magnetization vector of the second pinned magnetic sublayer 12C is antiparallel to the magnetization vector of the first pinned magnetic sublayer 12A.

In case (3) in Table 1, a magnetic field of at least 400 kA/m is applied in the right direction. The magnetization vector of the first pinned magnetic sublayer 12A is predominantly oriented in the right direction. Since the exchange coupling magnetic field (RKKY interaction) between the first pinned magnetic sublayer 12A and the second pinned magnetic sublayer 12C is approximately 80 to 400 kA/m, the second pinned magnetic sublayer 12C is also magnetized in the direction of the applied magnetic field of at least 400 kA/m (right direction). Similarly, in case (4) in Table 1, a magnetic field of at least 400 kA/m is applied in the left direction. Both the magnetization vector of the first pinned magnetic sublayer 12A and the magnetization vector of the second pinned magnetic sublayer 12C are oriented in the left direction in the drawing.

TABLE 2

| Direction of Magnetic Field during Annealing | (1) 8 to 80 kA/m to the Left | (2) 8 to 80 kA/m to the Right | (3) at least 400 kA/m to the Right | (4) at least 400 kA/m to the Left |
|---|---|---|---|---|
| Magnetization Vector of First Pinned Magnetic Sublayer | → | ← | → | ← |
| Magnetization Vector of Second Pinned Magnetic Sublayer | ← | → | → | ← |

Table 2 shows the magnetization vector of the first pinned magnetic sublayer 12A and the magnetization vector of the second pinned magnetic sublayer 12C when the magnitude and the direction of the magnetic field during the annealing is changed in a case in which the Ms·tP$_1$ of the first pinned magnetic sublayer 12A is smaller than the Ms·tP$_2$ of the second pinned magnetic sublayer 12C.

In case (1) in Table 2, a magnetic field of 8 to 80 kA/m is applied in the left direction in the drawing during the annealing. Since the Ms·tP$_1$ of the first pinned magnetic sublayer 12A is smaller than the Ms·tP$_2$ of the second pinned magnetic sublayer 12C, the magnetization vector of the second pinned magnetic sublayer 12C is predominantly oriented in the left direction in the drawing whereas the magnetization vector of the first pinned magnetic sublayer 12A is antiparallel to the magnetization vector of the second pinned magnetic sublayer 12C by the exchange coupling magnetic field (RKKY interaction) with the second pinned magnetic sublayer 12C. In case (2) in Table 2, when a magnetic field of 8 to 80 kA/m is applied in the right direction during the annealing, the magnetization vector of the second pinned magnetic sublayer 12C is predominantly oriented in the right direction whereas the magnetization vector of the first pinned magnetic sublayer 12A is oriented in the left direction in the drawing.

In case (3) in Table 2, a magnetic field of at least 400 kA/m, which is larger than the exchange coupling magnetic field (RKKY interaction) between the first pinned magnetic sublayer 12A and the second pinned magnetic sublayer 12C, is applied in the right direction. Both the magnetization vector of the first pinned magnetic sublayer 12A and the magnetization vector of the second pinned magnetic sublayer 12C are oriented in the right direction. In case (4) in Table 2, a magnetic field of at least 400 kA/m is applied in the left direction. Both the magnetization vector of the first pinned magnetic sublayer 12A and the magnetization vector of the second pinned magnetic sublayer 12C are oriented in the left direction in the drawing.

Accordingly, when the magnetization vector of the first pinned magnetic sublayer 12A is oriented in the right direction in the drawing, cases (2) and (3) in Table 1 and cases (1) and (3) in Table 2 are suitable combinations of the directions and the magnitudes of the magnetic field applied during the annealing.

In cases (2) and (3) in Table 1, the magnetization vector of the first pinned magnetic sublayer 12A having a larger Ms·tP$_1$ is predominantly oriented in the right direction due to the magnetic field applied during the annealing and is pinned in the right direction due to the exchange coupling magnetic field (exchange anisotropic magnetic field) generated at the interface with the antiferromagnetic layer 11 during the annealing.

In case (3) in Table 1, when the magnetic field of at least 400 kA/m is removed, the magnetization vector of the second pinned magnetic sublayer 12C is reversed to the left direction due to the exchange coupling magnetic field (exchange anisotropic magnetic field) generated at the interface with the first pinned magnetic sublayer 12A.

In cases (1) and (3) in Table 2, the magnetization vector of the first pinned magnetic sublayer 12A oriented in the right direction is pinned in the right direction due to the exchange coupling magnetic field (exchange anisotropic magnetic field) at the interface with the antiferromagnetic layer 11. In case (3) in Table 2, when the magnetic field of at least 400 kA/m is removed, the magnetization vector of the second pinned magnetic sublayer 12C is reversed and pinned in the left direction due to the exchange coupling magnetic field (exchange anisotropic magnetic field) generated at the interface with the first pinned magnetic sublayer 12A.

As shown in Tables 1 and 2, a range of 80 to 400 kA/m is not included from the proper range for the following reasons.

The magnetization vector of the pinned magnetic sublayer having a larger Ms·t tends to be oriented in the direction of the applied magnetic field. When the magnitude of the applied magnetic field is in a range of 80 to 400 kA/m, the magnetization vector of the other pinned magnetic sublayer having a smaller Ms·t also tends to be oriented in this direction. Thus, the magnetization vectors of these two pinned magnetic sublayers are not antiparallel but are dispersed in various directions. Accordingly, the magnitude of 80 to 400 kA/m is not included in the proper range. The magnitude of the magnetic field applied during the annealing is at least 8 kA/m in this embodiment, since a smaller magnitude is not effective for orientation of the magnetization vector of the pinned magnetic sublayer having a larger Ms·t in the applied magnetic field.

The above-mentioned magnitude of the magnetization vector and the method for controlling the direction of the magnetization vector are applicable to any antiferromagnetic material which requires annealing. For example, these are applicable to a NiMn alloy, which has been used in conventional antiferromagnetic layers.

As described above, the ratio of the thickness of the first pinned magnetic sublayer 12A to the thickness of the second pinned magnetic sublayer 12C is limited to a proper range to enhance the exchange coupling magnetic field (Hex*), to maintain the thermally stable antiparallel state (ferri-state) of the magnetization vector of the first pinned magnetic sublayer 12A and the magnetization vector of the second pinned magnetic sublayer 12C, and to ensure a rate of change in resistance (ΔR/R) which is comparable with conventional levels.

Optimization of the magnitude and the direction of the magnetic field during the annealing can control the magnetization vectors of the first and second pinned magnetic sublayers 12A and 12C, respectively, in desired directions.

As described above, the magnetic moment (magnetic thickness) is defined by the product of the saturation magnetization Ms and the thickness t. For example, the saturation magnetization Ms is approximately 10 T (Tesla) for bulk solid NiFe and approximately 1.7 T for bulk solid cobalt (Co). When the NiFe film has a thickness of 30 angstroms, the magnetic thickness of the NiFe film is 30 angstrom·Tesla. The magnetostatic energy of a ferromagnetic film is in proportion to the product of the magnetic thickness and an applied external magnetic field. When the ferromagnetic film having a larger magnetic thickness and the ferromagnetic film having a smaller magnetic thickness are in a ferri-magnetic state due to RKKY interaction via the nonmagnetic interlayer, the ferromagnetic film having a larger magnetic thickness is readily oriented in the external magnetic field.

When the antiferromagnetic layer is in direct contact with a nonmagnetic film composed of tantalum, ruthenium, or copper, or with an antiferromagnetic layer composed of a PtMn alloy, ferromagnetic atoms (Ni, Fe, and/or Co) are into direct contact with nonmagnetic atoms or antiferromagnetic atoms. Thus, it is known that the saturation magnetization Ms of the antiferromagnetic layer in the vicinity of the interface with the nonmagnetic film or the antiferromagnetic layer is smaller than the saturation magnetization Ms of the bulk solid. When the composite film of the ferromagnetic film with the nonmagnetic film or the antiferromagnetic layer are annealed, interdiffusion proceeds at the interface and the saturation magnetization Ms of the antiferromagnetic film has a distribution in the thickness direction. That is, the saturation magnetization Ms is small in the vicinity of the nonmagnetic film or the antiferromagnetic layer and reaches the saturation magnetization Ms of the bulk solid toward a direction away from the interface.

The reduction in the saturation magnetization Ms of the antiferromagnetic film in the vicinity of the nonmagnetic film or the antiferromagnetic layer depends on the material constituting the antiferromagnetic layer, the material constituting the antiferromagnetic film, and the annealing temperature. Thus, the exact saturation magnetization Ms must be determined under the specific conditions. The magnetic thickness in this embodiment is calculated also in consideration of a reduction in the saturation magnetization Ms caused by thermal diffusion from/to the nonmagnetic film or the antiferromagnetic layer.

In order to obtain an exchange coupling magnetic field at the interface between the PtMn film and the antiferromagnetic film, a diffusion layer must be formed by annealing between the PtMn film and the antiferromagnetic film. The reduction in the saturation magnetization Ms of the antiferromagnetic film due to the formation of the diffusion layer depends on the order of the deposition of the PtMn film and the antiferromagnetic film.

In particular, as shown in FIG. 4, in the bottom type having the antiferromagnetic layer 11 provided below the free magnetic layer 14, a thermal diffusion layer is readily formed between the antiferromagnetic layer 11 and the first pinned magnetic sublayer 12A. As a result, the magnetic thickness of the first pinned magnetic sublayer 12A is lower than the original thickness $tP_1$. Such a decrease in the magnetic thickness of the first pinned magnetic sublayer 12A, however, causes an excess difference in the magnetic thickness (magnetic moment) between the first pinned magnetic sublayer 12A and the second pinned magnetic sublayer 12C. That is, a large proportion of the thermal diffusion layer in the first pinned magnetic sublayer 12A decreases the exchange coupling magnetic field.

When the antiferromagnetic layer 11, which generates an exchange coupling magnetic field at the interface with the first pinned magnetic sublayer 12A during annealing, is used, both the thicknesses and the magnetic thicknesses of the first pinned magnetic sublayer 12A and the second pinned magnetic sublayer 12C must be optimized so that the first pinned magnetic sublayer 12A and the second pinned magnetic sublayer 12C are stabilized in a ferri-magnetic state.

A certain difference in the magnetic thickness between the first pinned magnetic sublayer 12A and the second pinned magnetic sublayer 12C is necessary for the formation of the ferri-magnetic state, as described above. On the other hand, an excess difference in the magnetic thickness between the first pinned magnetic sublayer 12A and the second pinned magnetic sublayer 12C results in an undesired decrease in the exchange coupling magnetic field. Accordingly, in the present invention, the ratio of the magnetic thickness of the first pinned magnetic sublayer 12A to the magnetic thickness of the second pinned magnetic sublayer 12C is preferably in a range of 0.33 to 0.95 or 1.05 to 4, which range is the same as the range in the ratio of the thickness of the first pinned magnetic sublayer 12A to the thickness of the second pinned magnetic sublayer 12C. Moreover, both the magnetic thickness of the first pinned magnetic sublayer 12A and the magnetic thickness of the second pinned magnetic sublayer 12C are preferably in a range of 10 to 70 angstrom·Tesla, and the absolute value of the difference between the magnetic thickness of the first pinned magnetic sublayer 12A and the thickness of the second pinned magnetic sublayer 12C is at least 2 angstrom·Tesla.

More preferably, the ratio of the magnetic thickness of the first pinned magnetic sublayer 12A to the magnetic thickness of the second pinned magnetic sublayer 12C is in a range of 0.53 to 0.95 or 1.05 to 1.8.

In a more preferred embodiment within the above ranges, both the magnetic thickness of the first pinned magnetic sublayer 12A and the magnetic thickness of the second pinned magnetic sublayer 12C are in a range of 10 to 50 angstrom·Tesla, and the absolute value of the difference between the magnetic thickness of the first pinned magnetic sublayer 12A and the thickness of the second pinned magnetic sublayer 12C is at least 2 angstrom·Tesla.

The nonmagnetic interlayer 12B interposed between the first pinned magnetic sublayer 12A and the second pinned magnetic sublayer 12C will now be described with reference to FIGS. 4 and 5.

The nonmagnetic interlayer 12B in this embodiment is preferably composed of at least one element selected from Ru, Rh, Ir, Cr, Re, and Cu.

In the bottom type having the antiferromagnetic layer 11 provided below the free magnetic layer 14 shown in FIGS. 4 and 5, the thickness of the nonmagnetic interlayer 12B is preferably in a range of 3.6 to 9.6 angstroms to yield an exchange coupling magnetic field (Hex*) of at least 40 kA/m. More preferably, the thickness of the nonmagnetic interlayer 12B is in a range of 4 to 9.4 angstroms to yield an exchange coupling magnetic field (Hex*) of at least 80 kA/m.

The experimental results by the present inventors show that the exchange coupling magnetic field noticeably decreases when the thickness of the nonmagnetic interlayer 12B is outside of the above range. In this case, the magnetization vector of the first pinned magnetic sublayer 12A and the magnetization vector of the second pinned magnetic sublayer 12C are not stabilized in the antiparallel arrangement (ferr-magnetic state).

A nonmagnetic conductive layer 13 composed of copper or the like is formed on the second pinned magnetic sublayer 12C, and the free magnetic layer 14 is formed on the nonmagnetic conductive layer 13.

Preferably, the free magnetic layer 14 is a single layer composed of a CoFe-based alloy, and the thickness thereof is in a range of 10 to 50 angstroms and more preferably 15 to 30 angstroms, as in the first to third embodiments.

In this embodiment, the free magnetic layer 14 may be a single layer composed of a CoFe-based alloy, particularly CoFe. In this layer, cobalt may be enriched. For example, the Co/Fe ratio may be 90/10 by atomic percent.

In the free magnetic layer 14, the average diameter, in the thickness direction (Z direction in FIG. 5), of crystal grains constituting the free magnetic layer 14 is preferably the same as or less than the thickness of the free magnetic layer 14, and the average diameter, in the plain (X1 and Y directions in FIG. 5) of the free magnetic layer 14, is preferably 150 angstroms or less, and more preferably 100 angstroms or less.

In the crystal grains constituting the free magnetic layer 14, the total volume of the crystal grains in which the <111> direction of the crystal grains as the easy axis is predominantly oriented substantially in a direction (Z direction in FIG. 5) perpendicular to the plain of the free magnetic layer 14 (hereinafter referred to as "the volume of predominantly oriented crystal grains") is preferably 50 percent or less and more preferably 30 percent or less of the volume of the free magnetic layer 14.

Herein, the volume of predominantly oriented crystal grains is determined by an image analysis of a cross-section of the free magnetic layer 14 using a transmission electron microscope (TEM), as in the first embodiment.

The nonmagnetic conductive layer 13 is composed of copper or the like and has a thickness in a range of 20 to 30 angstroms. The protective layer 15 is composed of tantalum or the like and is provided with a surface oxide layer thereon.

As shown in FIG. 5, bias underlayers 17a, hard bias layers 17, interlayers 19, and electrode layers 18 are provided on both sides of the composite 16 from the underlying layer 10a to the protective layer 15.

The bias underlayers 17a function as buffer and orientation films and are preferably composed of chromium (Cr) or the like. The thickness of the bias underlayers 17a is in a range of, for example, 20 to 50 angstroms and preferably approximately 35 angstroms. The interlayers 19 are composed of, for example, tantalum (Ta) and have a thickness of approximately 50 angstroms. These bias underlayers 17a and interlayers 19 function as diffusion barriers when the spin-valve thin-film magnetic element is exposed at an elevated temperature in a curing step, such as UV curing or hard baking, of an insulating resist in a subsequent production process of an inductive write head. Thus, these layers prevent thermal diffusion between the hard bias layers 17 and neighboring layers thereof and thus deterioration of the hard bias layers 17.

The hard bias layers 17 generally have a thickness in a range of 200 to 500 angstroms, and are preferably composed of, for example, a Co—Pt alloy, a Co—Cr—Pt alloy, or Co—Cr—Ta alloy.

Since the hard bias layers 17 are magnetized in the X1 direction in the drawing, the magnetization vector of the free magnetic layer 14 is also oriented in the X1 direction in the drawing. Thus, the variable magnetization vector of the free magnetic layer 14 and the pinned magnetization vector of the pinned magnetic layer 12 define an angle of 90° (are perpendicular to each other).

The electrode layers 18 is a single or multilayer film composed of at least one metal selected from Cr, Au, Ta, and W to reduce resistance. A combination of tantalum interlayers 19 and chromium electrode layers 18 epitaxially deposited thereon significantly contributes to a reduction in electrical resistance. The electrode layers 18 may extend on the composite 16, as in the third embodiment shown in FIG. 3.

In the spin-valve thin-film magnetic element shown in FIGS. 4 and 5, the electrode layers 18 lead a sensing current J to the composite 16. When a magnetic field is applied from the magnetic recording medium in the Y direction in FIG. 5, the magnetization vector of the free magnetic layer 14 varies from the X1 direction to the Y direction in the drawing. In this state, spin-dependent scattering of conduction electrons occurs due to so-called GMR effects at the interface between the nonmagnetic conductive layer 13 and the free magnetic layer 14 to detect the leakage magnetic field from the magnetic recording medium as a change in electrical resistance.

The sensing current also flows in the interface between first pinned magnetic sublayer 12A and the nonmagnetic interlayer 12B. The first pinned magnetic sublayer 12A does not directly contribute to a rate of change in resistance ($\Delta R/R$), but has an auxiliary function for pinning the second pinned magnetic sublayer 12C causing a rate of change in resistance ($\Delta R/R$) in a proper direction. The sensing current in the first pinned magnetic sublayer 12A and the nonmagnetic interlayer 12B yields shunt loss (current loss). Since the shunt loss is significantly small in this embodiment, the rate of change in resistance ($\Delta R/R$) is comparable with conventional levels.

In this embodiment, the pinned magnetic layer is divided into the first pinned magnetic sublayer 12A and the second pinned magnetic sublayer 12C separated by the nonmagnetic interlayer 12B. The experimental results by the present inventors show that a larger exchange coupling magnetic field (Hex*) of at least 40 kA/m is obtainable even when the thickness of the antiferromagnetic layer 11 is increased.

In a conventional single spin-valve thin-film magnetic element having an antiferromagnetic layer composed of a PtMn alloy, the thickness of the antiferromagnetic layer must be at least 200 angstroms to ensure an exchange coupling magnetic field of 40 kA/m. In this embodiment, an exchange coupling magnetic field of at last 40 kA/m is achieved by a thickness of at least 90 angstroms of the antiferromagnetic layer 11, and an exchange coupling magnetic field of at least 80 kA/m is achieved by a thickness of at least 100 angstroms of the antiferromagnetic layer 11. The above preferred thickness range in the antiferromagnetic layer 11 is applicable to single spin-valve thin-film magnetic elements. Dual spin-valve thin-film magnetic elements have a preferred range which is slightly different from the above range.

According to this embodiment, the thickness of the antiferromagnetic layer 11 can be reduced to be a half or less the thickness of conventional antiferromagnetic layers. Since the antiferromagnetic layer 11 has the largest thickness in the spin-valve thin-film magnetic element, the total thickness of the spin-valve thin-film magnetic element also can be significantly reduced, even if the upper and lower gap layers, which are provided above and below, respectively, the element, are relatively thick. These thick upper and lower gap layers ensures high insulation of the element.

Since the spin-valve thin-film magnetic element in this embodiment is of a so-called synthetic ferri-pinned type, a demagnetizing field (dipole magnetic field) $H_d$ generated by the first pinned magnetic sublayer 12A and the second pinned magnetic sublayer 12C compensates for a magnetostatic coupling magnetic field $H_{p1}$ of the first pinned magnetic sublayer 12A and a magnetostatic coupling magnetic field $H_{p2}$ of the second pinned magnetic sublayer 12B. Since the demagnetizing field (dipole magnetic field) $H_d$ is substantially zero, the effects of the dipole magnetic field (dipole magnetic field) $H_d$ of the pinned magnetic layer on the magnetization vector $M_f$ of the free magnetic layer 14 is substantially negligible. The variable magnetization vector of the free magnetic layer 14 can be readily aligned in a desired direction so that the spin-valve thin-film magnetic element exhibits small asymmetry.

In this embodiment, the free magnetic layer 14 is a single layer composed of a CoFe-based alloy. The thickness of the free magnetic layer 14 is set to be in a range of preferably 10 to 50 angstroms and more preferably 15 to 30 angstroms. Thus, the shunt loss of the sensing current does not occur. Moreover, the average diameter of CoFe crystal grains is specified as above, and the total volume of the crystal grains in which the <111> direction of the crystal grains as the easy axis is predominantly oriented substantially in a direction (Z direction in FIG. 5) perpendicular to the plain of the free magnetic layer 14 is specified as above. Thus, the spin-valve thin-film magnetic element in this embodiment exhibits the same effects as those in the first to third embodiments.

Fifth Embodiment

Figure 6:
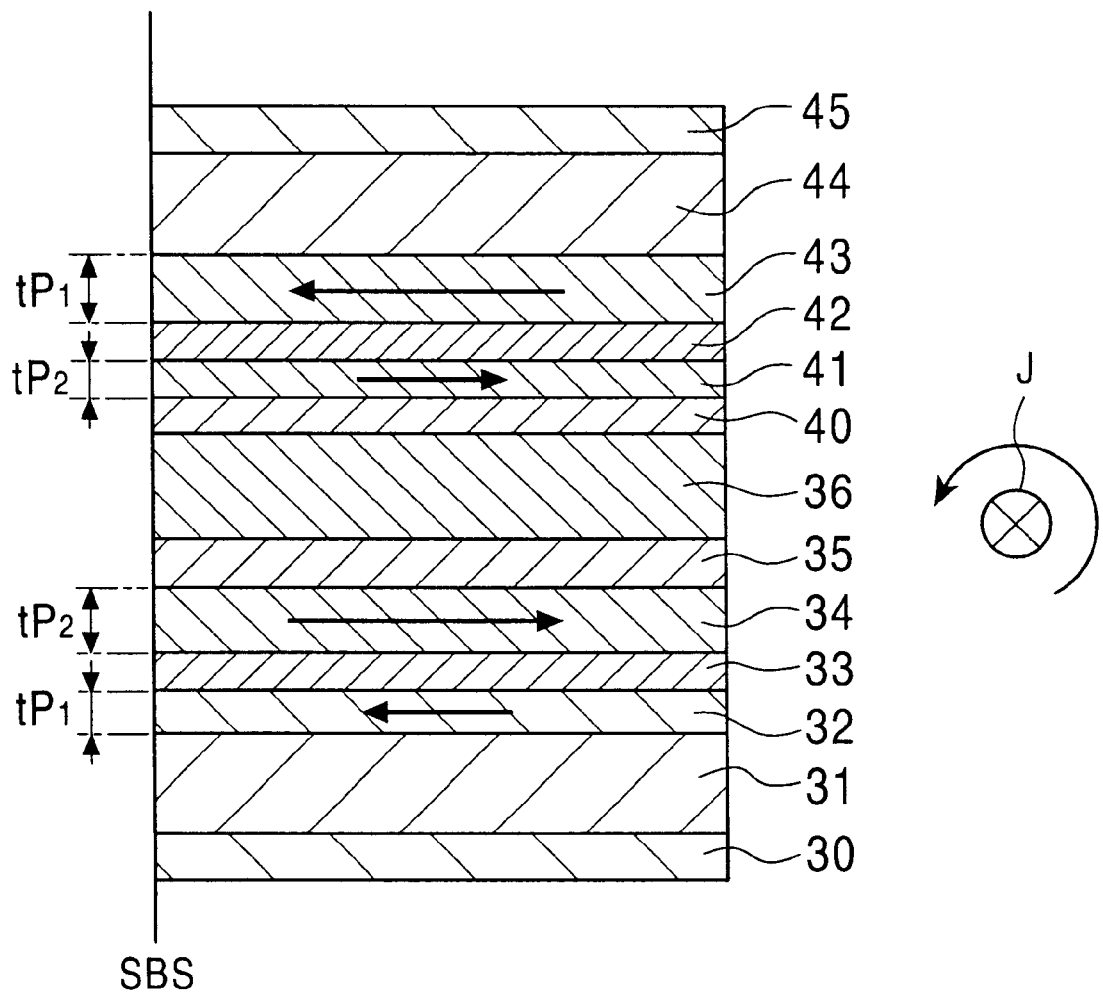
FIG. 6 is a schematic cross-sectional view of a fifth embodiment of the spin-valve thin-film magnetic element in accordance with the present invention.
Figure 7:
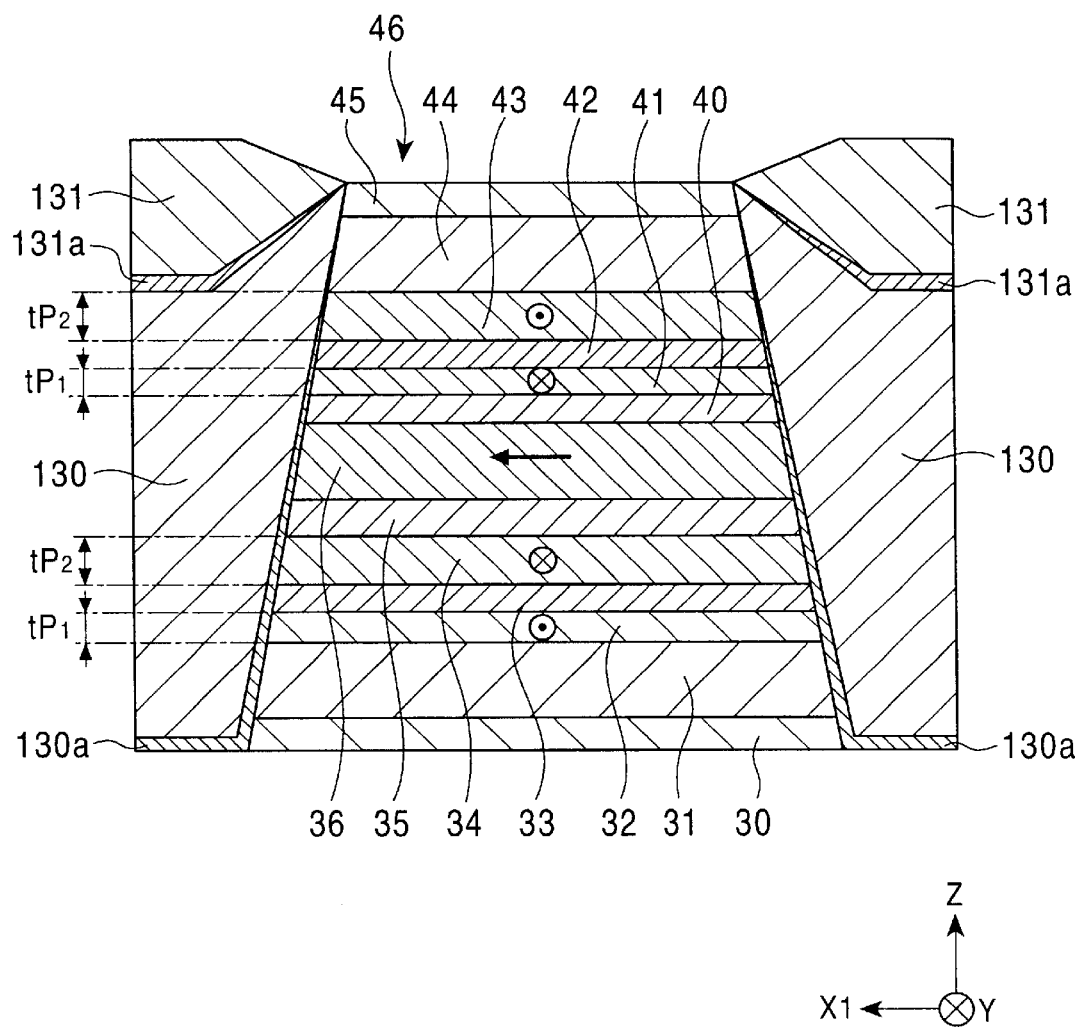
FIG. 7 is a cross-sectional view of the fifth embodiment of the spin-valve thin-film magnetic element in accordance with the present invention when viewed from a face opposing a recording medium.

FIG. 6 is a schematic cross-sectional view of a fifth embodiment of the spin-valve thin-film magnetic element in accordance with the present invention, and FIG. 7 is a cross-sectional view of the fifth embodiment when viewed from a face opposing a recording medium.

This spin-valve thin-film magnetic element is a dual spin-valve thin-film magnetic element in which a nonmagnetic conductive layer, a pinned magnetic layer, and an antiferromagnetic layer are provided on one face of a free magnetic layer, and another nonmagnetic conductive layer, another pinned magnetic layer, and another antiferromagnetic layer are provided on the other face. Since two sensing layers are provided, this spin-valve thin-film magnetic element exhibits a larger rate of change in resistance (ΔR/R) compared to the above single spin-valve thin-film magnetic elements and is suitable for high-density recording.

The spin-valve thin-film magnetic element shown in FIG. 6 has a composite 46 including, from the bottom, an underlying layer 30, an antiferromagnetic layer 31, a first lower pinned magnetic sublayer 32, a lower nonmagnetic interlayer 33, a second lower pinned magnetic sublayer 34, a nonmagnetic conductive layer 35, a free magnetic layer 36, a nonmagnetic conductive layer 40, a second upper pinned magnetic sublayer 41, an upper nonmagnetic interlayer 42, a first upper pinned magnetic sublayer 43, an antiferromagnetic layer 44, and a protective layer 45. Bias underlayers 130a, hard bias layers 130, interlayers 131a, and electrode layers 131 are formed on both sides of the composite 46.

Preferably, the antiferromagnetic layers 31 and 44 in this embodiment are composed of a PtMn alloy. The PtMn alloy may be replaced with an X—Mn or Pt—Mn—X' alloy wherein X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

Preferably, the free magnetic layer 36 is a single layer composed of a CoFe-based alloy, and the thickness thereof is in a range of 10 to 50 angstroms and more preferably 15 to 30 angstroms, as in the first to fourth embodiments.

In this embodiment, the free magnetic layer 36 may be a single layer composed of a CoFe-based alloy, particularly CoFe. In this layer, cobalt may be enriched. For example, the Co/Fe ratio may be 90/10 by atomic percent.

In the free magnetic layer 36, the average diameter, in the thickness direction (Z direction in FIG. 6), of crystal grains constituting the free magnetic layer 36 is preferably the same as or less than the thickness of the free magnetic layer 36, and the average diameter, in the plain (X1 and Y directions in FIG. 5) of the free magnetic layer 36, is preferably 150 angstroms or less, and more preferably 100 angstroms or less.

In the crystal grains constituting the free magnetic layer 36, the total volume of the crystal grains in which the <111> direction of the crystal grains as the easy axis is predominantly oriented substantially in a direction (Z direction in FIG. 6) perpendicular to the plain of the free magnetic layer 36 (hereinafter referred to as "the volume of predominantly oriented crystal grains") is preferably 50 percent or less and more preferably 30 percent or less of the volume of the free magnetic layer 36.

Herein, the volume of predominantly oriented crystal grains is determined by an image analysis of a cross-section of the free magnetic layer 14 using a transmission electron microscope (TEM), as in the first embodiment.

Preferably, both the ratio of the thickness $tP_1$ of the first lower pinned magnetic sublayer 32 to the thickness $tP_2$ of the second lower pinned magnetic sublayer 34 and the ratio of the thickness $tP_1$ of the first upper pinned magnetic sublayer 43 to the thickness $tP_2$ of the second upper pinned magnetic sublayer 41 is in a range of 0.33 to 0.95 or 1.05 to 4. Within this range, it is preferable that both the thicknesses $tP_1$ of the first lower and upper pinned magnetic sublayers 32 and 43, respectively, and the thicknesses $tP_2$ of the second lower and upper pinned magnetic sublayers 34 and 41, respectively, be within a range of 10 to 70 angstroms and the absolute value of the difference between each thickness $tP_1$ and each thickness $tP_2$ be at least 2 angstroms within the above range. When the thicknesses $tP_1$, the thicknesses $tP_2$, and the ratio thereof are optimized within the above ranges, an exchange coupling magnetic field of at least 40 kA/m is achieved.

More preferably, the ratio of the magnetic thickness $Ms \cdot tP_1$ of the first lower pinned magnetic sublayer 32 to the magnetic thickness $tP_2$ of the second lower pinned magnetic sublayer 34 and the ratio of the magnetic thickness $Ms \cdot tP_1$ of the first upper pinned magnetic sublayer 43 to the magnetic thickness $tP_2$ of the second upper pinned magnetic sublayer 41 are in a range of 0.53 to 0.95 or 1.05 to 1.8. Within this range, it is preferable that the magnetic thickness $Ms \cdot tP_1$ of the first lower pinned magnetic sublayer 32 and the first upper pinned magnetic sublayer 43 and the magnetic thickness $Ms \cdot tP_2$ of the second lower pinned magnetic sublayer 34 and the second upper pinned magnetic sublayer 41 be within a range of 10 to 50 angstrom·Tesla and the absolute value of the difference between the magnetic thickness $Ms \cdot tP_1$ and the magnetic thickness $Ms \cdot tP_2$ be at least 2 angstrom·Tesla within the above range, in order to achieve an exchange coupling magnetic field of at least 80 kA/m.

The experimental results by the present inventors show that, when the difference between the thickness $tP_1$ of the first lower pinned magnetic sublayer 32 and the thickness $tP_2$ of the second lower pinned magnetic sublayer 34, both lying below the free magnetic layer 36, is approximately 6 angstroms or less, the exchange coupling magnetic field tends to decrease, even if the thickness $tP_1$ of the first lower pinned magnetic sublayer 32 is larger than the thickness $tP_2$ of the second lower pinned magnetic sublayer 34. This phenomenon is observed when the antiferromagnetic layers 31 and 44 are composed of, for example, a PtMn alloy, which requires annealing to generate an exchange coupling magnetic field (exchange anisotropic magnetic field) at the interface between the first lower pinned magnetic sublayer 32 and the first upper pinned magnetic sublayer 43.

The reason for such a decrease in the exchange coupling magnetic field is that the magnetic thickness of the first lower pinned magnetic sublayer 32 decreases due to thermal diffusion between the antiferromagnetic layer 31 and the first lower pinned magnetic sublayer 32, both lying below the free magnetic layer 36, so that the effective thickness of the first lower pinned magnetic sublayer 32 and the thickness $tP_2$ of the second lower pinned magnetic sublayer 34 are almost the same. Thus, in this embodiment, it is preferable that the ratio of the thickness $tP_1$ of the first lower pinned magnetic sublayer 32 to the thickness $tP_2$ of the second lower pinned magnetic sublayer 34 be larger than the ratio of the thickness $tP_1$ of the first upper pinned magnetic sublayer 43 to the thickness $tP_2$ of the second upper pinned magnetic sublayer 41.

The thermal diffusion occurs not only in the dual spin-valve thin-film magnetic element shown in FIGS. 6 and 7, but also in the single spin-valve thin-film magnetic elements (see FIGS. 3 to 5) having the antiferromagnetic layer 11 provided below the free magnetic layer 14.

A certain difference is necessary between the magnetic thicknesses $Ms \cdot tP_1$ of the first lower and upper pinned magnetic sublayers 32 and 43, respectively, and the magnetic thicknesses $Ms \cdot tP_2$ of the second lower and upper pinned magnetic sublayers 34 and 41, respectively, for the formation of the ferri-magnetic state, as described above. On the other hand, an excess difference in the magnetic thickness between the first lower and upper pinned magnetic sublayers 32 and 43, respectively, and the second lower and upper pinned magnetic sublayers 34 and 41, respectively, results in an undesired decrease in the exchange coupling magnetic field. Accordingly, in this embodiment, the ratio of the thickness of the first lower pinned magnetic sublayer 32 to the second lower pinned magnetic sublayer 34 and the ratio of the thickness of the first upper pinned magnetic sublayer 43 to the second upper pinned magnetic sublayer 41 are preferably in a range of 0.33 to 0.95 or 1.05 to 4. Moreover, the magnetic thicknesses $Ms \cdot tP_1$ of the first lower and upper pinned magnetic sublayers 32 and 43, respectively, and the magnetic thicknesses $Ms \cdot tP_2$ of the second lower and upper pinned magnetic sublayers 34 and 41, respectively, are preferably in a range of 10 to 70 angstrom·Tesla, and the absolute value of the difference between the magnetic thicknesses $Ms \cdot tP_1$ of the first lower and upper pinned magnetic sublayers 32 and 43, respectively, and the magnetic thicknesses $Ms \cdot tP_2$ of the second lower and upper pinned magnetic sublayers 34 and 41, respectively, is at least 2 angstrom·Tesla.

More preferably, the ratio of the magnetic thickness $Ms \cdot tP_1$ of the first lower pinned magnetic sublayer 32 and the first upper pinned magnetic sublayer 43 to the magnetic thickness $tP_2$ of the second lower pinned magnetic sublayer 34 and second upper pinned magnetic sublayer 41 is in a range of 0.53 to 0.95 or 1.05 to 1.8. Within this range, it is preferable that both the magnetic thickness $Ms \cdot tP_1$ and the magnetic thickness $Ms \cdot tP_2$ be within a range of 10 to 50 angstrom·Tesla and the absolute value of the difference between the magnetic thickness $Ms \cdot tP_1$ and the magnetic thickness $Ms \cdot tP_2$ be at least 2 angstrom. Tesla within the above range.

With reference to FIGS. 6 and 7, the lower nonmagnetic interlayer 33 and the upper nonmagnetic interlayer 42 in this embodiment are preferably composed of at least one element selected from Ru, Rh, Ir, Cr, Re, and Cu.

Preferably, the lower nonmagnetic interlayer 33 below the free magnetic layer 36 has a thickness in a range of 3.6 to 9.6 angstroms to yield an exchange coupling magnetic field (Hex*) of at least 40 kA/m. More preferably, the lower nonmagnetic interlayer 33 has a thickness in a range of 4 to 9.4 angstroms to yield an exchange coupling magnetic field of at least 80 kA/m.

Preferably, the upper nonmagnetic interlayer 42 above the free magnetic layer 36 has a thickness in a range of 2.5 to 6.4 angstroms or 6.8 to 10.7 angstroms to yield an exchange coupling magnetic field (Hex*) of at least 40 kA/m. More preferably, the upper nonmagnetic interlayer 42 has a thickness in a range of 2.8 to 6.2 angstroms or 6.8 to 10.3 angstroms to yield an exchange coupling magnetic field of at least 80 kA/m.

When the antiferromagnetic layers 31 and 44 have a thickness of at least 100 angstroms, an exchange coupling magnetic field of at least 40 kV/m is achieved. When the antiferromagnetic layers 31 and 44 have a thickness of at least 110 angstroms, an exchange coupling magnetic field of at least 80 kV/m is achieved. Since antiferromagnetic layers in conventional spin-valve thin-film magnetic elements have thicknesses of approximately 200 angstroms, the thicknesses of the antiferromagnetic layer 31 and the antiferromagnetic layer 44 are approximately one half the thicknesses of the conventional antiferromagnetic layers. Thus, the overall thickness of this dual spin-valve thin-film magnetic element is at least 200 angstroms smaller than that of conventional elements. Even if an upper gap layer and a lower gap layer are adequately thick to ensure higher insulation, the total thickness of the element can be reduced to a level which is suitable for higher recording densities.

When the thickness ratio of the first lower pinned magnetic sublayer 32 and the first upper pinned magnetic sublayer 43 to the second lower pinned magnetic sublayer 34 and the second upper pinned magnetic sublayer 41, the thicknesses of the lower nonmagnetic interlayer 33 and the upper nonmagnetic interlayer 42, and the thicknesses of the antiferromagnetic layer 31 and antiferromagnetic layer 44 are optimized within the above range, a rate of change in resistance ($\Delta R/R$) of at least 10% is achieved.

As shown in FIGS. 6 and 7, the thickness $tP_1$ of the first lower pinned magnetic sublayer 32 lying below the free magnetic layer 36 is smaller than the thickness $tP_2$ of the second lower pinned magnetic sublayer 34 adjoining the lower nonmagnetic interlayer 33. In contrast, the thickness $tP_1$ of the first upper pinned magnetic sublayer 43 lying above the free magnetic layer 36 is larger than the thickness $tP_2$ of the second upper pinned magnetic sublayer 41 adjoining the upper nonmagnetic interlayer 42. Both the first lower pinned magnetic sublayer 32 and the first upper pinned magnetic sublayer 43 are magnetized in a direction opposite to the Y direction in the drawing, whereas the second lower pinned magnetic sublayer 34 and the second upper pinned magnetic sublayer 41 are magnetized in the Y direction in the drawing.

In the single spin-valve thin-film magnetic element shown in FIG. 4, the magnetization vector of the first pinned magnetic sublayer may be in the Y direction or a direction opposite to the Y direction in the drawing, as long as the magnetic thickness $Ms·tP_1$ of the first pinned magnetic sublayer and the magnetic thickness $Ms·tP_2$ of the second pinned magnetic sublayer are different from each other.

In the dual spin-valve thin-film magnetic element shown in FIGS. 6 and 7, both the first lower pinned magnetic sublayer 32 and the first upper pinned magnetic sublayer 43 must be magnetized in the same direction. Thus, the magnetic moment $Ms·tP_1$ of the first lower pinned magnetic sublayer 32 and the first upper pinned magnetic sublayer 43, the magnetic moment $Ms·tP_2$ of the second lower pinned magnetic sublayer 34 and the second upper pinned magnetic sublayer 41, and the direction and the magnitude of the magnetic field applied during annealing are optimized.

The first lower pinned magnetic sublayer 32 and the first upper pinned magnetic sublayer 43 are magnetized in the same direction so that the magnetization vector of the second lower pinned magnetic sublayer 34 and the magnetization vector of the second upper pinned magnetic sublayer 41 are oriented in the same direction and are antiparallel to the magnetization vector of the first lower pinned magnetic sublayer 32 and the magnetization vector of the first upper pinned magnetic sublayer 43.

As described above, the rate of change in resistance ΔR/R of the spin-valve thin-film magnetic element is determined by the relationship between the pinned magnetization vector of the pinned magnetic layer and the variable magnetization vector of the free magnetic layer. In this embodiment, the second upper and lower pinned magnetic layers directly affects the rate of change in resistance (ΔR/R) whereas the first upper and lower pinned magnetic layers have an auxiliary function to pin the magnetization vector of the second upper and lower pinned magnetic layers in a predetermined direction.

If the second lower pinned magnetic sublayer 34 and the second upper pinned magnetic sublayer 41 are magnetized in opposite directions, the resistance will increase in the relationship between the variable magnetization vector of the free magnetic layer 36 and the pinned magnetization vector of the second upper pinned magnetic sublayer 41 whereas the resistance will decrease in the relationship between the variable magnetization vector of the free magnetic layer 36 and the second lower pinned magnetic sublayer 34. As a result, the rate of change in resistance (ΔR/R) of the dual spin-valve thin-film magnetic element will be smaller than that of the single spin-valve thin-film magnetic element shown in FIG. 4.

Such a problem is observed not only in the synthetic ferri-pinned-type dual spin-valve thin-film magnetic element in this embodiment, but also in conventional single-pinned-type dual spin-valve thin-film magnetic element. Thus, both the pinned magnetic layers provided on both sides of the free magnetic layer must be magnetized in the same direction to achieve a high rate of change in resistance (ΔR/R) and large output compared to single spin-valve thin-film magnetic elements.

In this embodiment, as shown in FIGS. 6 and 7, the $Ms·tP_2$ of the second lower pinned magnetic sublayer 34 is larger than the $Ms·tP_1$ of the first lower pinned magnetic sublayer 32 below the free magnetic layer 36, and thus the magnetization vector of the second lower pinned magnetic sublayer 34 is oriented in the Y direction in the drawing. The synthetic magnetic moment, which is the sum of the $Ms·tP_2$ of the second lower pinned magnetic sublayer 34 and the $Ms·tP_1$ of the first lower pinned magnetic sublayer 32, is directed to the Y direction in the drawing, which is the direction of the magnetic moment of the second lower pinned magnetic sublayer 34.

In contrast, the $Ms·tP_1$ of the first upper pinned magnetic sublayer 43 is larger than the $Ms·tP_2$ of the second upper pinned magnetic sublayer 41 above the free magnetic layer 36, and thus the magnetization vector of the first upper pinned magnetic sublayer 43 is oriented in a direction opposite to the Y direction in the drawing. The synthetic magnetic moment being the sum of the $Ms·tP_1$ of the first upper pinned magnetic sublayer 43 and the $Ms·tP_2$ of the second upper pinned magnetic sublayer 41 is directed to the opposite direction to the Y direction in the drawing, which is the direction of the magnetic moment of the first upper pinned magnetic sublayer 43.

That is, in the dual spin-valve thin-film magnetic element shown in FIGS. 6 and 7, the direction of the synthetic magnetic moment above the free magnetic layer 36 and the direction of the synthetic magnetic moment below the free magnetic layer 36 are opposite to each other. These synthetic magnetic moments form a counterclockwise magnetic field in the drawing. As a result, the magnetization vector of the first lower pinned magnetic sublayer 32 and the magnetization vector of the second lower pinned magnetic sublayer 34 are in a further stable ferri-pinned state, and the magnetization vector of the first upper pinned magnetic sublayer 43 and the magnetization vector of the second upper pinned magnetic sublayer 41 are also in a further stable ferri-pinned state.

The sensing current J primarily flows in the nonmagnetic conductive layer 35 and the free magnetic layer 36, each having small resistivity, to generate a sensing current magnetic field based on the corkscrew rule. The sensing current magnetic field is counterclockwise in FIG. 6. Thus, below the free magnetic layer 36, the vector of the sensing current magnetic field in a position including the first lower pinned magnetic sublayer 32, the lower nonmagnetic interlayer 33, and the second lower pinned magnetic sublayer 34 is the same as the direction of the synthetic magnetic moment of the first lower pinned magnetic sublayer 32, the lower nonmagnetic interlayer 33, and the second lower pinned magnetic sublayer 34. Furthermore, above the free magnetic layer 36, the vector of the sensing current magnetic field in a position including the first upper pinned magnetic sublayer 43, the upper nonmagnetic interlayer 42, and the second upper pinned magnetic sublayer 41 is the same as the direction of the synthetic magnetic moment of the first upper pinned magnetic sublayer 43, the upper nonmagnetic interlayer 42, and the second upper pinned magnetic sublayer 41.

Such a concordance between the vector of the sensing current magnetic field and the direction of the synthetic magnetic moment has a noticeable advantage of improved read output, since the pinned magnetic layer has high thermal stability and a large sensing current can flow in the element.

The internal temperature of the device increases to approximately 200° C. and tends to further increase due to higher rotation of the recording medium and a higher sensing current. As the internal temperature increases, the exchange coupling magnetic field generally decreases. In this embodiment, however, the concordance between the magnetic field of the synthetic magnetic moment and the sensing current magnetic field can maintain the ferri-magnetic state in the magnetization of the first lower pinned magnetic sublayer 32 and the first upper pinned magnetic sublayer 43 and the magnetization of the second lower pinned magnetic sublayer 34 and the second upper pinned magnetic sublayer 41.

The vector and the magnitude of the magnetic field applied during annealing will be described. In the spin-valve thin-film magnetic element shown in FIGS. 6 and 7, the antiferromagnetic layer 31 and the antiferromagnetic layer 44 are composed of an antiferromagnetic material such as a PtMn alloy, which requires annealing to generate an exchange coupling magnetic field (exchange anisotropic magnetic field) at the interface with the first lower pinned magnetic sublayer 32 and the first upper pinned magnetic sublayer 43, respectively. The vector and the magnitude of the magnetic field applied during the annealing must be appropriately controlled to orient the first lower and upper pinned magnetic sublayers 32 and 43, respectively, and the second lower and upper pinned magnetic sublayers 34 and 41, respectively, in the directions shown in FIG. 6.

When these layers are formed, as shown in FIGS. 6 and 7, the $Ms \cdot tP_1$ of the first lower pinned magnetic sublayer 32 below the free magnetic layer 36 is set to be lower than the $Ms \cdot tP_2$ of the second lower pinned magnetic sublayer 34 and the $Ms \cdot tP_1$ of the first upper pinned magnetic sublayer 43 above the free magnetic layer 36 is set to be higher than the $Ms \cdot tP_2$ of the second upper pinned magnetic sublayer 41. When the first lower pinned magnetic sublayer 32 and the first upper pinned magnetic sublayer 43 are oriented in a direction opposite to the Y direction in FIG. 6, a magnetic field of at least 400 kA/m (see case (4) in Table 1 and case (4) in Table 2) must be applied in the direction opposite to the Y direction in the drawing.

After the magnetic field of at least 400 kA/m is applied, all the magnetization vectors of the first lower pinned magnetic sublayer 32, first upper pinned magnetic sublayer 43, the second lower pinned magnetic sublayer 34, and the first upper pinned magnetic sublayer 43 are oriented in the direction opposite to the Y direction in the drawing. The first lower pinned magnetic sublayer 32 and the first upper pinned magnetic sublayer 43 are pinned in the direction opposite to the Y direction in the drawing due to the exchange coupling magnetic fields (exchange anisotropic magnetic fields) at the interfaces with the antiferromagnetic layer 31 and the antiferromagnetic layer 44, respectively, and is reversed to and is pinned in the Y direction in the drawing due to the exchange coupling magnetic field (RKKY interaction) after the magnetic field of at least 400 kA/m is removed.

Alternatively, a magnetic field of at least 400 kA/m may be applied in the Y direction in the drawing. In this case, the magnetization vectors of the first lower pinned magnetic sublayer 32 and the first upper pinned magnetic sublayer 43 and the magnetization vectors of the second lower pinned magnetic sublayer 34 and the second upper pinned magnetic sublayer 41 are directed in the directions opposite to those shown in FIG. 6 to generate a magnetic field having a clockwise synthetic magnetic moment.

Alternatively, the $Ms \cdot tP_1$ of the first lower pinned magnetic sublayer 32 below the free magnetic layer 36 is set to be higher than the $Ms \cdot tP_2$ of the second lower pinned magnetic sublayer 34 and the $Ms \cdot tP_1$ of the first upper pinned magnetic sublayer 43 above the free magnetic layer 36 is set to be lower than the $Ms \cdot tP_2$ of the second upper pinned magnetic sublayer 41. When the first lower pinned magnetic sublayer 32 and the first upper pinned magnetic sublayer 43 are oriented in the Y direction or the opposite direction in FIG. 6, a magnetic field of at least 400 kA/m is applied in the same direction. The second lower pinned magnetic sublayer 34 below the free magnetic layer 36 and the second upper pinned magnetic sublayer 41 above the free magnetic layer 36 are thereby oriented in the same direction to form a magnetic field having a clockwise or counterclockwise synthetic magnetic moment.

The magnetization vector of the second lower pinned magnetic sublayer 34 and the magnetization vector of the second upper pinned magnetic sublayer 41 can be oriented in the same direction. Since the synthetic magnetic moments formed above and below the free magnetic layer 36 are in the same direction, these synthetic magnetic moments do not form a magnetic field. The dual spin-valve thin-film magnetic element of this embodiment exhibits a rate of change in resistance ($\Delta R/R$) which is comparable with that of a conventional dual spin-valve thin-film magnetic element, and maintains the thermally stabilized magnetization of the pinned magnetic layers compared to the conventional element, by the following annealing treatment When both the $Ms \cdot tP_1$ of the first lower pinned magnetic sublayer 32 below the free magnetic layer 36 and the $Ms \cdot tP_1$ of the first upper pinned magnetic sublayer 43 above the free magnetic layer 36 are set to be larger than the $Ms \cdot tP_2$ of the second lower pinned magnetic sublayer 34 and the $Ms \cdot tP_2$ of the second upper pinned magnetic sublayer 41, respectively, a magnetic field of 8 to 80 kV/m or 400 kA/m or more is applied in a direction of the intended magnetization vector of the first lower pinned magnetic sublayer 32 and the first upper pinned magnetic sublayer 43. The magnetization vector of the second lower pinned magnetic sublayer 34 and the second upper pinned magnetic sublayer 41 is thereby pinned in a direction which is antiparallel to the magnetization vector of the first lower pinned magnetic sublayer 32 and the first upper pinned magnetic sublayer 43, due to the exchange coupling magnetic field (RKKY interaction) with the first lower pinned magnetic sublayer 32 and the first upper pinned magnetic sublayer 43.

When the $Ms \cdot tP_1$ of the first lower pinned magnetic sublayer 32 below the free magnetic layer 36 and the $Ms \cdot tP_1$ of the first upper pinned magnetic sublayer 43 above the free magnetic layer 36 are set to be smaller than the $Ms \cdot tP_2$ of the second lower pinned magnetic sublayer 34 and the $Ms \cdot tP_2$ of the second upper pinned magnetic sublayer 41, respectively, a magnetic field of 8 to 80 kV/m is applied in a direction opposite to the magnetization vector of the first lower pinned magnetic sublayer 32 and the first upper pinned magnetic sublayer 43 or a magnetic field of 400 kA/m (5 kOe) or more is applied in the direction of the magnetization vector of the first lower pinned magnetic sublayer 32 and the magnetization vector of the first upper pinned magnetic sublayer 43. The magnetization vector of the second lower pinned magnetic sublayer 34 and the second upper pinned magnetic sublayer 41 is thereby pinned in a direction which is antiparallel to the magnetization vector of the first lower pinned magnetic sublayer 32 and the first upper pinned magnetic sublayer 43, due to the exchange coupling magnetic field (RKKY interaction) with the first lower pinned magnetic sublayer 32 and the first upper pinned magnetic sublayer 43.

The bias underlayers 130*a* function as buffer and orientation films and are preferably composed of chromium (Cr) or the like. The thickness of the bias underlayers 130*a* is in a range of, for example, 20 to 50 angstroms and preferably approximately 35 angstroms. The interlayers 131*a* are composed of, for example, tantalum (Ta) and have a thickness of approximately 50 angstroms. These bias underlayers 130*a* and interlayers 131a function as diffusion barriers when the spin-valve thin-film magnetic element is exposed at an elevated temperature in a curing step, such as UV curing or hard baking, of an insulating resist in a subsequent production process of an inductive write head. Thus, these layers prevent thermal diffusion between the hard bias layers 130 and neighboring layers thereof and between the electrode layers 131 and neighboring layers thereof, and thus deterioration of the hard bias layers 130 and electrode layers 131.

The hard bias layers 130 generally have a thickness in a range of 200 to 800 angstroms, and are preferably composed of, for example, a Co—Pt alloy, a Co—Cr—Pt alloy, or Co—Cr—Ta alloy.

Since the hard bias layers 130 are magnetized in the X1 direction in the drawing, the magnetization vector of the free magnetic layer 36 is oriented in the X1 direction in the drawing. Thus, the variable magnetization vector of the free magnetic layer 36 and the pinned magnetization vector of the second lower pinned magnetic sublayer 34 and the second upper pinned magnetic sublayer 41 are perpendicular to each other. In order to achieve magnetic coupling between the hard bias layers 130 and the free magnetic layer 36 and to reduce the affect of the hard bias layers 130 on the first lower pinned magnetic sublayer 32, the second lower pinned magnetic sublayer 34, the second upper pinned magnetic sublayer 41, and the first upper pinned magnetic sublayer 43, the hard bias layers 130 may be positioned at a level which is substantially the same as that of the free magnetic layer 36 in the thickness direction.

Preferably, each of the electrode layers 131 has a single-layer or multilayer configuration composed of at least one element selected from Cr, Au, Ta, and W to reduce the resistance value thereof. The electrical resistance is effectively reduced when Cr is selected as a material for the electrode layers 131 and is deposited by epitaxy on the Ta interlayers 131a.

The dual spin-valve thin-film magnetic element shown in FIGS. 6 and 7 including the free magnetic layer 36 composed of a CoFe-based alloy exhibits the same advantages as those in the first to fourth embodiments. Moreover, the pinned magnetic layer is divided into the first pinned magnetic sublayer and the second pinned magnetic sublayer which are separated by the nonmagnetic interlayer. The magnetization vectors of these two sublayers are in an antiparallel state (ferri-magnetic state) due to the exchange coupling magnetic field (RKKY interaction) generated between these two sublayers. As a result, the pinned magnetic layer maintains thermally stable magnetic states. When the thickness ratio of the first pinned magnetic sublayer to the second pinned magnetic sublayer, the thickness of the nonmagnetic interlayer disposed between the first pinned magnetic sublayer and the second pinned magnetic sublayer, and the thickness of the antiferromagnetic layer are optimized, a large exchange coupling magnetic field (Hex*) is achieved and the magnetization vectors of the first and second pinned magnetic sublayers can be thermally further stabilized. When the ratio of the thickness $tP_1$ of the first pinned magnetic sublayer to the thickness $tP_2$ of the second pinned magnetic sublayer, and the thicknesses of the first pinned magnetic sublayer, the second pinned magnetic sublayer, the nonmagnetic interlayer, and the antiferromagnetic layer are optimized, and when the magnitude and the direction of the magnetic field applied during annealing is optimized, the magnetization vectors of the second lower pinned magnetic sublayer 34 and the second upper pinned magnetic sublayer 41, which are disposed above and below, respectively, the free magnetic layer 36 causing a rate of change in resistance AMR can be pinned in the same direction and the synthetic magnetic moment generated on both sides of the free magnetic layer 36 are arranged in an antiparallel state. As a result, a magnetic field due to the synthetic magnetic moment is formed and the directional relationship between the magnetic field due to the synthetic magnetic moment and the sensing current magnetic field is confirmed. Accordingly, the thermal stability of the magnetization vector of the pinned magnetic layer is further improved.

Sixth Embodiment

Figure 8:
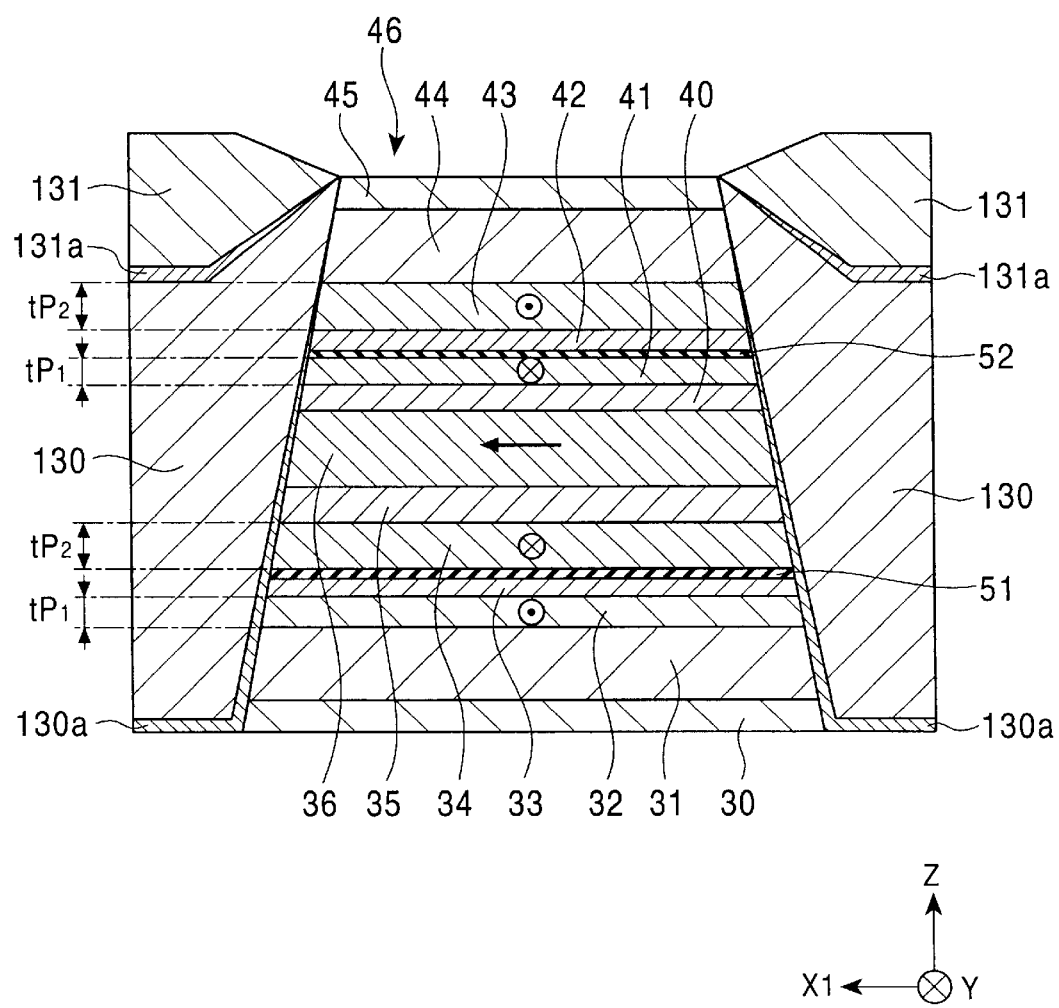
FIG. 8 is a cross-sectional view of the sixth embodiment of the spin-valve thin-film magnetic element in accordance with the present invention when viewed from a face opposing a recording medium.

FIG. 8 is a cross-sectional view of a sixth embodiment of the spin-valve thin-film magnetic element in accordance with the present invention when viewed from a face opposing a recording medium.

This spin-valve thin-film magnetic element is also of a synthetic-ferri-pinned-type dual spin-valve thin-film magnetic element having a similar configuration to that of the fifth embodiment shown in FIGS. 6 and 7, wherein parts having the same functions as in FIGS. 6 and 7 are referred to with the same reference numerals, and a detailed description thereof with reference to drawings has been omitted.

The spin-valve thin-film magnetic element of this embodiment is provided with a reflective mirror layers 51 and 52 composed of a ferromagnetic insulating material on one face of the second lower pinned magnetic sublayer 34 and one face of the second upper pinned magnetic sublayer 41, respectively, unlike the element of the fifth embodiment.

The reflective mirror layer 51 is deposited between the second lower pinned magnetic sublayer 34 and the lower nonmagnetic interlayer 33, and the reflective mirror layer 52 is deposited between the second upper pinned magnetic sublayer 41 and the upper nonmagnetic interlayer 42. That is, the reflective mirror layer 51 and the reflective mirror layer 52 are not in contact with the nonmagnetic conductive layer 35 and the nonmagnetic conductive layer 40, respectively.

Examples of insulating materials for forming the reflective mirror layers 51 and 52 include oxides, such as $\alpha$-$Fe_2O_3$, NiO, CoO, Co—Fe—O, Co—Fe—Ni—O, $Al_2O_3$, Al—Q—O (wherein Q is at least one element selected from the group consisting of B, Si, N, Ti, V, Cr, Mn, Fe, Co, and Ni), and R—O (wherein R is at least one element selected from the group consisting of Ti, V, Cr, Z, Nb, Mo, Hf, Ta and W); and nitrides, such as Al—N, Al—Q—N (wherein Q is at least one element selected from the group consisting of B, Si, O, Ti, V, Cr, Mn, Fe, Co, and Ni), and R—N (wherein R is at least one element selected from the group consisting of Ti, V, Cr, Zr, Nb, Mo, Hf, Ta, and W).

The reflective mirror layers 51 and 52 form potential barriers in the vicinities of the interfaces with the second lower pinned magnetic sublayer 34 and the second upper pinned magnetic sublayer 41, respectively. The potential barriers reflect spin-up conduction electrons moving in the second lower pinned magnetic sublayer 34 and the second upper pinned magnetic sublayer 41 without changing the direction of the spin. Thus, the reflective mirror layer 51 and the reflective mirror layer 52 can increase the mean free path of the spin-up conduction electrons (mirror reflective effects), as described below.

In the spin-valve thin-film magnetic element shown in FIG. 8, the electrode layers 131 lead a sensing current to the composite 46. When a magnetic field is applied from the magnetic recording medium in the Y direction in FIG. 8, the magnetization vector of the free magnetic layer 36 varies from the X1 direction to the Y direction in the drawing. In this state, spin-dependent scattering of conduction electrons occurs due to so-called GMR effects at the interface between the nonmagnetic conductive layer 35 and the free magnetic layer 36 and between the nonmagnetic conductive layer 40 and the free magnetic layer 36 to detect the leakage magnetic field from the magnetic recording medium as a change in electrical resistance.

Since the reflective mirror layers 51 and 52 increases the mean free path of the spin-up electrons which contribute to the magnetoresistive effect and thus exhibits so-called specular scattering effects which ensures a large rate of change in resistance (ΔR/R) suitable for high-density recording.

The specular scattering effects will now be described.

Figure 9B:
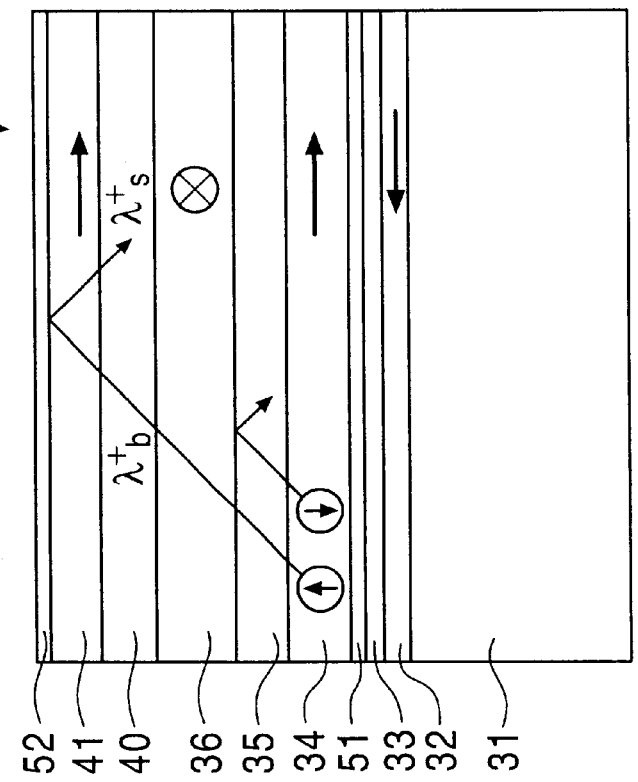
FIGS. 9A and 9B are schematic views for illustrating the mirror reflection effects of a reflective mirror layer in a spin-valve thin-film magnetic element.
Figure 9A:
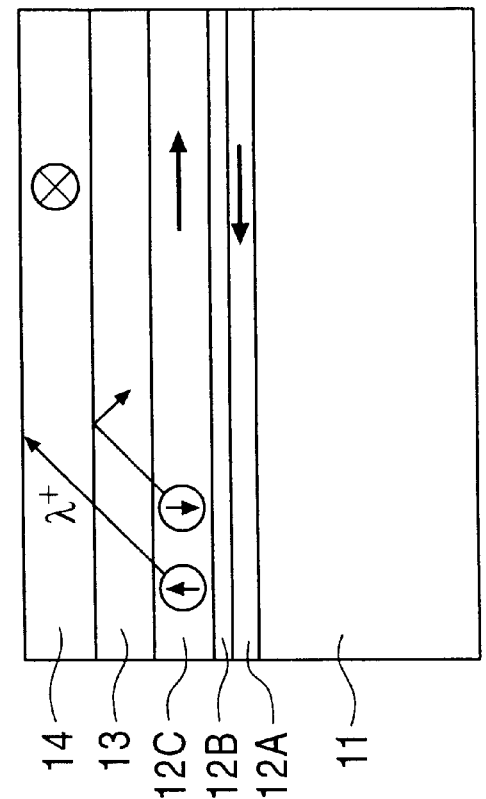

FIGS. 9A and 9B are schematic views for illustrating the mirror reflection effects of a reflective mirror layer in a spin-valve thin-film magnetic element.

The GMR effects observed in magnetic materials are primarily generated by spin-dependent scattering of electrons, that is, a difference between the mean free path $\lambda^+$ of spin-up conduction electrons spinning in the magnetization vector of the magnetic material (free magnetic layer 36 in this embodiment) and the mean free path $\lambda^-$ of spin-down conduction electrons spinning in the opposite direction to the magnetization vector of the magnetic material. In FIGS. 9A and 9B, upward arrows indicate spin-up conduction electrons and downward arrows indicate spin-down conduction electrons.

Spin-up conduction electrons can pass through the free magnetic layer 36, whereas spin-down conduction electrons are scattered in the free magnetic layer 36. The mean free path $\lambda^+$ of the spin-up conduction electrons is approximately 50 angstroms, whereas the mean free path $\lambda^-$ of the spin-down conduction electrons is approximately 6 angstroms, which is one-tenth the mean free path $\lambda^+$. In this embodiment, the thickness of the free magnetic layer 36 is larger than the mean free path $\lambda^-$ (approximately 6 angstroms) of the spin-down conduction electrons and is equal to or smaller than the mean free path $\lambda^+$ (approximately 50 angstroms) of the spin-up conduction electrons. Thus, the free magnetic layer 36 effectively blocks the spin-down conduction electrons being minority carriers, but transmits the spin-up conduction electrons being majority carriers.

The majority carriers and the minority carriers, that is, spin-up electrons and spin-down electrons, respectively, generated in the second lower pinned magnetic sublayer 34 move toward the free magnetic layer 36. These carriers are scattered in different manners when the magnetization vector of the free magnetic layer 36 rotates. That is, the spin-up electrons and the spin-down electrons have different travelling modes in the free magnetic layer 36 and contribute to the GMR effects.

Electrons moving from the free magnetic layer 36 toward the second lower pinned magnetic sublayer 34 also contribute to the GMR effects. Electrons moving from the second lower pinned magnetic sublayer 34 to the free magnetic layer 36 and electrons moving from the free magnetic layer 36 to the second lower pinned magnetic sublayer 34 also move in the same direction on average (thus, the description is omitted). Since the number of the spin-up electrons and the number of the spin-down electrons generated in the nonmagnetic conductive layer 35 and the nonmagnetic conductive layer 40 are the same, the sum of the mean free paths is constant (the description is omitted).

The number of the spin-down electrons as the minority carriers which are generated in the second lower pinned magnetic sublayer 34 and pass through the nonmagnetic conductive layer 35 is equal to the number of the spin-down electrons which are scattered at the interface between the second lower pinned magnetic sublayer 34 and the nonmagnetic conductive layer 35. The spin-down electrons are scattered at the interface between the nonmagnetic conductive layer 35 and the second lower pinned magnetic sublayer 34 far before these electrons reach the interface with the free magnetic layer 36. Thus, the mean free path of the spin-down electrons does not change regardless of the change in the magnetization vector of the free magnetic layer 36 and does not contribute to the GMR effect. Accordingly, only the spin-up electrons contribute to the GMR effects.

The majority carries, that is, the spin-up electrons generated in the second lower pinned magnetic sublayer 34 move in the nonmagnetic conductive layer 35 of which the thickness is smaller than the mean free path $\lambda^+$ of the spin-up electrons and reach the free magnetic layer 36.

When an external magnetic field is not applied to the free magnetic layer 36 and when the magnetization vector of the free magnetic layer 36 does not rotate, these majority carriers can path through without restriction since the spin of the spin-up electrons is in the direction of the magnetization vector of the free magnetic layer 36.

The spin-up electrons, which pass through the free magnetic layer 36, move in the nonmagnetic conductive layer 40 and the second upper pinned magnetic sublayer 41 by an additional mean free path $\lambda^+_b$, which is determined by the constituents of the nonmagnetic conductive layer 40 and the second upper pinned magnetic sublayer 41, and is mirror-reflected (mirror-scattered) in the vicinity of the interface between the second upper pinned magnetic sublayer 41 and the reflective mirror layer 52.

In the single spin-valve thin-film magnetic element shown in FIG. 9A, the spin-up electrons move in the free magnetic layer and are scattered at the upper face thereof. In contrast, in this dual spin-valve thin-film magnetic element, the nonmagnetic conductive layer 40 and the second upper pinned magnetic sublayer 41 contribute to an increase in the mean free path by the additional mean free path $\lambda^+_b$. Since the magnetization vector of the second lower pinned magnetic sublayer 34 and the magnetization vector of the second lower pinned magnetic sublayer 34 are in the same direction, the spin-up electrons are not scattered in the second upper pinned magnetic sublayer 41.

Moreover, the spin-up electrons move toward the interface between the second upper pinned magnetic sublayer 41 and the reflective mirror layer 52 and are mirror-reflected by the reflective mirror layer 52 as the potential barrier while maintaining their spin states including energy spin, and path through the second upper pinned magnetic sublayer 41 and the nonmagnetic conductive layer 40. That is, the mean free path increases by the reflection mean free path $\lambda^+_s$ due to mirror reflection.

Accordingly, the overall mean fee path of the spin-up electrons significantly increases by the additional mean free path $\lambda^+_b$ due to the dual spin-valve configuration and the reflection mean free path $\lambda^+_s$ due to the reflective mirror layer 52. Such a combination of the dual spin-valve configuration and the reflective mirror layer 52 contributes to a decrease in resistance of the spin-valve thin-film magnetic element due to an increased mean free path.

When the magnetization vector of the free magnetic layer 36 rotates with an external magnetic field, the magnetization vector of the free magnetic layer 36 differs from the direction of the spin and the spin-up electrons are scattered in the free magnetic layer 36. As the magnetization vector of the free magnetic layer 36 rotates, the probability that the spin-up electrons have the same mean free path as that of the spin-down electrons significantly increase to significantly decrease the effective mean free path. That is, resistance steeply increases. As described above, the magnitude of the external magnetic field causes a change in the resistance of the spin-valve thin-film magnetic element and is detected as the GMR effects.

In majority carriers and minority carriers, that is, spin-up electrons and spin-down electrons, which are generated in the second upper pinned magnetic sublayer 41 having the magnetization vector which is the same as that of the second lower pinned magnetic sublayer 34, electrons moving from the free magnetic layer 36 to the second upper pinned magnetic sublayer 41 contribute to the GMR effects. Thus, the dual spin-valve configuration exhibits a further increased rate of change in resistance compared to single spin-valve configurations.

Accordingly, the combination of the dual spin-valve configuration and the reflective mirror layers 51 and 52 yields noticeable GMR effects having a larger rate of change in resistance ($\Delta R/R$) which contributes to improved read output characteristics of the spin-valve thin-film magnetic element of this embodiment.

The reflective mirror layers 51 and 52 may be arranged at any positions in the second lower pinned magnetic sublayer 34 and the second upper pinned magnetic sublayer 41, respectively, as long as these are not in contact with the nonmagnetic conductive layer 35 and the nonmagnetic conductive layer 40, respectively. For example, these layers may be provided in the interior of the second lower pinned magnetic sublayer 34 and the second upper pinned magnetic sublayer 41 in the thickness direction.

In any of the first to fourth embodiments, a mirror reflective layer may be provided at a position of the pinned magnetic layer which is not in contact with the nonmagnetic conductive layer or at a position of the free magnetic layer which is not in contact with the nonmagnetic conductive layer to increase the mean free path of the conduction electrons. In such a case, the spin-valve thin-film magnetic element exhibits improved read output characteristics due to the GMR effects having a larger rate of change in resistance ($\Delta R/R$).

A thin-film magnetic head of the present invention will now be described in detail.

Figure 14:
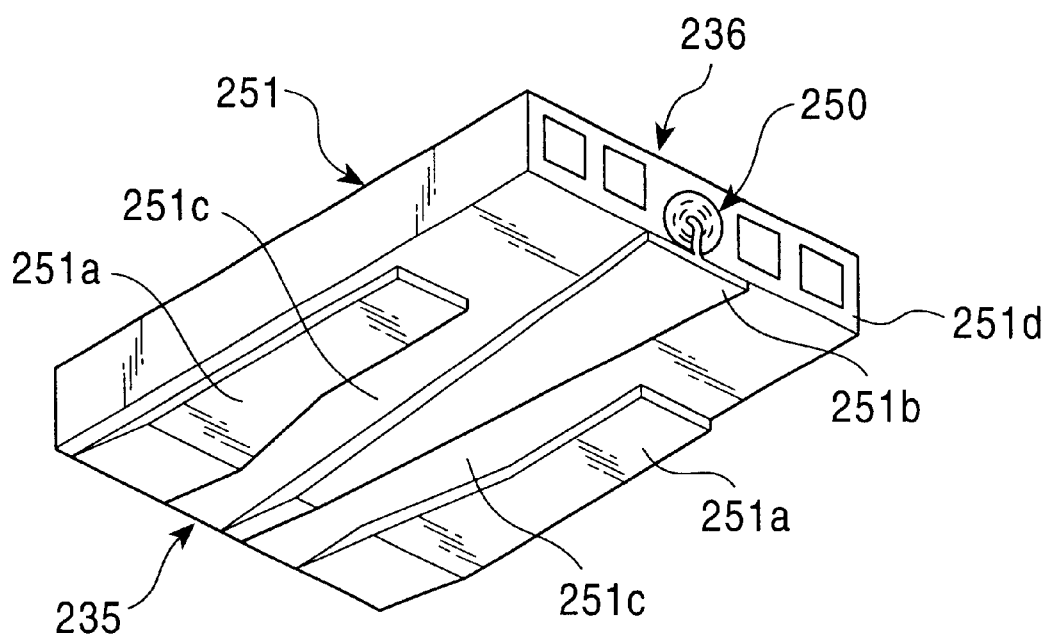
FIG. 14 is an isometric view of an embodiment of a thin-film magnetic head in accordance with the present invention.

FIG. 14 is an isometric view of an exemplary thin-film magnetic head of the present invention. This thin-film magnetic head is of a floating type and is mounted into a magnetic recording medium such as a hard disk. The thin-film magnetic head has a slider 251 including a leading end 235 lying at the leading portion in the moving direction of the disk surface and a trailing end 236. The slider 251 also has rail air bearing surfaces (ABSs) 251a and 251b and air grooves 251c on a side facing the disk. The slider 251 has a magnetic core section 250 on a trailing side 251d.

Figure 15:
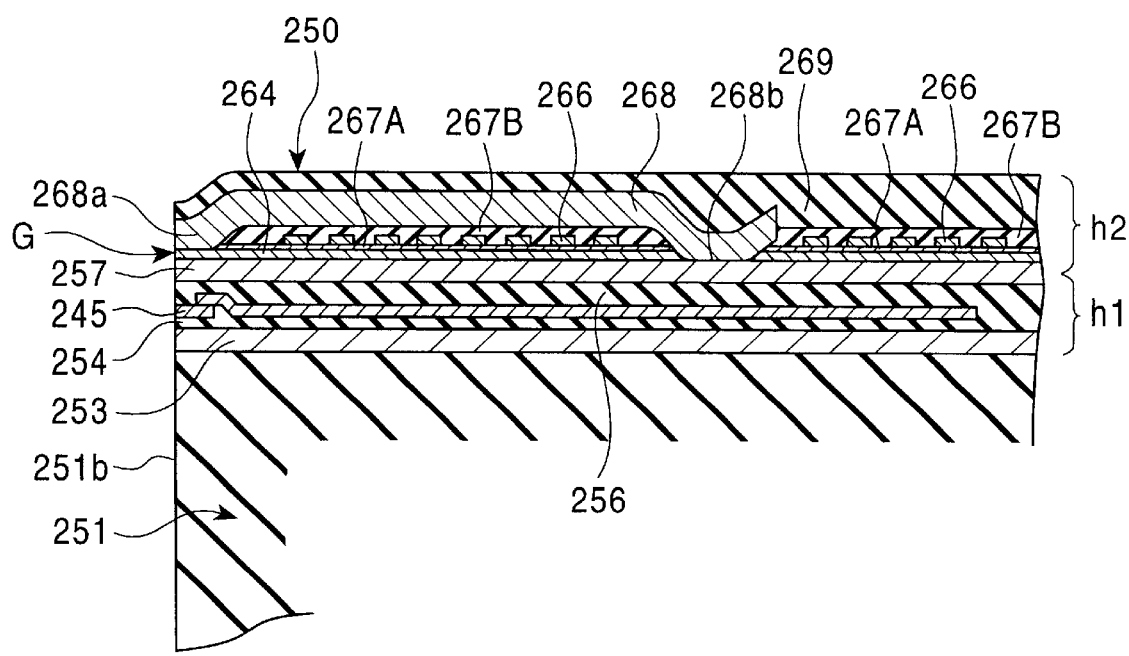
FIG. 15 is a cross-sectional view of a magnetic core portion of the thin-film magnetic head shown in FIG. 14.
Figure 16:
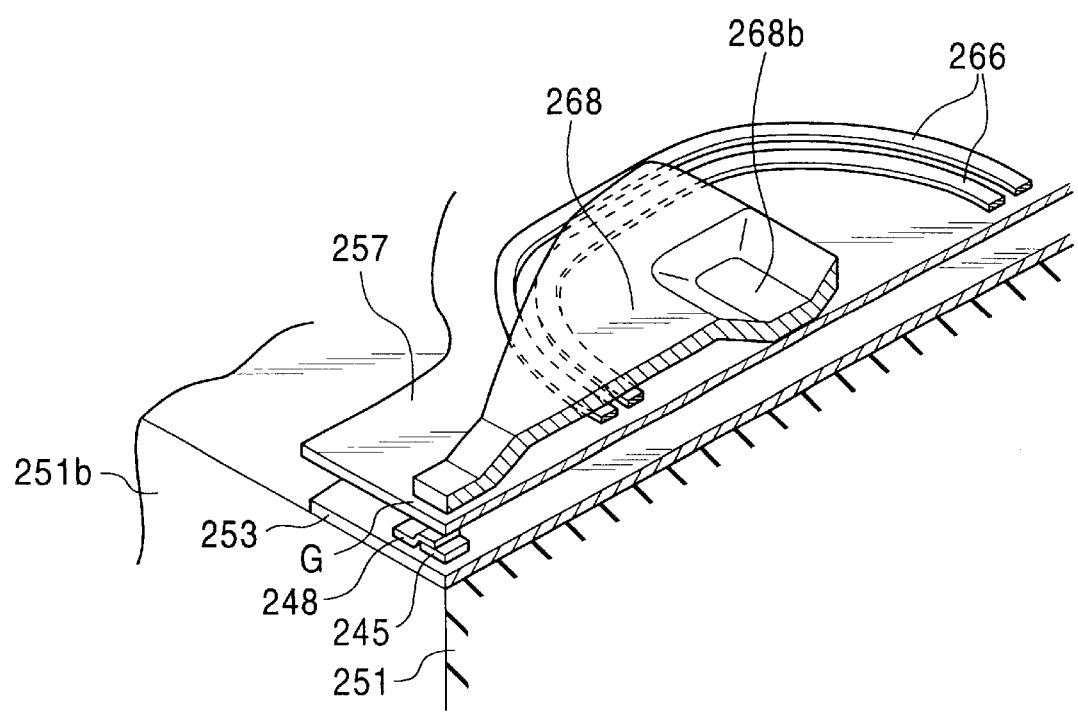
FIG. 16 is an outline isometric view of the magnetic core portion shown in FIG. 15.
Figure 17:
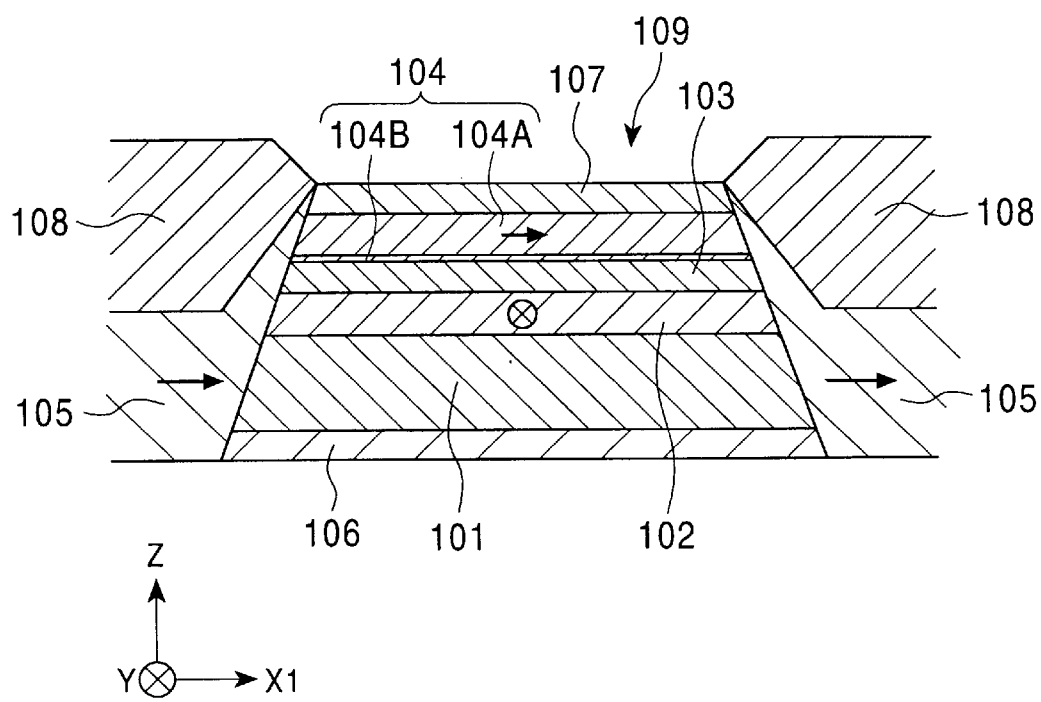
FIG. 17 is a cross-sectional view of an embodiment of a conventional spin-valve thin-film magnetic element when viewed from a face opposing a recording medium.
Figure 18:
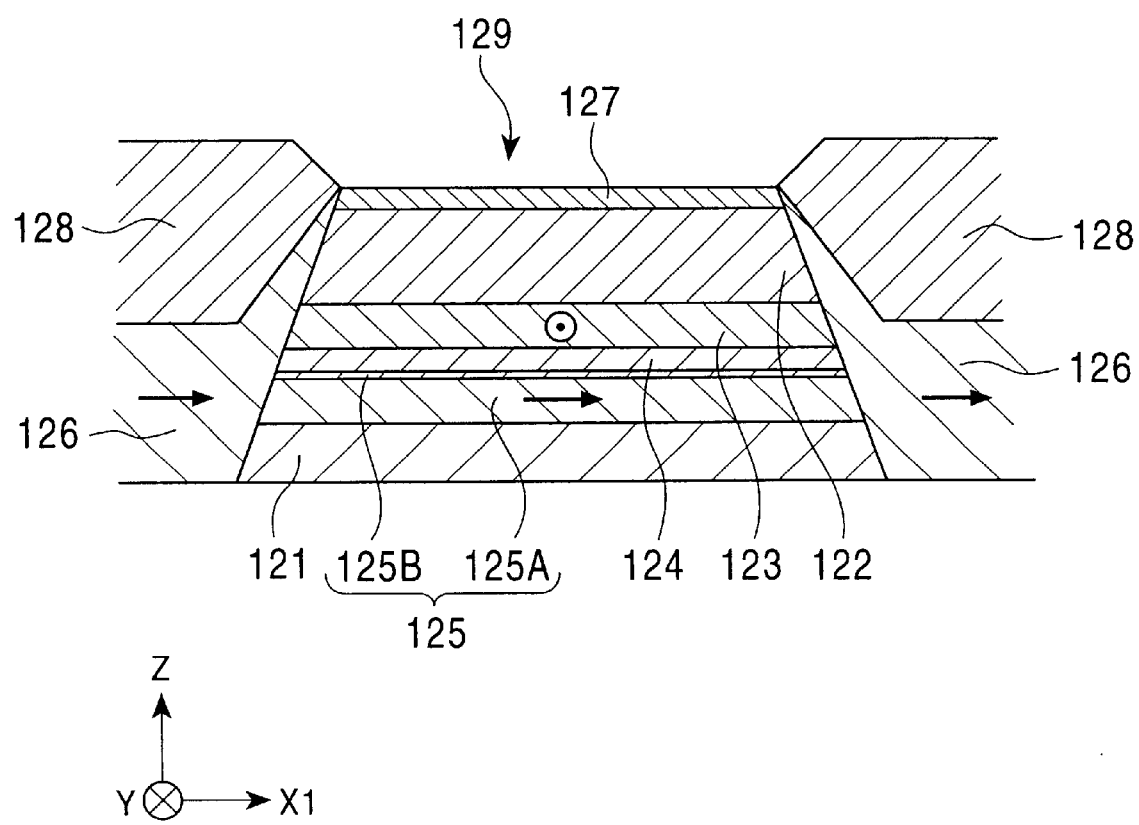
FIG. 18 is a cross-sectional view of another embodiment of the conventional spin-valve thin-film magnetic element when viewed from a face opposing a recording medium.
Figure 19:
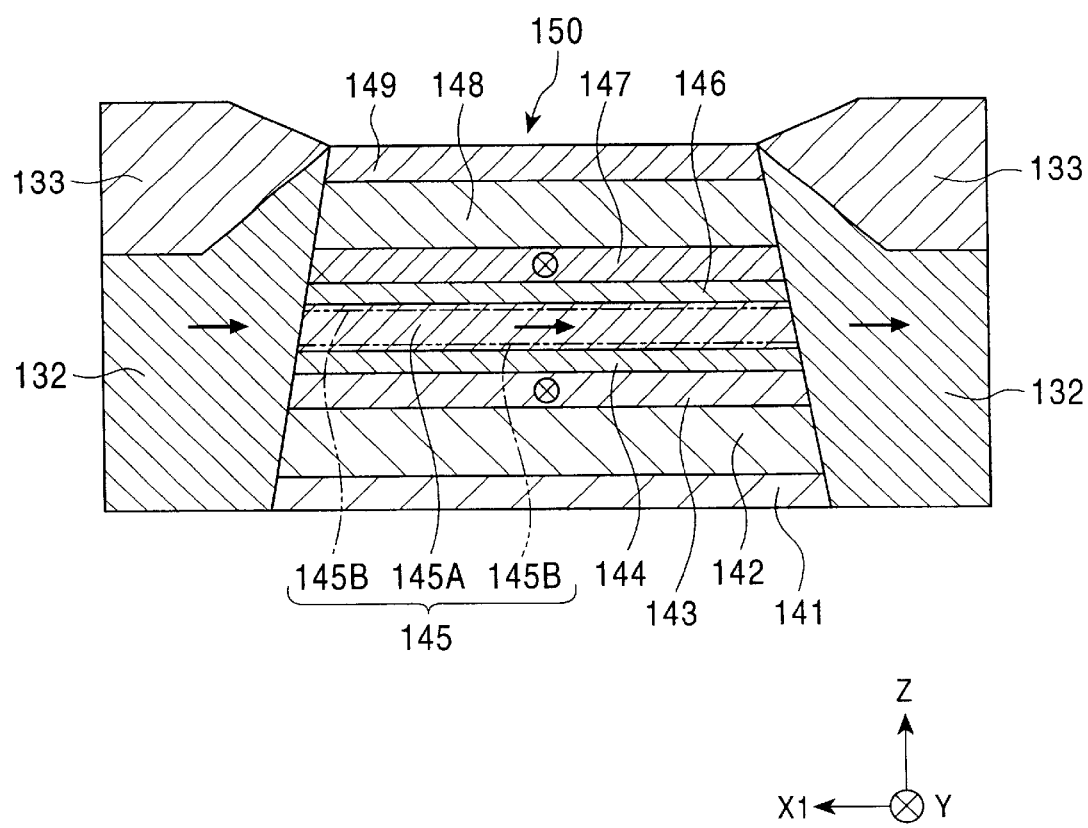
FIG. 19 is a cross-sectional view of another embodiment of the conventional spin-valve thin-film magnetic element when viewed from a face opposing a recording medium.

The magnetic core section 250 is a combined magnetic head shown in FIGS. 15 and 16 and has a MR read head h1 and inductive write head h2 which are deposited, in that order, on the trailing side 251d.

The MR read head h1 has a slider 251, which also functions as a substrate. The slider 251 is provided with a lower shield layer 253 composed of a magnetic alloy and lies at the trailing end thereof. A lower gap layer 254 is provided on the lower shield layer 253. A magnetoresistive element 245 is deposited on the lower gap layer 254. An upper gap layer 256 is formed on the magnetoresistive element 245, and an upper shield layer 257 is formed thereon. The upper shield layer 257 is also used as a lower core layer of the inductive write head h2.

The MR read head h1 reads the information recorded on a magnetic recording medium such as a hard disk by a change in resistance of the magnetoresistive element 245 in response to slight magnetic fields from the magnetic recording medium. The magnetoresistive element 245 includes the above-mentioned spin-valve thin-film magnetic element. This spin-valve thin-film magnetic element is the most important component of the thin-film magnetic head (read head).

The inductive write head h2 has a gap layer 264 provided on the lower core layer 257, and a coil layer 266 having a planar spiral pattern thereon. The coil layer 266 is surrounded by the first insulating layer 267A and a second insulating layer 267B. As shown in FIGS. 15 and 16, an upper core layer 268 is formed on the second insulating layer 267B, opposes the lower core layer 257 with a magnetic gap G therebetween at an air bearing surface (ABS) 251b, and is magnetically coupled with the lower core layer 257 at a base end 268b. A protective layer 269 composed of alumina or the like is provided on the upper core layer 268.

In this inductive write head h2, a recording current flows in the coil layer 266 so that a recording magnetic flux from the coil layer 266 is applied to the lower and upper core layers 257 and 268, respectively. A leakage magnetic field from the front edges of the lower core layer 257 and the upper core layer 268 is recorded on the magnetic recording medium as magnetic signals.

In the production of the thin-film magnetic head of the present invention, as shown in FIG. 15, the lower gap layer 254 is formed on the lower shield layer 253 composed of a magnetic material, the magnetoresistive element 245 composed of the spin-valve thin-film magnetic element of the present invention is formed thereon. The upper gap layer 256 and the lower core layer 257 are formed on the magnetoresistive element 245 to complete the MR read head h1.

Next, the gap layer 264 is formed on the lower core layer or upper shield layer 257, and the spiral coil layer 266 is formed thereon so as to be surrounded with the first insulating layer 267A and the second insulating layer 267B. The upper core layer 268 is formed on the second insulating layer 267B and the protective layer 269 is formed on the upper core layer 268 to complete the thin-film magnetic head.

This thin-film magnetic head, including the spin-valve thin-film magnetic element of the present invention, exhibits high thermal resistance and reliability and small asymmetry.

In the thin-film magnetic head, the structure of the slider and the structure of the inductive head are not limited to that shown in FIGS. 14 to 16, and may have any other configurations.

EXAMPLES

In a spin-valve thin-film magnetic element having a free magnetic layer having a single layer composed of a CoFe alloy, the relationship between the coercive force Hc and the thickness and the relationship between the rate of change in resistance ($\Delta R/R$) and the thickness were examined. Moreover, the predominant orientation of crystal grains constituting the free magnetic layer was observed. This spin-valve thin-film magnetic element was a dual spin-valve thin-film magnetic element of the fifth embodiment as shown in FIG. 7.

The ratio of cobalt to iron in the free magnetic layer was Co:Fe=90:10, and the thickness thereof was varied in a range of 10 angstroms to 50 angstroms.

The composite had the following configuration from the bottom: Ta (30 angstroms)/PtMn (150 angstroms)/Co (20 angstroms)/Ru (8 angstroms)/Co (25 angstroms)/Cu (27 angstroms)/CoFe (10 to 50 angstroms)/Cu (27 angstroms)/Co (25 angstroms)/Ru (8 angstroms)/Co (20 angstroms)/PtMn (150 angstroms)/Ta (20 angstroms).

The cross section of the free magnetic layer was observed with a transmission electron microscope (TEM) to identify the state of crystal grains in the free magnetic layer. The results are shown in FIG. 12.

Figure 12:
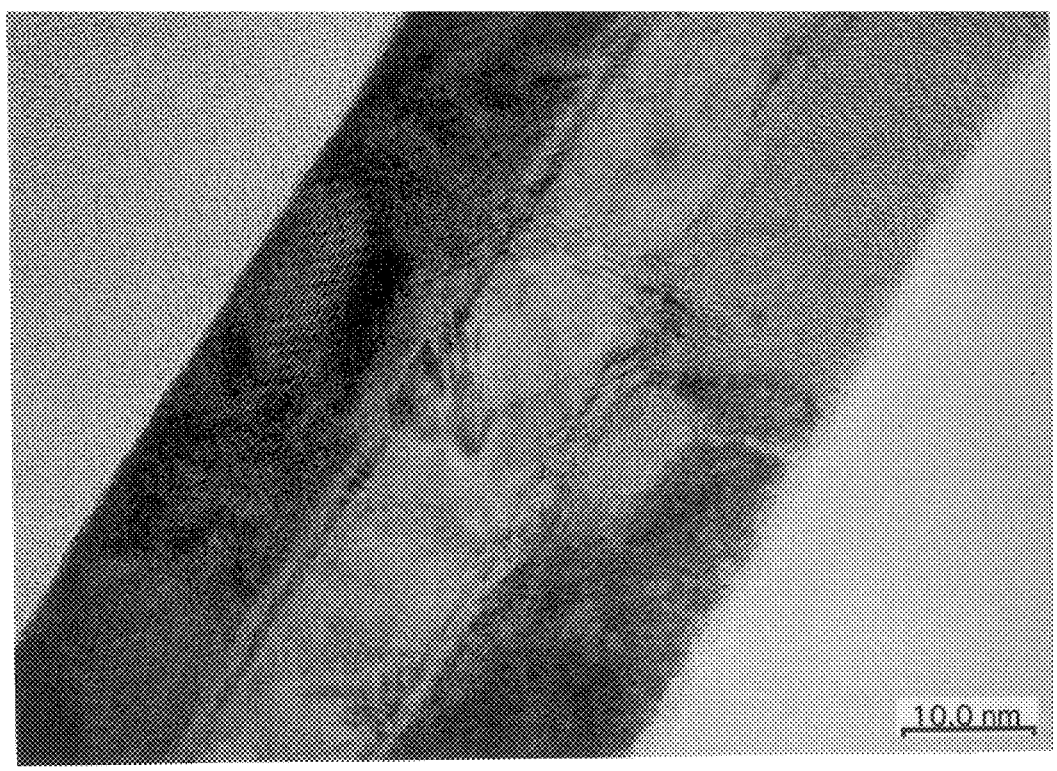
FIG. 12 is a transmission electron micrograph of a cross section of a spin-valve thin-film magnetic element.
Figure 13:
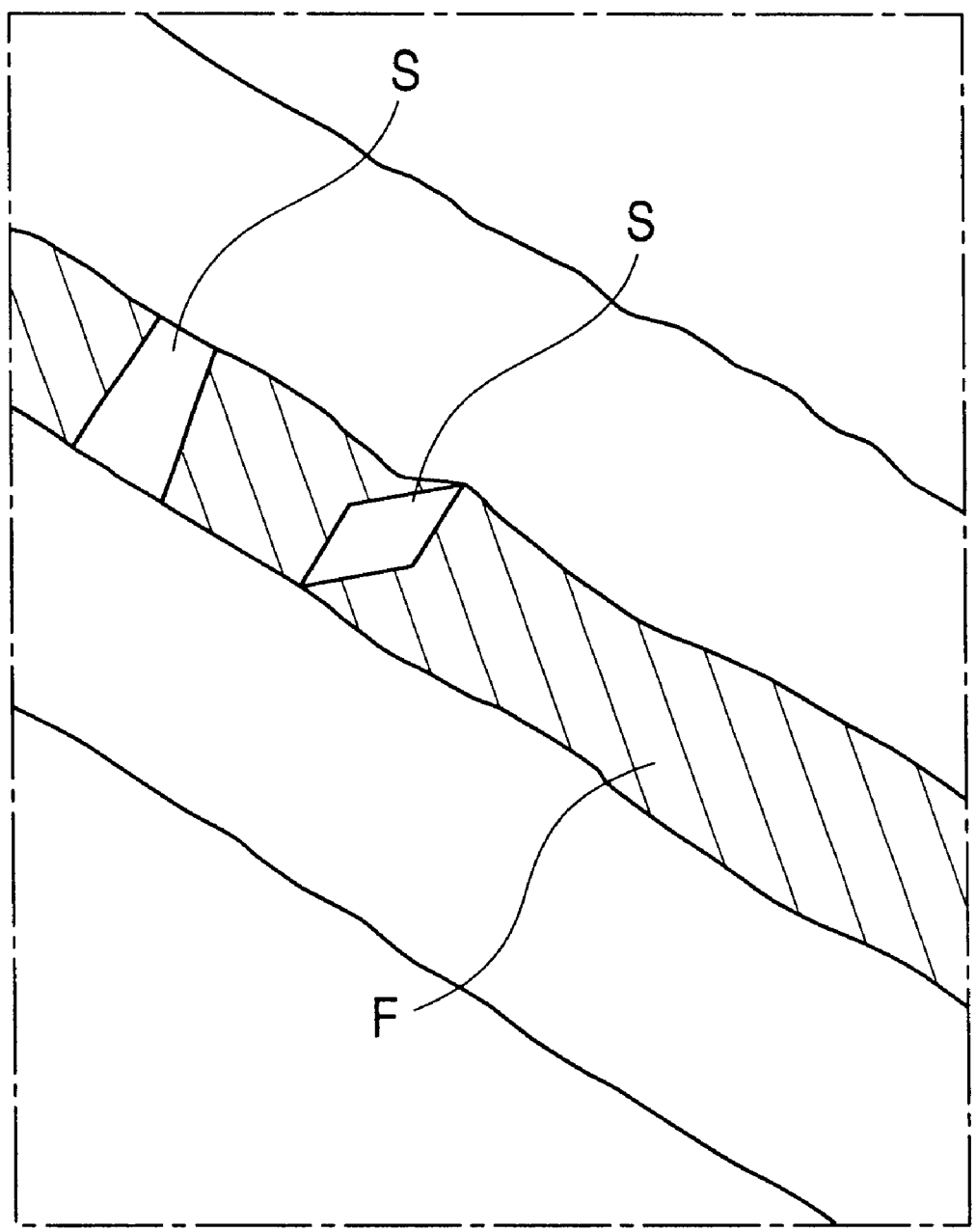
FIG. 13 is a schematic view for illustrating the cross-section shown in FIG. 12.

In FIG. 12, the thickness of the free magnetic layer is 50 angstroms. FIG. 13 is a schematic view for illustrating the cross-section shown in FIG. 12.

Using the TEM photograph, the volume of the crystal grains in which the <111> direction of the crystal grains is predominantly oriented substantially in a direction perpendicular to the plain of the free magnetic layer was defined. The region of the crystal grains of which the <111> direction, perpendicular to the (111) plane of the cubic crystal, was predominantly oriented in the direction perpendicular to the plain of the free magnetic layer was identified by another analytical method, such as electron diffraction.

In the schematic illustration in FIG. 13 of the TEM photograph shown in FIG. 12, regions F of the free magnetic layer were identified, region S of the crystal grains of which the <111> direction perpendicular to the (111) plane of a cubic crystal is predominantly oriented in the direction perpendicular to the plane of the overall free magnetic layer was identified by electron diffraction or the like. The ratio by area of the regions S to the regions F was calculated to define the volume ratio of the crystal grains of which the <111> direction was predominantly oriented substantially in the direction perpendicular to the plain of the free magnetic layer in the overall regions F of the free magnetic layer. In the TEM photograph shown in FIG. 12, the ratio by area of the region S to the region F is 10.3 percent.

Spin-valve thin-film magnetic elements were formed in which the thickness of the free magnetic layer was changed in a range of 10 to 50 angstroms to measure the coercive force Hc and the rate of change in resistance ($\Delta R/R$) thereof. The thickness was a size in the Z direction in FIG. 7. The results are shown in FIGS. 10 and 11.

As Comparative Example, spin-valve thin-film magnetic elements, each including a Co/NiFe/Co triple-layered free magnetic layer, were formed in which the thickness was changed in a range of 10 to 50 angstroms to measure the coercive force Hc and the rate of change in resistance ($\Delta R/R$) thereof. In Comparative Example, each spin-valve thin-film magnetic element has the following layer configuration from the bottom: Ta (30 angstroms)/PtMn (150 angstroms)/Co (20 angstroms)/Ru (8 angstroms)/Co (25 angstroms)/Cu (27 angstroms)/Co (5 angstroms)/NiFe (10 to 50 angstroms)/Co (5 angstroms)/Cu (27 angstroms)/Co (25 angstroms)/Ru (8 angstroms)/Co (20 angstroms)/PtMn (150 angstroms)/Ta (20 angstroms). The coercive force Hc and the rate of change in resistance ($\Delta R/R$) of each spin-valve thin-film magnetic element were measured. The results are shown in FIGS. 10 and 11.

FIGS. 10 and 11 show that the CoFe single free magnetic layer exhibits a reduced coercive force Hc and an improved rate of change in resistance ($\Delta R/R$) compared to the Co/NiFe/Co triple-layered free magnetic layer. At a thickness of 30 angstroms, the free magnetic layer of the present invention exhibits a 10 percent improvement in the rate of change in resistance ($\Delta R/R$).

Accordingly, the single CoFe free magnetic layer contributes to a reduction in the coercive force Hc and is sensitive to the leakage magnetic field. Moreover, the spin-valve thin-film magnetic element exhibits improved output characteristics due to the improved rate of change in resistance ($\Delta R/R$).

What is claimed is:

1. A spin-valve thin-film magnetic element comprising:
   a substrate;
   a composite provided on the substrate, the composite comprising:
      an antiferromagnetic layer;
      a pinned magnetic layer in contact with the antiferromagnetic layer, the magnetization vector of the pinned magnetic layer being pinned by an exchange coupling magnetic field with the antiferromagnetic layer;
      a nonmagnetic conductive layer in contact with the pinned magnetic layer; and
      a free magnetic layer in contact with the nonmagnetic conductive layer, the magnetization vector of the free magnetic layer being oriented in a direction intersecting the magnetization vector of the pinned magnetic layer;
   hard bias layers provided on both sides of the composite so that the magnetization vector of the free magnetic layer intersects the magnetization vector of the pinned magnetic layer; and
   electrode layers provided on the hard bias layers, the electrode layers applying a sensing current to the composite,
   wherein the free magnetic layer comprises a single layer composed of a CoFe-based alloy; and
   wherein the average diameter in the thickness direction of crystal grains constituting the free magnetic layer is substantially the same as or less than the thickness of the free magnetic layer.

2. A spin-valve thin-film magnetic element according to claim 1, wherein the average diameter of the crystal grains constituting the free magnetic layer is 150 angstroms or less in the plain of the free magnetic layer.

3. A spin-valve thin-film magnetic element according to claim 1, wherein the average diameter of the crystal grains constituting the free magnetic layer is 100 angstroms or less in the plain of the free magnetic layer.

4. A spin-valve thin-film magnetic element according to claim 1, wherein the average diameter of the crystal grains constituting the free magnetic layer is 30 angstroms or more in the plain of the free magnetic layer.

5. A spin-valve thin-film magnetic element comprising:
   a substrate;
   a composite provided on the substrate, the composite comprising:
      an antiferromagnetic layer;
      a pinned magnetic layer in contact with the antiferromagnetic layer, the magnetization vector of the pinned magnetic layer being pinned by an exchange coupling magnetic field with the antiferromagnetic layer;
      a nonmagnetic conductive layer in contact with the pinned magnetic layer; and
      a free magnetic layer in contact with the nonmagnetic conductive layer, the magnetization vector of the free magnetic layer being oriented in a direction intersecting the magnetization vector of the pinned magnetic layer;

hard bias layers provided on both sides of the composite so that the magnetization vector of the free magnetic layer intersects the magnetization vector of the pinned magnetic layer; and electrode layers provided on the hard bias layers, the electrode layers applying a sensing current to the composite, wherein the free magnetic layer comprises a single layer composed of a CoFe-based alloy; and wherein the total volume of crystal grains constituting the free magnetic layer in which the <111> direction of the crystal grains is predominantly oriented substantially in a direction perpendicular to the plain of the free magnetic layer is 50 percent or less of the volume of the free magnetic layer.

6. A spin-valve thin-film magnetic element according to claim 5, wherein the total volume of crystal grains constituting the free magnetic layer in which the <111> direction of the crystal grains is predominantly oriented substantially in a direction perpendicular to the plain of the free magnetic layer is 30 percent or less of the volume of the free magnetic layer.

7. A spin-valve thin-film magnetic element according to claim 1, wherein the thickness of the free magnetic layer is in a range of 10 to 50 angstroms.

8. A spin-valve thin-film magnetic element according to claim 1, wherein the thickness of the free magnetic layer is in a range of 15 to 30 angstroms.

9. A spin-valve thin-film magnetic element according to claim 1, wherein the free magnetic layer is a single CoFe layer.

10. A spin-valve thin-film magnetic element according to claim 1, wherein the free magnetic layer is a single CoFeNi layer.

11. A spin-valve thin-film magnetic element according to claim 1, wherein at least one of the free magnetic layer and the pinned magnetic layer which are in contact with the nonmagnetic conductive layer is provided with a reflective mirror layer comprising a nonmagnetic insulating material at a face which is not in contact with the nonmagnetic conductive layer.

12. A spin-valve thin-film magnetic element according to claim 1, wherein, in the composite, the antiferromagnetic layer, the pinned magnetic layer, the nonmagnetic conductive layer, and the free magnetic layer are deposited in that order on the substrate.

13. A spin-valve thin-film magnetic element according to claim 1, wherein, in the composite, the free magnetic layer, the nonmagnetic conductive layer, the pinned magnetic layer, and the antiferromagnetic layer are deposited in that order on the substrate.

14. A spin-valve thin-film magnetic element according to claim 1, wherein in the composite, the nonmagnetic conductive layer, the pinned magnetic layer, and the antiferromagnetic layer is deposited on one face in the thickness direction of the free magnetic layer, and the composite further comprises another nonmagnetic conductive layer, another pinned magnetic layer, and another antiferromagnetic layer being deposited on the other face of the free magnetic layer.

15. A spin-valve thin-film magnetic element according to claim 1, wherein the pinned magnetic layer comprises a nonmagnetic interlayer and first and second pinned magnetic sublayers sandwiching the nonmagnetic interlayer, the magnetization vectors of the first and second pinned magnetic sublayers being antiparallel to each other and the first and second pinned magnetic sublayers being in a ferri-magnetic state.

16. A spin-valve thin-film magnetic element according to claim 1, wherein the antiferromagnetic layer comprises one of an X—Mn alloy and a Pt—Mn—X' alloy wherein X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

17. A thin-film magnetic head comprising a spin-valve thin-film magnetic element, the spin-valve thin-film magnetic element comprising:

a substrate;

a composite provided on the substrate, the composite comprising:

an antiferromagnetic layer;

pinned magnetic layer in contact with the antiferromagnetic layer, the magnetization vector of the pinned magnetic layer being pinned by an exchange coupling magnetic field with the antiferromagnetic layer;

a nonmagnetic conductive layer in contact with the pinned magnetic layer; and a free magnetic layer in contact with the nonmagnetic conductive layer, the magnetization vector of the free magnetic layer being oriented in a direction intersecting the magnetization vector of the pinned magnetic layer;

hard bias layers provided on both sides of the composite so that the magnetization vector of the free magnetic layer intersects the magnetization vector of the pinned magnetic layer; and electrode layers provided on the hard bias layers, the electrode layers applying a sensing current to the composite, wherein the free magnetic layer comprises a single layer composed of a CoFe-based alloy; and wherein the average diameter in the thickness direction of crystal grains constituting the free magnetic layer is substantially the same as or less than the thickness of the free magnetic layer.

18. A spin-valve thin-film magnetic element according to claim 5, wherein the thickness of the free magnetic layer is in a range of 10 to 50 angstroms.

19. A spin-valve thin-film magnetic element according to claim 5, wherein the thickness of the free magnetic layer is in a range of 15 to 30 angstroms.

20. A spin-valve thin-film magnetic element according to claim 5, wherein the free magnetic layer is a single CoFe layer.

21. A spin-valve thin-film magnetic element according to claim 5, wherein the free magnetic layer is a single CoFeNi layer.

22. A spin-valve thin-film magnetic element according to claim 5, wherein at least one of the free magnetic layer and the pinned magnetic layer which are in contact with the nonmagnetic conductive layer is provided with a reflective mirror layer comprising a nonmagnetic insulating material at a face which is not in contact with the nonmagnetic conductive layer.

23. A spin-valve thin-film magnetic element according to claim 5, wherein, in the composite, the antiferromagnetic layer, the pinned magnetic layer, the nonmagnetic conductive layer, and the free magnetic layer are deposited in that order on the substrate.

24. A spin-valve thin-film magnetic element according to claim 5, wherein, in the composite, the free magnetic layer, the non magnetic conductive layer, the pinned magnetic layer, and the antiferromagnetic layer are deposited in that order on the substrate.

25. A spin-valve thin-film magnetic element according to claim 5, wherein in the composite, the nonmagnetic conductive layer, the pinned magnetic layer, and the antiferromagnetic layer is deposited on one face in the thickness direction of the free magnetic layer, and the composite further comprises another nonmagnetic conductive layer, another pinned magnetic layer, and another antiferromagnetic layer being deposited on the other face of the free magnetic layer.

26. A spin-valve thin-film magnetic element according to claim 5, wherein the pinned magnetic layer comprises a nonmagnetic interlayer and first and second pinned magnetic sublayers sandwiching the nonmagnetic interlayer, the magnetization vectors of the first and second pinned magnetic sublayers being antiparallel to each other and the first and second pinned magnetic sublayers being in a ferri-magnetic state.

27. A spin-valve thin-film magnetic element according to claim 5, wherein the antiferromagnetic layer comprises one of an X—Mn alloy and a Pt—Mn—X' alloy wherein X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

28. A thin-film magnetic head comprising a spin-valve thin-film magnetic element, the spin-valve thin-film magnetic element comprising:
 a substrate;
 a composite provided on the substrate, the composite comprising:
  an antiferromagnetic layer;
  a pinned magnetic layer in contact with the antiferromagnetic layer, the magnetization vector of the pinned magnetic layer being pinned by an exchange coupling magnetic field with the antiferromagnetic layer;
  a nonmagnetic conductive layer in contact with the pinned magnetic layer; and
  a free magnetic layer in contact with the nonmagnetic conductive layer, the magnetization vector of the free magnetic layer being oriented in a direction intersecting the magnetization vector of the pinned magnetic layer;
 hard bias layers provided on both sides of the composite so that the magnetization vector of the free magnetic layer intersects the magnetization vector of the pinned magnetic layer; and
 electrode layers provided on the hard bias layers, the electrode layers applying a sensing current to the composite,
 wherein the free magnetic layer comprises a single layer composed of a CoFe-based alloy; and
 wherein the total volume of crystal grains constituting the free magnetic layer in which the <111> direction of the crystal grains is predominantly oriented substantially in a direction perpendicular to the plain of the free magnetic layer is 50 percent or less of the volume of the free magnetic layer.

* * * * *

UNITED STATES PATENT AND TRADEMARK OFFICE
CERTIFICATE OF CORRECTION

PATENT NO.    : 6,608,740 B2
DATED         : August 19, 2003
INVENTOR(S)   : Kenichi Tanaka et al.

It is certified that error appears in the above-identified patent and that said Letters Patent is hereby corrected as shown below:

<u>Title page,</u>
Item [75], Inventors, delete "Yosuki" and substitute -- Yosuke -- in its place.

Signed and Sealed this

Twenty-third Day of December, 2003

JAMES E. ROGAN
*Director of the United States Patent and Trademark Office*